(12) United States Patent
Chemtob

(10) Patent No.: US 7,124,164 B1
(45) Date of Patent: Oct. 17, 2006

(54) METHOD AND APPARATUS FOR PROVIDING GROUP INTERACTION VIA COMMUNICATIONS NETWORKS

(76) Inventor: Helen J. Chemtob, 10780 Kinloeb Rd., Silver Spring, MD (US) 20903

( * ) Notice: Subject to any disclaimer, the term of this patent is extended or adjusted under 35 U.S.C. 154(b) by 1062 days.

(21) Appl. No.: 09/836,512

(22) Filed: Apr. 17, 2001

(51) Int. Cl.
 G06F 3/00 (2006.01)
 G06F 9/00 (2006.01)
 G06F 17/00 (2006.01)
 G06F 15/16 (2006.01)
 G09G 5/00 (2006.01)

(52) U.S. Cl. .................. 709/204; 715/716; 715/730; 715/734; 715/758; 715/763; 715/765

(58) Field of Classification Search ............... None
 See application file for complete search history.

(56) References Cited

U.S. PATENT DOCUMENTS 5,796,393 A * 8/1998 MacNaughton et al. .... 345/733
6,151,621 A * 11/2000 Colyer et al. ............... 709/204
2001/0002831 A1 * 6/2001 Kato et al. ................. 345/326

* cited by examiner

*Primary Examiner*—Jason Cardone
*Assistant Examiner*—Azizul Choudhury
(74) *Attorney, Agent, or Firm*—Stephen Christopher Swift; Swift Law Office

(57) ABSTRACT

A system for communicating between members of a group is disclosed which includes a communications interface transmitting at least one of voice, video and text communications from an originating member to at least one destination member within a virtual group. The graphical communication flow module graphically depicts to each member of the virtual group the originator and target of different types of communication (text, voice or iconic) occurring simultaneously within the virtual group. The simultaneous access window allows virtual group members to engage in "real-life" group activities (like viewing a video, reviewing a document, or participating in training exercises) while at the same time transmitting, receiving, and viewing communications occurring between computer users connected to the virtual group. This system of providing group interaction over networks has unique and important applications to virtual group counseling, virtual office meetings, and group communications in the form of chat rooms over the Internet.

39 Claims, 41 Drawing Sheets

FIG. 5C

TYPES OF PROGRAMS/FILES
AND MODES OF ACCESS IN SYSTEM

LEADER'S POST-GROUP FEEDBACK REPORT

Question 1 (Rating Others) HOW HELPFUL WAS EACH GROUP MEMBER TODAY?
1 = not at all helpful, 7 = extremely helpful

| Rating Grid | | | | | Average actor ratings |
|---|---|---|---|---|---|
| XXXXX | Beth | Amy | Dave | Susan | XXXXXXXXXX |
| Beth | X | 6 | 4 | 2 | 4 |
| Amy | 5 | X | 4 | 3 | 4 |
| Dave | 3 | 7 | X | 3 | 4.33 |
| Susan | 4 | 6 | 7 | X | 5.66 |

4   6.33   5   2.66   GM =4.5
Average partner ratings

Question 2 (Rating Self) HOW MUCH PROGRESS OVERALL DID YOU MAKE ON YOUR GOALS OVER THE PAST WEEK? 1 = almost none, 7 = great progress Beth_7____ Amy_4____ Dave_6____ Susan_7____ Average Rating___6____

Question 3 (Rating Group) HOW SATISFIED ARE YOU WITH TODAY'S GROUP MEETING?
1 = not at all satisfied, 7 = extremely satisfied Beth_6__, Amy_3___, Dave_6_, Susan_6_, Average Rating_5.2__

Question 4: How much progress did you make on your homework over the past week? 1 = almost none, 7 = great progress Beth_7__, Amy_5___, Dave_6__, Susan_5___, Average Rating 5.7

Question 5: Did you set some specific homework goals for this week? If so, what are they?
Beth: Monitor my behaviors more carefully
Amy _____
Dave _____
Susan _____

Question 6: Do you have anything you want to let the leaders know before the next group meeting?
Beth _____
Amy I don't feel like I'm getting much out of the group lately _____
Dave _____
Susan _____

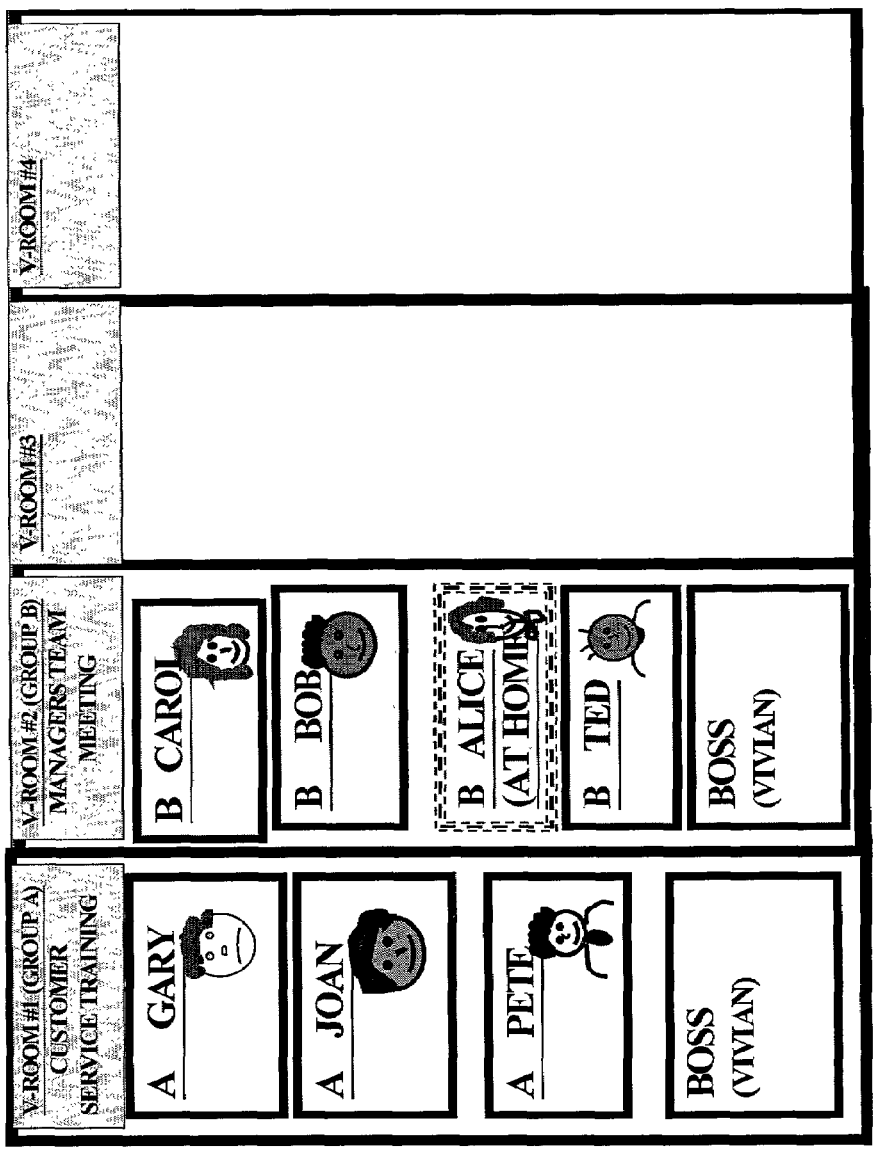

FIG. 22

| STRUCTURED GROUP PROGRAM COMPONENT BELOW | PROGRAM #1: (DEFAULT PROGRAM) GROUP-SUPPORTED GOAL ATTAINMENT PROGRAM | PROGRAM #2: (SAMPLE NEW STRUCTURED GROUP PROGRAM) GROUP-SUPPORTED SOCIAL SKILLS TRAINING PROGRAM |
|---|---|---|
| PRESENTATION MATERIALS (e.g. VIDEOS, TEXT, SLIDES, PHOTOS, LECTURE MATERIAL) | e.g. LECTURE MATERIAL ABOUT THE WHOLE PERSON MODEL AND HOW TO FIGURE OUT WHAT GOALS WOULD MEET THE NEEDS OF THE "WHOLE PERSON" | e.g. LECTURE MATERIAL ABOUT DIFFERENT TYPES OF SOCIAL SKILLS, INCLUDING MAKING A REQUEST, SAYING "NO", MEETING SOMEONE NEW, AND ACTIVE LISTENING SKILLS. |
| TRAINING EXERCISE PACKAGE (e.g. ROLE-PLAYING EXERICES, ETC.) | e.g. EXERCISES PRACTICING DIFFERENT WAYS OF RESPONDING IN A GROUP | e.g. PRESENTING DIFFERENT SOCIAL SITUATIONS AND MODELING APPROPRIATE BEHAVIOR. |
| PROMPTS | e.g. PROMPTS CONSISTING OF STATEMENTS FOCUSSED ON GROUP PROCESS AND GETTING A PARTICIPANT "UNSTUCK". | e.g. STATEMENTS THAT MAKE SUGGESTIONS TO A PARTICIPANT IN A ROLE-PLAY EXERICE TO FACILITATE AN EFFECTIVE RESPONSE. |
| ASSESSMENTS & FEEDBACK REPORTS | e.g. POST-GROUP QUESTIONNAIRE | e.g. SOCIAL ANXIETY INVENTORY WHICH ASSESSES LEVEL OF ANXIETY IN SOCIAL SITUATIONS |
| RESPONSE MATRIX VOCABULARIES | e.g. FACIAL EXPRESSION ICONS, RESPONSE STYLE ICONS, SOUND ICONS, REPLY ICONS | e.g. TERMS ADDRESSING FACATORS TO CONSIDER WHEN RESPONDING ASSERTIVELY, LIKE "OBJECTIVES", "RIGHTS", "RESPECT", ETC. |
| WORKBOOK | e.g. GOAL ATTAINMENT SCALING TOOLS THAT HELP PEOPLE CHOOSE WHAT GOALS THEY WANT TO PURSUE & BREAK THE GOALS DOWN INTO STEPS | e.g. HOMEWORK ASSIGNMENTS THAT INSTRUCT PARTICIPANTS TO SEEK OUT A PARTICULAR SITUATION IN THE "REAL WORLD", PRACTICE NEWLY LEARNED SKILLS, & SELF-RATE PERFORMANCE |

FIG. 23A

Sample Sections from Goal Attainment Strategies Workbook
For Three Group Members—Section #1

| STATED GOAL | AMY | MARY | SUSAN |
|---|---|---|---|
| | Lose weight | Find better job. | Help child with ADHD |
| Steps for reaching goal | 1st—write down all foods eaten for one week. 2nd—write out diet for the following week. 3rd—Plan an exciting outing at the end of successful dieting week. | 1st—Read several books on the topic of changing jobs. 2nd—Send out at least two resumes per week on jobs that look good. 3rd—Make telephone calls to companies that are interesting and inquire about possible position openings. | 1st—Make appt with child's teacher to discuss school problems. 2nd—Come up with mutual plan for getting homework under control (e.g. set time, place, rewards for homework completion) 3rd—Find some activity that can be done as family to reinforce child's strengths. |

Sample Sections from Goal Attainment Strategies Workbook
For Three Group Members—Section #2

| STATED GOAL | AMY | MARY | SUSAN |
|---|---|---|---|
| | Lose weight | Find better job. | Help child with ADHD |
| Changes that will be required to different aspects of my "whole self" in order to accomplish my goal | Physical: I will have to get my mind in more control, less unconscious eating. Emotional: I will have to stop eating when I'm feeling anxious & find other ways to deal with anxiety. Cognitive: I will have to stop thinking negative thoughts about myself. Interpersonal: I will have to find friends who will support me in my desire to stop eating junk food. Motivational: I will have to think of other rewards besides eating the wrong kinds of foods. Spiritual: I will have to meditate more and ask for strength and guidance if I am ever gone to reach my goal. | Physical: It's stressful looking for a good job. I need to do regular exercise to keep anxiety under control. Emotional: I need to practice meditation and systematic relaxation in order to keep the tension from building up. Cognitive: I need to avoid negative thinking. Interpersonal: I need to meet new friends and do some "networking" to find out what else is out there. Motivational: I need to think of ways to reward myself when I make myself do uncomfortable things. Meaning: I need to accept that finding a new job is very important to me, but not overdo it with feelings of worthlessness if it doesn't happen quickly. | Physical: I need to take care of myself, because if I don't I just get frazzled and irritable and that doesn't help. Good diet, exercise, and sleep are essential. Emotional: I will have to stop ruminating all the time about this problem. I need to have a life outside of this problem. Cognitive: Only allow myself to think about this problem at predetermined times. Interpersonal: Stop talking to friends and family about problem, as it doesn't help. Motivational: I'm already very motivated to work on this problem. Probably too much so. I need to CHILL. Philosophical: I know that I will look back on this sometime and realize I was making way too much of a big deal about it. Get some perspective. |

FIG. 24A

SAMPLE GROUP INTERACTION TRAINING MODULE—PAGE 1

Overview:

This module will begin with the "professor" explaining that there are different ways people can respond to the statements or requests of others. These types of responses can be represented by different "characters" to aid in understanding.

Then the professor will interview several people who make an initial statement about a goal or problem or experience. Then the response grid will appear again and people can click on each character to see what type of response each character would make.

After several demonstrations, participants will be asked to take turns being the "speaker" and other people will be asked to take turns responding according to the different response types. Other participants will guess the response type that is being portrayed. The participants will be given a list of potential initial statements, or they may choose one of their own. Participants may choose to carry on with one conversation line for a while, stopping to determine what types of responses are being made.

It is recommended that participants practice making all types of responses. They will also be encouraged to think about what types of responses they prefer to get from others (when they are the speaker) and what types of responses they feel most comfortable making. Participants are encouraged to ask each other questions about how it feels to give and receive different types of responses.
Demonstration:

Speaker: "I spent all that time interviewing and negotiating for that job, and now they say there isn't even a position any more. I can't go back to square one!"

FIG. 24B

SAMPLE GROUP INTERACTION TRAINING MODULE—PAGE 2

| DETECTIVE | MAGICIAN | FOREMAN | JUDGE |
|---|---|---|---|
| Icon: Inspector Gadget Type Character M.O.: Eager to track down the facts of the case—grills for details. Response: "At what point did you suspect that something was wrong? Did they tell you this after you told them how much you wanted?" | Icon: Classic magician M.O. Tries to make the problem disappear by telling the speaker it isn't there. Response: "You've been saying that you weren't even sure that you wanted a new job, things are going so much better at work now." | Icon: Hardhat guy M.O. Tries to keep the speaker too busy to think about a problem, assigning busy-work Response: "I think you should get on that phone and call every person you interviewed with and then send them each a letter telling them how much you would like to work with their company." | Icon: Robed with gavel M.O. Gives rational explanations to show the speaker that his/her own actions have cause the present situation. Response: "You know better than to put so much energy into one thing. You should have been interviewing at other places at the same time, not setting yourself up for failure." |
| Swami | Sign Painter | Drill Sergeant | Guru |
| Florist | Kick-in-the-Pants Guy | Shrink (Interpreter) | Advice-Giver |
| Empathy-Giver | Self-Discloser | Feedback-Giver | Process Analyzer |

FIG. 25A

SCHEDULER SCREEN

CLICK HERE TO ENTER CURRENTLY RUNNING GROUPS

Immediate Goal Support Group (leaderless) (up to ten people)    written format only
                                                                                Written plus voice Immediate Group Interaction Training Group (leaderless) (up to 10 people)   written format only
                                                                                        Written plus voice

CLICK HERE TO REVIEW ON-GOING GROUPS OFFERED

CLICK HERE TO SIGN ON TO GROUP YOU HAVE ALREADY REGISTERED FOR
    Your password _____ Group's password _____

CLICK HERE TO ACCESS YOUR PERSONAL GOAL ATTAINMENT WORKBOOK
    Your password _____

CLICK HERE TO SIGN UP FOR PERSONAL PASSWORD & WORKBOOK

CLICK HERE TO GO TO PROFESSIONAL LEADER REGISTRY

CLICK HERE TO GO TO ON-LINE RESOURCE DIRECTORY

CLICK HERE TO GET INFORMATION ABOUT THIS WEBSITE (PURPOSE, SECURITY, HELP)

FIG. 25B

SPECIAL REQUEST GROUP SIGN-UP SCREEN

*PLEASE CLICK TO MAKE YOUR PREFERENCES FOR SPECIAL ON-GOING GROUPS:*

Leadership Style:    a) Leaderless    Type of Communication: a) written only
                          b) With Leader                                        b) written and oral
                                                                                       c) audiovisual Group Format:    a) one time only
                      b) 6 week on-going, same group members
                      c) 6 week on-going, open format to different members Age:               a) No preference
                      b) Prefer 13-19
                      c) Prefer 20-35
                      d) Prefer 35 & over
                      e) Prefer Seniors Marital Status:    a) No Preference
                      b) Prefer Single
                      c) Prefer Married Language:    a) English
               b) Spanish
               c) Japanese Desired Focus:    a) No preference (general)
                    b) Addictions
                    c) Parent Issues
                    d) Work and Career Change
                    e) Health & Physical Fitness Other desired feautres:    a) Special geographical area write in _____
                                      b) Special institutional setting (like a university) enter here _____
                                      c) Special focus enter here _____

Congratulations. There is a group meeting with your preferences on _____. Please
If you would like to register for this group, please click here.

We are sorry, but there is no match currently available with your stated preferences. Please enter your e-mail address, and you will be contacted as soon as a group is available.

FIG. 25C

REVIEW AND SIGN-UP FOR ONGOING GROUPS SCREEN

LEADERLESS GROUPS WITH CLOSED MEMBERSHIP:

Wednesdays, 3 p.m., starting on May 21, 2000, running for 6 weeks, consecutively
Sign up below by writing first name and password

1. _____
2. _____

PROFESSIONALLY LED GROUPS WITH CLOSED MEMBERSHIP:

Thursdays, 7 pm, starting on May 22, 2000, running for 6 weeks, consecutively

1. _____
2. _____

SPECIAL FOCUS GROUPS WITH CLOSED MEMBERSHIP:

Fridays, 10 p.m. on May 23, 2000, running for 6 weeks, consecutively
Group Focused on Goals related to Work
Led by Dr. James Smith, industrial psychologist

1. _____
2. _____

IF YOU WOULD LIKE TO MAKE A SPECIAL GROUP REQUEST, PLEASE CLICK HERE.

FIG. 26

SIMULTANEOUS ACCESS WINDOW (BELOW)

GOAL SUPPORT GROUP BULLETIN BOARD

*INTERESTING ARTICLES:*
- REDUCING STRESS IN EVERYDAY LIFE
- MAINTAINING A HEALTHY PERSPECTIVE
- BEHAVIORAL APPROACHES TO SMOKING CESSATION

*ON-LINE EVENTS OF INTEREST:*
- DR. ANN GENOVA WILL BE TALKING ABOUT NEW APPROACHES TO OVERCOMING ADDICTIONS—THURSDAY, MAY 24 AT 5 PM ON THE GROUP WEBSITE

*NEWS ABOUT GROUP MEMBERS:*
- MARY WANTS US ALL TO KNOW THAT SHE HAS FINALLY REACHED HER GOAL WEIGHT. BE SURE TO CONGRATULATE HER!
- BEN WANTS TO KNOW IF ANYONE IS INTERESTED IN ATTENDING A CONFERENCE BEING HELD IN WASHINGTON DC ON SATURDAY JUNE 9TH ON ALTERNATIVE APPROACHES TO HEALTH AND WELLNESS. SEND HIM A NOTE IF YOU'RE INTERESTED.

COMMUNICATIONS/TRANSFER CENTER

TRANSFER

INTERACTION MATRIX BELOW

| VIDEO | VOICE | WRITTEN(MAIN) | WRITTEN (SIDE) |
|---|---|---|---|
| RESPONSES | HIDDEN RESPONSES/MESSAGES | | CLEAR |

BEN  MARY  JEFF  SANDY
JULIE  DON:  G  BILL  DANNY
FAYE  GARY  JIMMY (LEADER)

| MESSAGES | NOTES | SCROLL | SEND | SAVE | CLEAR |

PERSONAL ACTIVITY BOX: VOICE ONLY FORMAT

V: JIMMY TO GROUP: "EVERYBODY PLEASE CHECK OUT THE BULLETIN BOARD. THERE ARE SOME INTERESTING ANNOUNCEMENTS I WANT YOU TO BE AWARE OF."

RESPONSE MATRIX (BELOW)

Fill in

Replies

NO ? + YES — C Etc.

Expressions

Feeling Words: Happy, Frustrated, Etc

Response Styles: Detective, Magician, ETC

Curative Factors: Advice, Universality, Cohesion, Etc.

Other Categories

METHOD AND APPARATUS FOR PROVIDING GROUP INTERACTION VIA COMMUNICATIONS NETWORKS

FIELD OF THE INVENTION

The present invention relates to a method for applying psychological approaches to enhancing the quality of group interaction over computer networks, and to software embodying the aforementioned method operating on a server computer. The server provides a structured on-line environment which can be used in the operation of virtual meeting rooms, support groups, business meetings, academic classes, and other customized purposes.

BACKGROUND

Problems with Existing Systems of Computerized Group Interaction

There are many problems associated with currently available systems of computerized group interaction. Generally speaking, conventional systems for group interaction (e.g. chat-rooms) are poor replicas of actual communication in the real world. They are even poorer imitations of the operation of functional, task-oriented groups. A detailed look at the specific problems associated with currently available systems of computerized group interaction follows.

The main problem with currently available systems of computerized group interaction is that they do not provide a no way of visualizing all members of the group with whom one is interacting at the same time. For example, when a person attends a staff meeting at work, she is usually able to see the speakers and the other staff members. When she hears somebody speaking, she can connect the voice with the speaker, and can usually determine to whom the speaker is directing his/her comments, as well as how the speaker is feeling and how the listener is reacting to the message. In chat-rooms, it is difficult to ascertain these things.

Another problem with these systems is that communications must usually occur in a serial manner, one entry at a time, even though this is not the way natural communication in the real world occurs. To the contrary, many times people have side conversations going on, or they make short comments while the main speaker is talking, or they send hand-written notes back and forth while someone has the floor.

Another problem with currently available systems is that they do not allow for a new person to join a closed membership meeting that is already in progress (at the discretion of the "gatekeeper") as often happens in real-life situations. For example, a manager from another office making an unexpected visit may be invited to join an on-going management meeting to discuss a specific project, and then leave when that discussion is completed.

Another problem with currently available systems is that most do not provide the capacity to view presentation materials at the same time that the group communication is going on. Most work groups, academic groups, and support groups have materials that are presented and discussed during meetings.

Another problem with these systems is that specially developed clinical tools for teaching group communication skills (or enhanced work team skills) cannot be utilized during the course of the group meeting.

Another problem with currently available systems of computerized group interaction is that they do not allow group members to rate themselves and each other on questions relevant to their progress on goals or their group participation.

Another problem with these systems is that they make no provision for taking notes or "minutes" while participating in the meeting. This is a serious limitation, as usually someone is asked to take notes during meetings and then is required to type them out for later dissemination or record-keeping. The ability to take notes is also important for students in a classroom setting, or people attending professional education seminars.

Another problem with currently available systems of computerized group interaction is that there is no way to transfer confidential work documents or reports between group participants. For example, participants in a "real-life" management meeting may each have confidential reports to turn into the boss during the course of that meeting.

Another problem is that it is not possible to reserve a meeting room for on-going work on a large project that requires intermittent attention from different participants over an extended period of time. For example, in real-life, a certain meeting room could be reserved for a large project where different employees would come and go as time permitted throughout the week to continue work on the project.

Another problem with currently available systems is that they do not follow a standardized format across different programs, thereby making voice, video, and written communication between groups of people difficult if not impossible at times. This is exactly the same problem that sometimes exists when people with different internet service providers (ISPs) or instant messaging services try to communicate, especially by voice.

Yet another problem with these systems is that they do not allow the user to move pieces of written information from place to place during the interaction. For example, it would be useful for one participant in a chat-room using a written format to be able to highlight something that someone else has written earlier in the conversation and then to add to it. This ability to take pieces of text already written and then build on them would be useful in academic discussions as well as work-related task groups. Or it would b very useful to be able to take notes during an electronic work team meeting, and then be able to send these notes or minutes to a central document.

A final problem is that current systems of electronic group interaction do not allow people outside of the group room to observe the meeting. The ability to broadcast a work team meeting or a staff meeting to many other employees who were unable to attend would be very useful. A feature that allowed for observation by outsiders would also be extremely useful when teaching group dynamics and running structured group programs. People learn a lot via "observational learning", and space may not always be available for the numbers of people who want to participate.

Problems with Existing Group Discussion Methods Over Computer Networks

In addition to the above-described problems with conventional computerized group interaction systems, there are serious problems associated with electronic group discussions in a more general sense. In an article written by Bridget Murray, "Reinventing Class Discussion Online", *APA Monitor on Psychology*, April, 2000, many pitfalls of discussion groups on the web are outlined. They include a) Students are quickly overwhelmed by too much information that is not organized; b) Students do not have good group communication skills. The writer suggests that specific methods of avoiding these pitfalls are organizing material and teaching specific group communication skills using methods such as role-playing. Unfortunately, most existing websites for discussion groups (or support groups) do not provide adequate organization of material, nor do they provide appropriate opportunities for learning group communication skills.

Another method that is often used in professional training settings to teach group therapy skills is allowing people to observe a live group in action. Observational learning is a powerful way for people to learn social skills, problem solving skills, and group communication skills. Many times in training settings, groups of professionals (and other students) remain behind a one-way mirror, observing the meetings of an ongoing group therapy program. Clearly, the opportunity to observe another group in action is not an option on existing websites.

Another important clinical tool for teaching people social skills and group communication skills is using exercises. One very popular exercise in marital counseling developed by Notarius and Markman in their book, *We Can Work It Out*, 1993, is having each partner hold three cards, one having a plus sign (+), one having a minus sign (−) and one having a neutral sign (0) written on it. The partners hold up the card that best describes how he or she is feeling as the other partner is speaking. This exercise provides a tremendous amount of feedback to the speaker.

The inventor has adapted this exercise for use with groups. She had each group member make a set of cards. Then group members were asked to hold up the card that best expressed their reaction to the person who was speaking in the group. This exercise was highly effective in helping the speaker to pay attention to the reaction of others when speaking. Despite the effectiveness of various types of exercises as aids to improving group skills, computerized discussion groups are currently unable to employ these methods.

Another important tool for teaching group communication skills is ensuring that all group members receive appropriate feedback about how they are doing. In many groups, members fill out rating scales on various relevant points. For example, one group may rate how close they feel to each other group member. Or they may rate how satisfied they are with the group progress. This type of feedback can be used to help each group member and to steer the group in a desired direction.

Another kind of feedback that is often obtained from group therapy participants is information about where the person falls on a standardized measure of some trait or variable. For example, people who are depressed are often given the Beck Depression Inventory (or some other measure of depression) at different points throughout the group treatment in order to assess progress. This information is received by the group therapists who often explain the results of the assessments to the participant.

Additionally, feedback about one's activity level during a group meeting can also provide essential feedback to the group members and leaders. Specifically, this data can be used to understand actor effects, partner effects, and relationship effects in the social relations model (Kenny, Interpersonal Perception: A Social Relations Analysis, 1994). However, there is currently no available system of group interaction that allows for obtaining these types of ratings, activity level data, and feedback in groups meeting via global communications networks.

Another technique that is often used to help teach group dynamics and communication skills in "real-life" settings is videotaping the people who are engaged in a conversation or role-6 playing exercise, and then having those people watch the videotape at a later time. Being able to watch a videotape of oneself with an eye for understanding how one might improve performance has been shown to be highly effective. To the inventor's knowledge there is no web site that allows for videotaping of oneself while communicating in a group discussion.

Another method that is regularly used to improve group communication skills involves techniques for strengthening group cohesion. Group cohesion is a measure of how close group members feel to other members of the group and how much they like the group as a whole. Techniques for strengthening group cohesion often include encouraging group members to interact together more often in settings outside of the usual group discussion meeting time. Another technique is having each group member choose a "buddy" that they will talk with between group sessions if they have questions or problems that arise. Finally, group cohesion becomes much stronger as the same group of people meet together over time on a regular basis. While there is one web site that allows people to form their own closed groups (a company called e-groups), this web site does not provide the necessary structure and guidance to help group members follow through with any of these methods for strengthening group cohesion. Additionally, the e-groups site suffers from all of the limitations of computerized group interaction outlined above.

In view of the above-described limitations of computerized group interaction and of computerized group discussions in general, current internet group communication is often shallow, unstructured and ineffective. Despite these problems, however, millions of people do use the internet to engage in chat-rooms, discussion groups, and even business meetings. Recent reports indicate that 40 million people have engaged in chat-rooms on AOL alone.

Accordingly, one object of the present invention is to provide a system that solves the problems with currently available computerized group interaction systems and methods of computerized group discussion.

Need for Improved Methods of Providing Structured Group Programs Over Computer Networks Structured programs provide a common focus, method, and setting for teaching everything from job skills to the "History of Modern Civilization". Academic courses, business skills training manuals, self-improvement books, "how to" manuals of any kind, business meetings, bridge clubs, chat-rooms, behavior therapy groups, and community organizations can all be viewed as structured programs. Most structured programs have a common focus, purpose or goal; a method or procedure for accomplishing that purpose; and a setting (time and place) for working through the program. In structured group programs, the participants go through at least some of the steps of the program in a group setting.

Structured programs differ in their degree of regimentation, their specificity of purpose, and the characteristics of their memberships. For examples, some programs may outline specific steps that must be taken to accomplish a particular goal (e.g. improving customer service in a business). Other programs may not have that many rules or special procedures that must be followed (e.g. a neighborhood book club).

Some structured programs are designed for homogenous membership (like a day-care program for senior citizens); and others are set up for heterogeneous membership (like a class offered at a community college for teaching computer skills). Some groups are led by professionals (like a physician-led support group for cancer survivors); while others are led by lay persons, e.g. Alcoholics Anonymous groups; while still others have no designated leader, e.g. some chat-rooms, peer groups. Some groups have a constant membership that meets on a regular basis over time (e.g. a company's Board of Directors) while other groups have a changing membership and do not meet more than once (a group of people gathered together to learn a new therapy technique at a continuing education seminar for professionals).

Many structured programs require the use of specially prepared materials like workbooks, blackboards, texts, video players, and other printed materials. Many programs also utilize special teaching techniques (like lectures, role-playing, live demonstrations and/or special psychological methods). Many programs require that participants take notes, fill out various forms, turn in homework or work products, and take tests or other assessments.

Most structured group programs have several other requirements. Some programs require that participants each keep a personal work folder with their own records stored inside (like test results, personal notes, workbooks). Other structured programs require a place where participants can view presentation materials together in a group setting. Most operating programs require a method for the group leader to communicate with each of the group participants individually from time to time. Many programs require that there be a way for group members to meet outside of regularly scheduled group meetings to work on long-term projects and team "homework" assignments. An important component of many structured programs involves providing resources to be used as an adjunct to the materials presented in the program. A system of informing potential participants about what types of programs are offered, whom they will be led by, and where and when they will be held is an important requirement for many large group program delivery systems. And finally, in the case of internet systems of group services delivery, a security system with password access is required to ensure that participants program materials and closed group communications are protected.

For reasons of convenience, efficiency, and sometimes anonymity, many individuals and businesses want to be able to attend different types of group activities in virtual meeting spaces over the internet (e.g. meetings, classes, seminars). However, the existing web sites that provide group services and structured programs over the internet suffer from all of the same limitations of group communication systems over computer networks that were outlined above. In addition, no current system of group system delivery provides a way to meet all of the requirements for providing structured group programs outlined in this section.

What is needed is a web site that combines all of the necessary components for the successful operation of a large scale group services delivery system which meets the requirements for effectively providing structured group programs.

Special Need for an Internet Structured Group Program Focussed on Personal Goals There are many limitations associated with the kinds of groups that are offered to the general public both in the "real world" and on the internet. One main limitation is that there is no group program, either in the real world or on the internet, that is focussed specifically on helping the general population reach their personal goals. There are many groups that focus on people who have serious emotional problems or addictions. But many people are averse to participating in those types of groups because of the stigma attached. Many others do not view themselves as "emotionally disturbed" or needing "therapy" and therefore do not wish to get involved in the kinds of groups that are available in the community or on the internet. Still others do not have the finances to go to professional group therapy sessions, nor the time or the transportation to commit to community support groups. But the fact remains that most people could benefit greatly from participating in a structured group program focussed on helping people reach their personal goals.

There are many reasons why focussing on one's personal goals is important. Psychological research has found that working toward goals has a positive effect on health, self-esteem, and psychological well-being. Every person from every ethnic group and nation has some goal that they would like to accomplish. Some people may not know what they want; others may want too much. Some people may not know how to go about attaining their goals, while others know exactly what they need to do, but cannot bring themselves to do it. Still other people have a solid understanding of what they would like to accomplish, but are unable to locate the resources needed to actualize their goals. Probably everyone has been in each of these places at different points in their lives. Struggling to accomplish one's goals is clearly a universal experience. But there is currently no place where relatively "healthy" people can meet together to get the support and structure that they need to help them reach their personal goals.

Accordingly, one object of the present invention is to provide an internet site offering structured group programs focussed on reaching personal goals to the general public. To overcome all of the previously outlined problems with computerized group communication, these programs would have to be offered in conjunction with the system of computerized group communication embodied in this invention in order to be effective.

Need for an Enhanced System for Creating Virtual Meeting Spaces where Conferences, Seminars & Meetings can be Held Over Computer Networks Recent increases in the productivity of American workers have been attributed to a focus on teamwork. The emphasis on improving communication between teams of designers, production workers, marketing staff, suppliers, and customers has led to an increased necessity for meetings. The greater frequency of meetings involving more and more people has led to higher travel and office space costs (to allow for conference rooms), as well as decreased productivity of some workers. Who hasn't heard employees (and even managers) complain that all they do all day long is go to meetings, so they never get any work done during normal business hours? In addition to increasing necessity for meeting space, virtually all businesses, agencies, and organizations have the need at one time or another to present a structured set of materials to their employees or clients in the form of training manuals, workbooks, or programs. Sometimes special seminar presenters are involved in presenting structured materials in a lecture or seminar format, but usually some written materials are disseminated as well.

Many businesses and individuals would like to be able to attend meetings, seminars, get-togethers, and classes via their computers. While there are sites for groups to meet over the internet (e.g., e-groups and voicechat), these sites suffer from many of the limitations of computerized group interaction systems outlined above. Specifically, these systems do not allow users to "see" the participants with whom they are interacting or to share on-line program materials with them. While expensive teamware and virtual office systems are available for use over computerized networks, these systems also suffer from many of the limitations of computerized group interaction systems outlined above. Existing teleconferencing systems provide an enhanced way for some meetings to occur electronically, but they generally do not allow for sharing documents while at the same time viewing the other participants involved in the meetings. The popularity of on-line discussion groups, chat-rooms and instant messaging services also is an indication that individuals enjoy the chance to "meet" with classmates, friends, family, and others over computer networks. But chat-rooms and instant messaging services also suffer from the limitations of computerized group interaction systems outlined above.

If better methods for holding meetings over computerized networks existed, businesses would reap big rewards. Virtual meeting spaces would allow users to stay at their workstations when attending meetings, thereby saving time, travel costs, and office expenses. Attending meetings while remaining at their workstation (or from a job site) would also improve worker productivity and company efficiency, as phones would not have to be left unanswered, and employees would not be left without supervisory presence while managers attend meetings. In addition, persons who have to attend consecutive meetings in disparate locations would be able to attend both meetings without a problem.

Accordingly, it is an object of the present invention is to provide a system that is free of the problems outlined above for businesses to hold meetings over computer networks and thereby reap the benefits of increased productivity.

SUMMARY OF THE INVENTION

According to a first aspect of the invention a server is provided for communicating content between a group of networked client computers over a communications medium and displaying communications flows identifying a content originator and a content receiver. The server includes a memory, a processor storing and retrieving instructions from the memory, and a network interface operably connecting the processor to the communications medium. A communications module receives content from an originating computer and transmitting the content to at least one target computer. Also provided is a graphical communication flow module integrated with the communications module and providing to each of the client computers a graphical representation of the group of networked computers, the graphical communication flow module graphically depicting communication flows showing the originating and target computer(s) corresponding to each content transmission by the communications interface.

According to one aspect of the invention, the communications module transmits content selected from the group including voice, video and text.

According to another aspect of the invention, a voice communications monitor having a plurality of voice communication flags is provided, with one flag corresponding to each client computer, and only one flag being active at any given time. The communications module verifies a status of the plurality of voice communication flags in response to a voice content transmission request for a given client computer, and activates the corresponding voice communication flag if none of the voice communication flags is active, the communications interface processing voice content transmission requests only from a client computer whose corresponding voice communication flag is active.

According to another aspect of the invention, a virtual office system is disclosed including a server computer having a nonvolatile storage medium, a plurality of client computers connected to the server computer via a communications medium. A graphical interface displays data to the client computers, and a virtual floorplan is stored on the nonvolatile storage medium and defines a plurality of virtual offices. The virtual floorplan is displayed to the client computers by the graphical interface. A scheduler is provided which stores scheduling information on the nonvolatile storage medium. The scheduling information is used for scheduling the plurality of virtual offices, and includes a directory identifying a time, meeting identification information, and virtual office information uniquely identifying a given virtual office. The scheduling information is displayed to the client computers by the graphical interface.

A communications interface transmits content from an originating client computer to at least one destination client computer, a graphical communication flow module graphically depicting to each client computer a representation of each of the participants of the meeting, the graphical communication flow module graphically depicting communication flows to all of the client computers showing the originating and destination client of content transmitted by the communications interface.

According to yet another aspect of the invention, a method is disclosed for conducting on-line training using a server computer connected to a plurality of client computers. The method includes a step of providing a virtual meeting room on the server computer which is accessible to the client computers, graphically depicting a representation the virtual meeting room and each of the client computer users accessing the virtual meeting room, communicating content from an originating client computer to at least one target client computer using a messaging interface, graphically depicting to each of the client computers a communications flow showing the originating and target client computer(s) of content transmitted by the messaging interface; and providing a simultaneous access window for displaying presentation materials to each of the client computers accessing the virtual room. The above-described method is used to facilitate a structured discussion using the messaging system and the presentation materials displayed in the simultaneous access window.

A further aspect of the invention relates to an internet web site residing on a host and providing a structured communications environment for a plurality of client computers. The internet web site includes a graphical interface displaying a plurality of virtual meeting rooms, a given virtual meeting room simultaneously accessible to selected ones of the client computers, and a communications interface receiving content from an originating client computer and displaying the content to at least one destination client computer. The graphical interface displays within each virtual meeting room a representation of the client computers accessing the corresponding virtual meeting room, and graphically depicts communication flows showing the originating and destination client computer(s) corresponding to each content transmission by the communications interface.

Yet another aspect of the invention relates to a memory medium storing software for a communications system, including a graphical interface for displaying a plurality of virtual meeting rooms, a given virtual meeting room being simultaneously accessible to selected ones of the client computers. The software further includes a communications interface for receiving content from an originating client computer and displaying the content to at least one destination client computer. The graphical interface displays within each virtual meeting room a representation of the client computers accessing the corresponding virtual meeting room, and graphically depicts communication flows showing the originating and destination client computer(s) corresponding to each content transmission by the communications interface.

These and other aspects of the invention are described below in the detailed description of the preferred embodiments.

BRIEF DESCRIPTION OF THE DRAWINGS

FIGS. 5A–5C are sample screen layouts showing types of interaction that may simultaneously occur in the interaction matrix;

FIGS. 16A and 16B show sample assessment questionnaires;

FIG. 16C is an example of the Leader's Professional Report of the Post-Group Assessment Questionnaire;

FIGS. 17A and 17B are sample layouts of a virtual Floor Plan graphically depicting a number of virtual rooms;

FIG. 22 is a chart showing examples of how components of the system may be customized;

FIGS. 23A and 23B show sample on-line workbooks according to the present invention;

FIGS. 24A and 24B show sample on-line training materials according to the present invention; and FIGS. 25A–25C show sample screen prints of the scheduler used to schedule meeting rooms and on-line training sessions.

FIG. 26 shows a sample screen print of a bulletin board for a closed membership group.

DETAILED DESCRIPTION OF THE PREFERRED EMBODIMENT

The present invention provides an innovative system for enhancing the quality of group interaction over computer networks. The system can be used in the operation of chat rooms, support groups, business meetings, academic classes, training seminars, and other customized consumer and business purposes. The system can be engineered to operate over the internet, on internal business networks, and on personal computers in the home.

The system is designed to overcome the problems with existing systems of computerized group communication outlined in the background section of this application. In general terms, the system allows for the simultaneous exchange of voice, written, and iconographic messages in real-time; and it allows for viewing and working on structured group programs and shared documents while continuing to "see" the members of the group.

Figure 1:
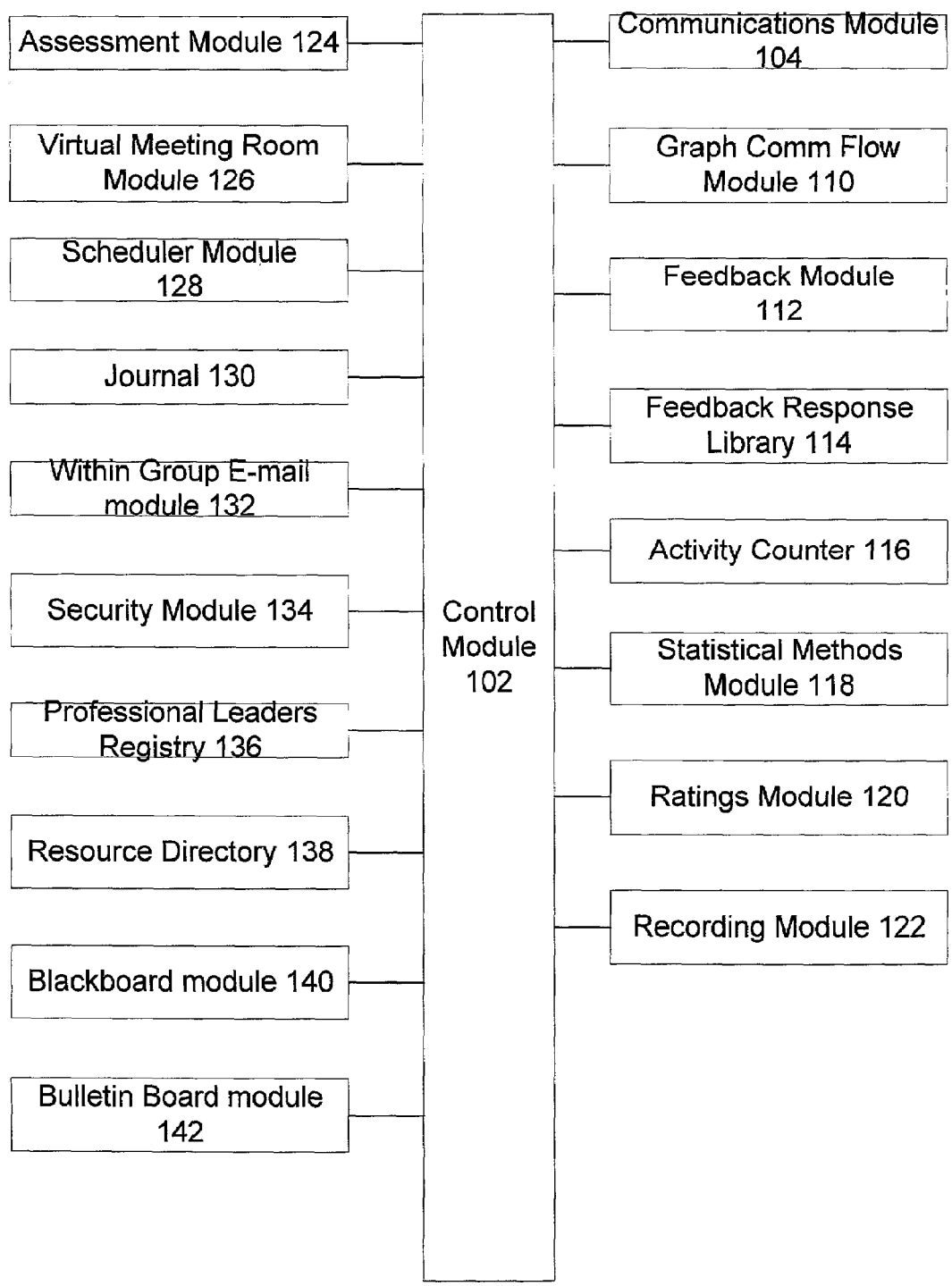
FIG. 1 is a block diagram showing the functional aspects of the software used to implement the group communications system of the present invention.

FIG. 1 is a block diagram showing the functional aspects of the software used to implement the group communications system of the present invention, generally designated 100. The group communications system 100 consists of a control module 102, a communications module 104 (text, voice, video), and a graphical communications flow module 110. Each of the respective functional modules depicted in FIG. 1 will be discussed in detail below.

As explained above, one of the shortcomings of existing internet groups relates to the difficulties in visualizing the group communications, and in particular a difficulty in determining the target of a particular comment.

In contrast, the system 100 enables group members to quickly ascertain who the current speaker is and who the target recipients are. As will be explain below, the graphical communications module 110 provides a graphical representation of each of the participants in a conversation, and graphically depicts the communications flows between the participants. The system provides participants with the ability to give and receive on-going feedback during the group session without interrupting the group process.

The communications module 104 supports at least one of text, voice and visual (video) communication, including combinations thereof. The system 100 may optionally include a feedback module 112 and a library 114 which facilitate participants to provide ongoing feedback. The library 114, may contain a variety of feedback expressions including graphical icons (emoticons, text expressions, and sound clips). In use, the user selects a feedback expression from the library 114 using the feedback module 112 and send it to one or more desired users. For example, if Sally is talking, and Mary wants to ask her a question, Mary can indicate this by sending Sally a question mark "?" or the like.

As will further be described below, the feedback module 112 enables group members to give/receive feedback regarding the group process and to specific statements of group members. For example, group members may send positive (+), negative (−), or neutral (0) reactions to other group members.

Moreover, the system 100 provides a way for members to "whisper" to one another, i.e., pass notes during a meeting. The notes may be either public notes visible by all members or private notes visible only by the intended recipient.

The feedback module 112 includes an editor for creating customized feedback expressions including graphical icons (emoticons, text expressions, and sound clips). The newly created (custom) feedback expressions may be stored in the library 114 or other storage medium.

Figure 2:
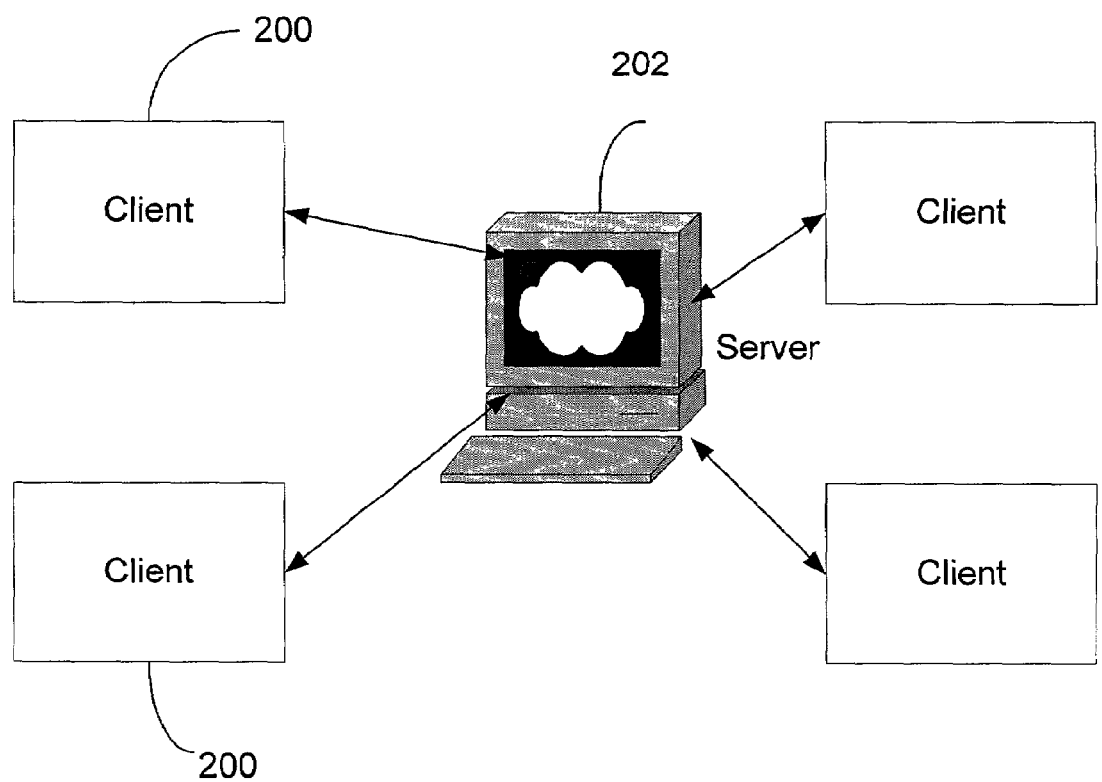
FIG. 2 is a block diagram the showing the group communications system of the present invention interface implemented in a client-server model.

FIG. 2 shows the group communications system 100 implemented as a web site or web portal, including plural personal computers 200 which communicate with a server 202 over a communications medium such as the internet 204. One of ordinary skill in the art will appreciate that the configuration illustrated in FIG. 2 is applicable to any networked environment, such as a local area or wide area network or the like.

Figure 3A:
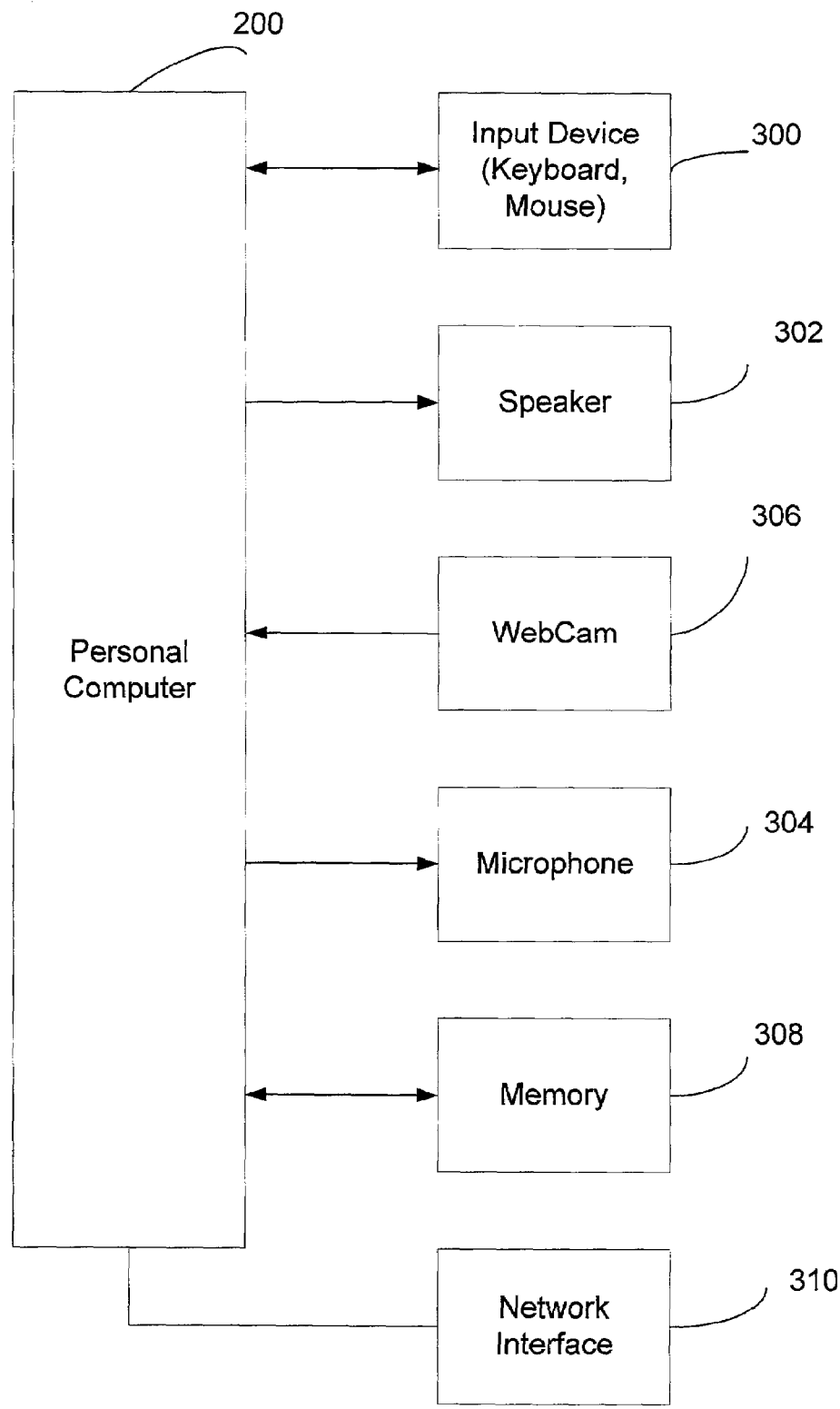
FIGS. 3A and 3B are block diagrams of a personal computer on which the software of FIG. 1 executes.

FIG. 3A is a block diagram providing detail of the personal computer 200 of FIG. 2. Notably, each personal computer (PC) 200 is a conventional personal computer having a processor, a memory and an operating system such as Windows ME by the Microsoft Corporation The personal computer (client) 200 is provided with a modem 310 or like network interface. The PC 200 is further provided with an input device 300 such as a keyboard, a mouse or the like.

As will be described below, the communications module 104 may optionally support voice communications, in which case the PC 200 is provided with a speaker 302 and a microphone 304.

As will be described below, the communications module 104 may optionally support video communications, in which case the PC 200 is provided with a web cam 306 or the like capable of recording video. Preferably, the web cam 306 records video in a compressed format, or the recorded video may be compressed by software executing on the PC 200.

Figure 3B:
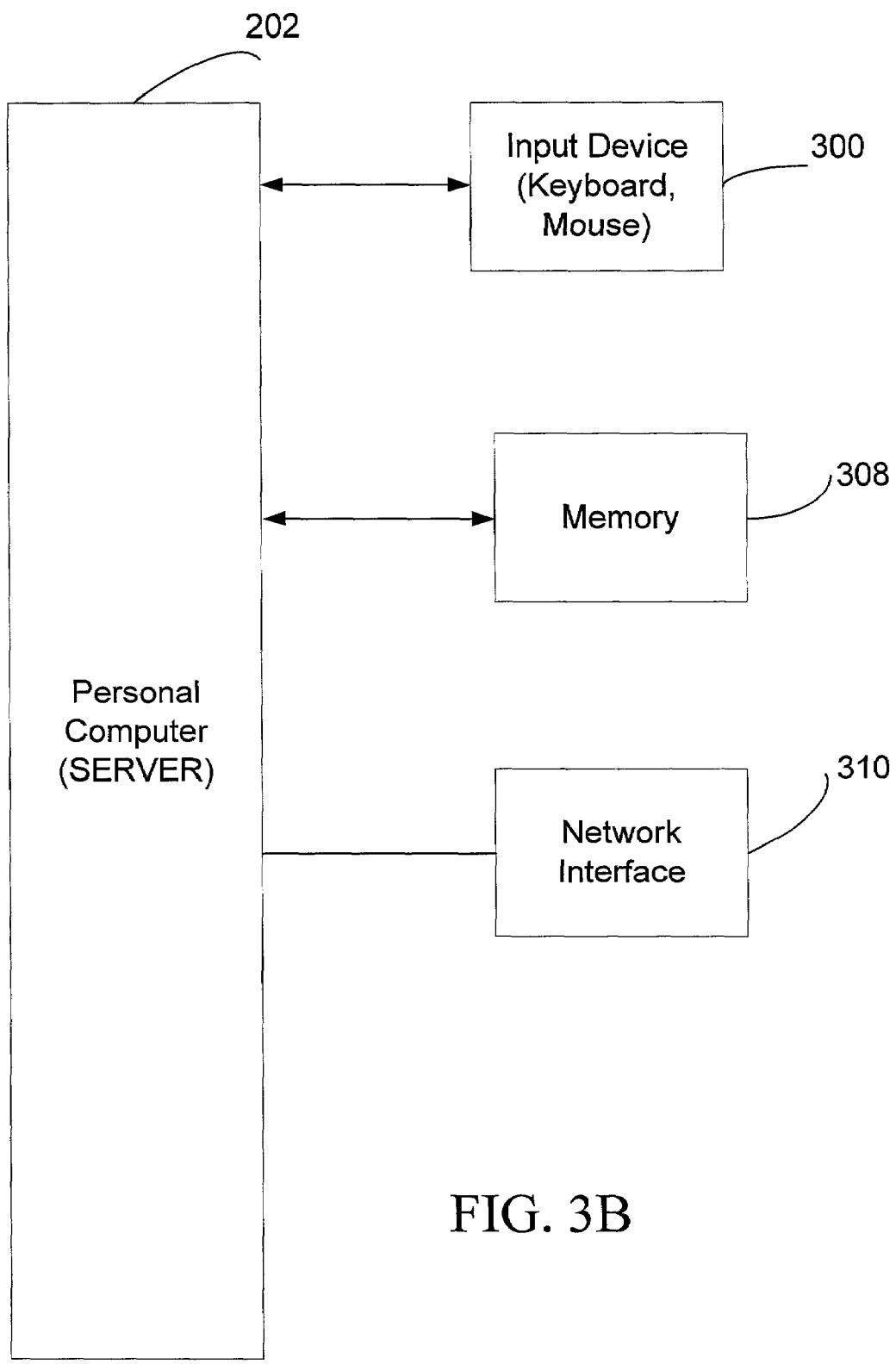

FIG. 3B is a block diagram providing detail of the server computer 202 of FIG. 2. Notably, the server 202 is a conventional personal computer having a processor, a memory and an operating system such as Windows ME by the Microsoft Corporation. The server computer 202 is provided with a modem 310 or like network interface.

The system 100 is specifically designed to enhance the quality of group interaction in four major ways: 1) by providing a visual representation of simultaneous written and voice communications occurring between group members throughout a computer-based meeting; 2) by building continuously-accessible virtual meeting places where group interactions can occur over time; 3) by enabling the group members to access group documents, blackboards, workbooks, and other internet sites while simultaneously engaging in the group discussion; and 4) by creating structured group programs that can be "played" on the system when desired.

The system 100 is compatible with conventional PC's 200 including personal digital assistants (PDA's) and the like network compatible devices. The system of the present invention makes it possible to deliver computerized group services in a realistic and multi-faceted way, overcoming many of the limitations of currently available systems of computerized group interaction. The specific design features of the system (with references to the specific problems that they address) are described below.

Figure 4:
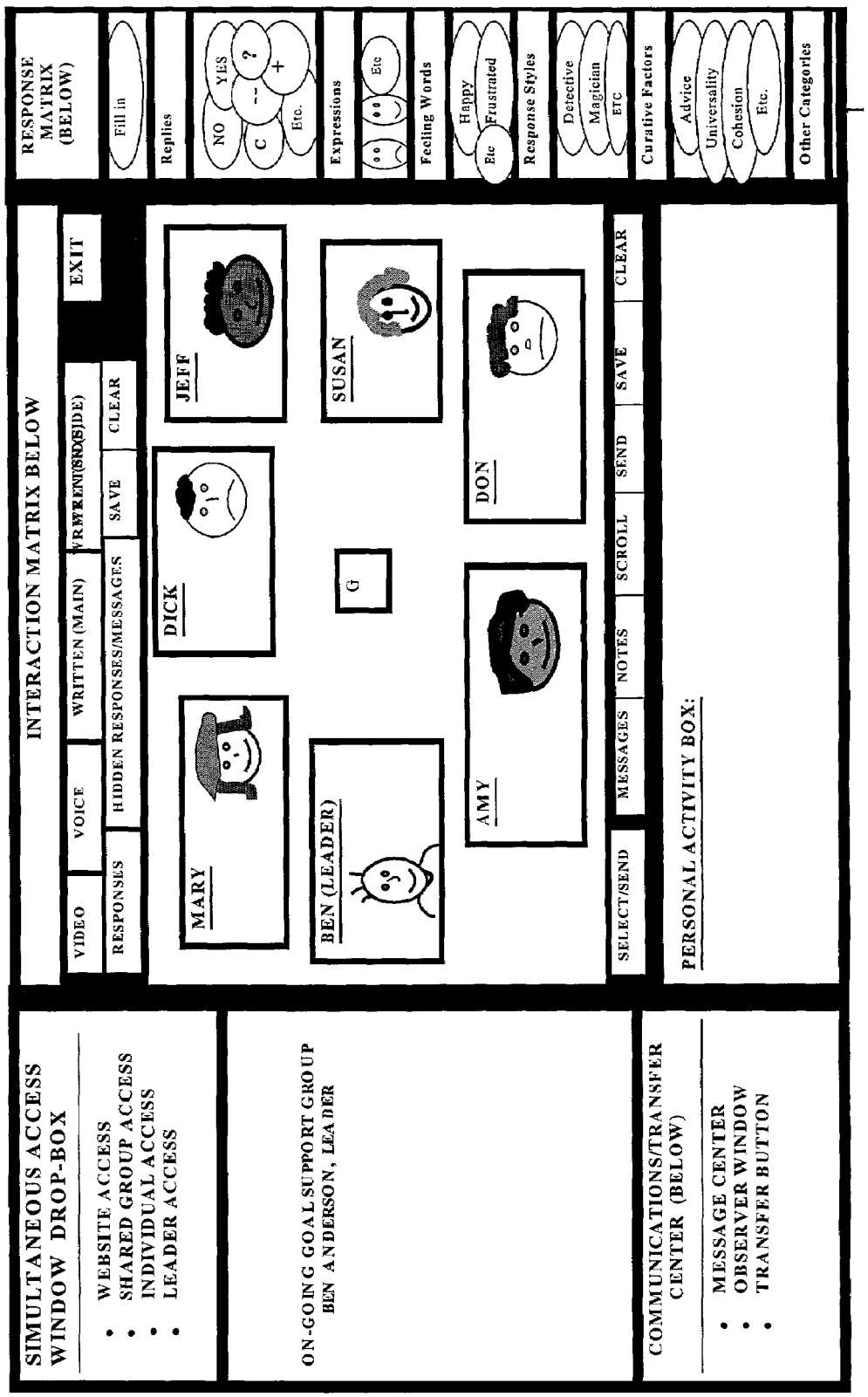
FIG. 4 is a sample screen layout of the group communications system of the present invention.

FIG. 4 is a sample screen layout 400 showing how the system 100 appears to a user during participation in a group activity. The screen 400 may be logically divided into a group interaction block 402, communications/transfer control center block 404, and a simultaneous access window block 406.

The system 100 may be operated in a number of different modes, such as an operator mode, a participant mode, or a programmer mode. The operator mode is used by the person who "owns" the system 100 space or has the authority as "leader" or "Boss" or "Manager" (through password access) to set how the system will operate during any particular group meeting. The Participant Mode is used by all people who participate in group activities using the system, and the Programmer Mode is used by the individual(s) creating new structured group programs or virtual group meeting places for use on the system.

Figure 13:
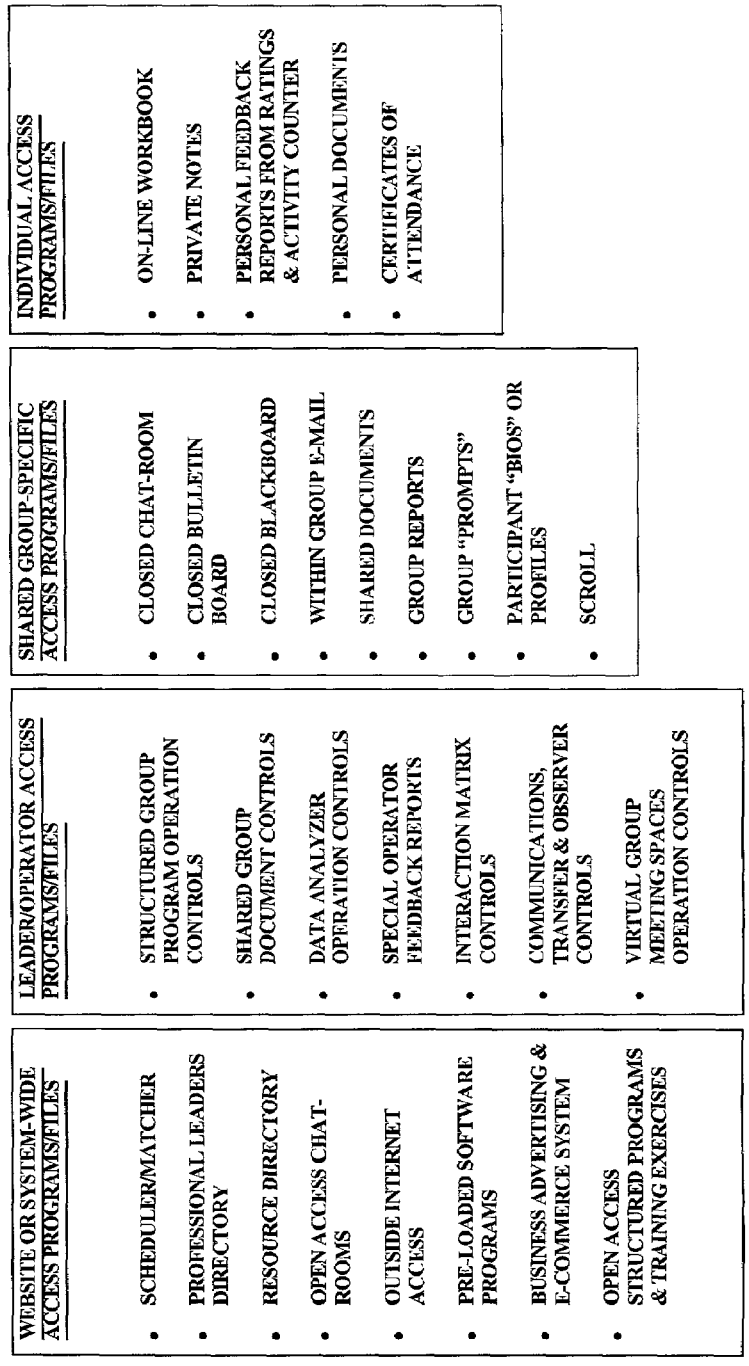
FIG. 13 is a screen print showing sample drop-boxes used to access to different types of files/programs in the system.

Each of these different modes of operation have access to different files/programs stored in the system. The participant may enter website wide programs (like open chat-rooms), individual accessed files (like a personal workbook), and shared group-specific programs/files (like shared group documents). The Leader may enter the general website programs, the special Leader accessed files, the shared group-specific files, and the programming files. The programmer has access to all the modes and all the files when creating new group programs or engineering virtual group meeting spaces using the system. FIG. 13 is a sample screen print showing drop-boxes used to provide access to each of the four types of files/programs in the system.

The Interaction Block

The graphical communications flow module 410 (FIG. 1) controls the interaction block 402, including an interaction matrix 408 used to illustrate the various group communications. The interaction matrix 408 enables members to view the entire group at all times and to observe simultaneous voice, written, and iconographic communications occurring between group members throughout a computer-based meeting in real-time.

In the presently preferred configuration of the interaction matrix 408, each group participant is graphically represented by an identity place box 410 which signifies his/her "seat" in the group. Other configurations will be described in later sections.

The identity place box 410 may have a participant's name on it and/or may include a static photo of the participant or a dynamic video image. The identity place box 410 enables each group member to be identified by all other participants in the group, and importantly, may provide a visual indication of who the current speaker(s) are. The default number of "seats" 410 available in the interaction matrix 408 can be set at a standard number.

To facilitate the group interaction, the Leader can assign a fixed seating arrangement, with each participant occupying the same seat 410 in each meeting. The interaction matrix 408 can be configured to provide an audio alert to a participant to signal a message or communication directed toward that member.

In addition to the respective identity place boxes 410, the interaction matrix 408 further includes a group box indicated by a "G" in FIG. 4, whose purpose will be described in detail below. Further still, the interaction matrix 408 may be provided with on-screen "buttons" 411 used to send different types of messages to other group members, to save and clear sent messages, to exit the screen, and to select/send written material from one place to another within the system. This feature is discussed in further detail later in document.

In FIG. 4, the interaction matrix 408 is set in an audio-visual format where each group member appears live via personal web cam 306 in his/her box 410 in the interaction matrix 408.

One of ordinary skill in the art will appreciate that a static image, such as a digitized photograph or the like may be displayed in the box 410 in place of a live video image.

The group participants may communicate in a variety of formats such as Voice Only, Written Only, Audio/Written, Video/Voice, and combinations of these formats. Regardless of the communications media (voice, text or combination thereof) used to communicate, the graphical communications module 110 provides a visual representation of the communications flows showing the sender and recipient of each communication.

Each of the blocks (402, 404, 406) of the system 100 may be individually adjusted and/or moved by the user so as to make more room for other blocks. For example, the simultaneous access window 406 can be moved to rest on top of the interaction matrix 408 and communications transfer center 404. This provides the full width of the screen for purposes of working on full-size documents.

Figure 10:
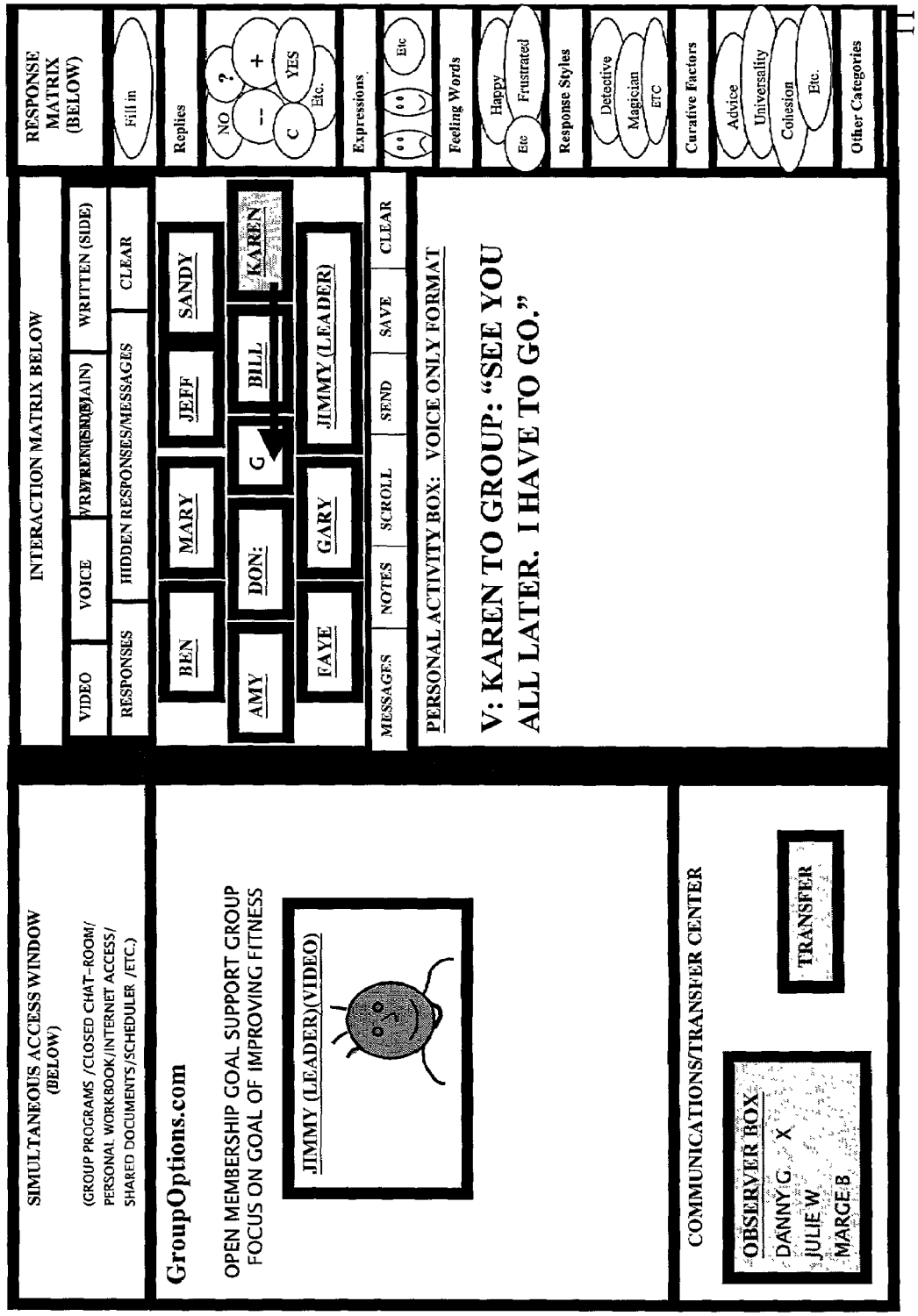
FIGS. 10–12 show alternate layouts of the interaction matrix.
Figure 11:
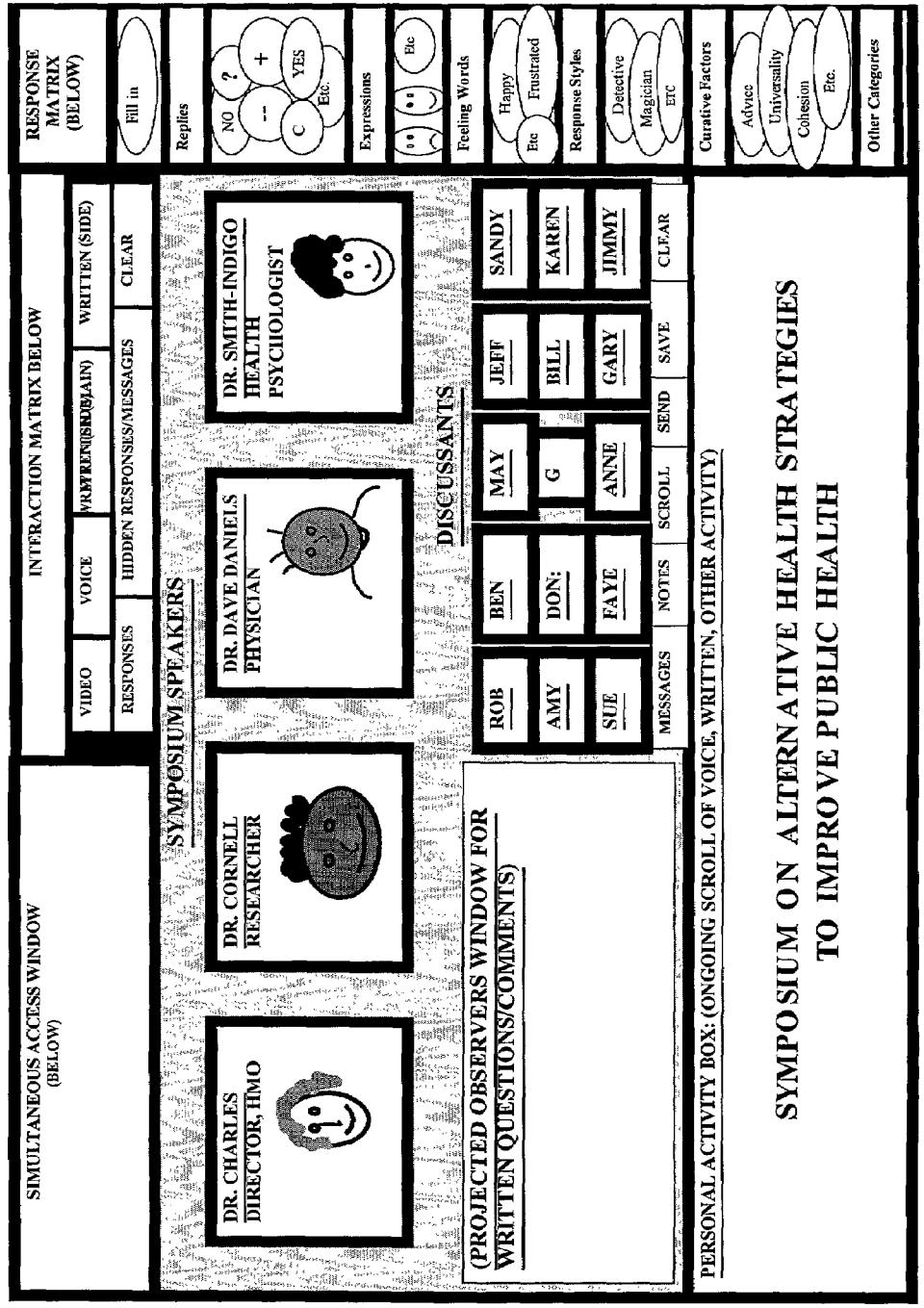
Figure 12:
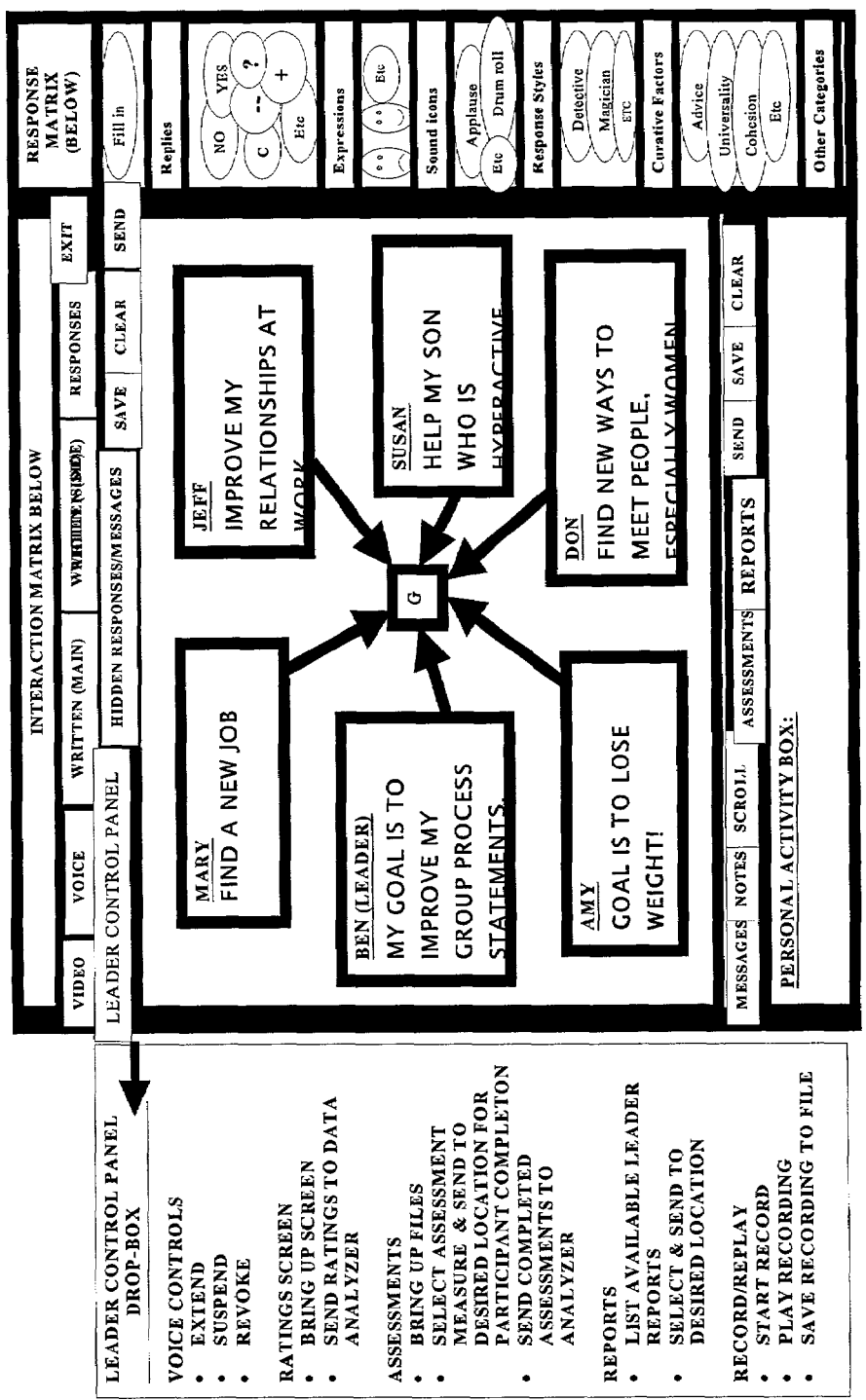

There are several also several different configurations of the system: Large Group Configuration (when group size exceeds 10 participants) (FIG. 10); Conference Configuration (FIG. 11); and interaction matrix only configuration (FIG. 12).

Response Matrix: The interaction block 402 further includes a Response Matrix 412 which provides a list of icons or emoticons 414-*a* (e.g. facial expressions showing different emotions); sounds 414-*b* (like a drum roll); and pre-defined text 414-*c* arranged under different headings (e.g. "group process terms" or "response styles"); and blank word bubbles, i.e., circular spaces which can be filled in with whatever short message the participant chooses. The various feedback expressions (icons, sounds, text messages, are all stored within library 114 (FIG. 1).

An example of a pre-defined text response 414-*c* is "detective" from the category "response styles". In order to send the selected icon 414-*a*, sound 414-*b*, or pre-defined text 414-*c* response, the participant simply selects an item in the response matrix 412 (using a pointing device such as a mouse) and specifies the recipient 410.

If desired, a member may place an emoticon 414-*a* on his/her own box 410. Thus, for example, a member may place a "happy face" on his box 410 to show the group that he is happy.

Personal Activity Box: Further still, the interaction block 402 includes a personal activity box 420 which enables a user to send and receive hidden written messages from other group members, as well as to write and save private notes taken during the meeting. The written messages may be public or hidden messages. Public or open written messages may be main messages or side messages. Participants may also send hidden messages consisting of icons selected from the response matrix 412.

A plurality of on-screen "buttons" 421 may be provided to indicate when a participant has received a hidden message ("Messages"), to allow participant to write notes ("Notes"), and save and send material from the Personal Activity Box 420.

In FIG. 12, the Personal Activity Box 420 may also be used to prompt and display out assessment measures, to receive feedback reports, and to scroll back through group interactions as well take notes and send written messages.

As described above, the Interaction matrix 408 (communications module 104) supports voice, written, and iconographic communications. Written communications include Main Comments (communications which directly relate to the topic of discussion), Side Comments (communications which indirectly relate to the topic of discussion), and Hidden Messages, each of which is graphically depicted in the interaction matrix 408 (via the graphical communications flow module 110 (FIG. 1).

Iconographic responses consist of icons, sounds and one word icons that are selected from the response matrix 412. These communications are referred to as "Responses" when they are sent from one person to another in the Interaction matrix 408. They are referred to as "Self-Expressions" or "Self-Statements" when they are exhibited in the person's own box 410.

The Interaction matrix 408 displays communication flows graphically using a line or the like connecting the sender's identity place box 410 with the receiver's identity place box 410. See, FIGS. 5A–5C.

Optionally, an activity counter 116 (FIG. 1) is provided to record the number of times each participant sends or receives each type of message. For example, the activity counter 116 may record the number of response messages sent and received, the number of written messages sent and received, etc.

With respect to voice communications, the activity counter 116 further measures the amount of group time each member consumes ("air-time"). Notably, the activity counter 116 will record how long a particular participant speaks, as well as how long the participant is spoken to. This type of information provides data for determining a participant's Actor Effects (how much she talks), Partner Effects (how much talking she elicits) and any relationship Effects (does the participant talk a lot only to a specific participant from whom she also elicits a lot of talking?).

A statistical methods module 118 (FIG. 1) is optionally provided to process the statistical information collected by the activity counter 116.

Figure 5A:
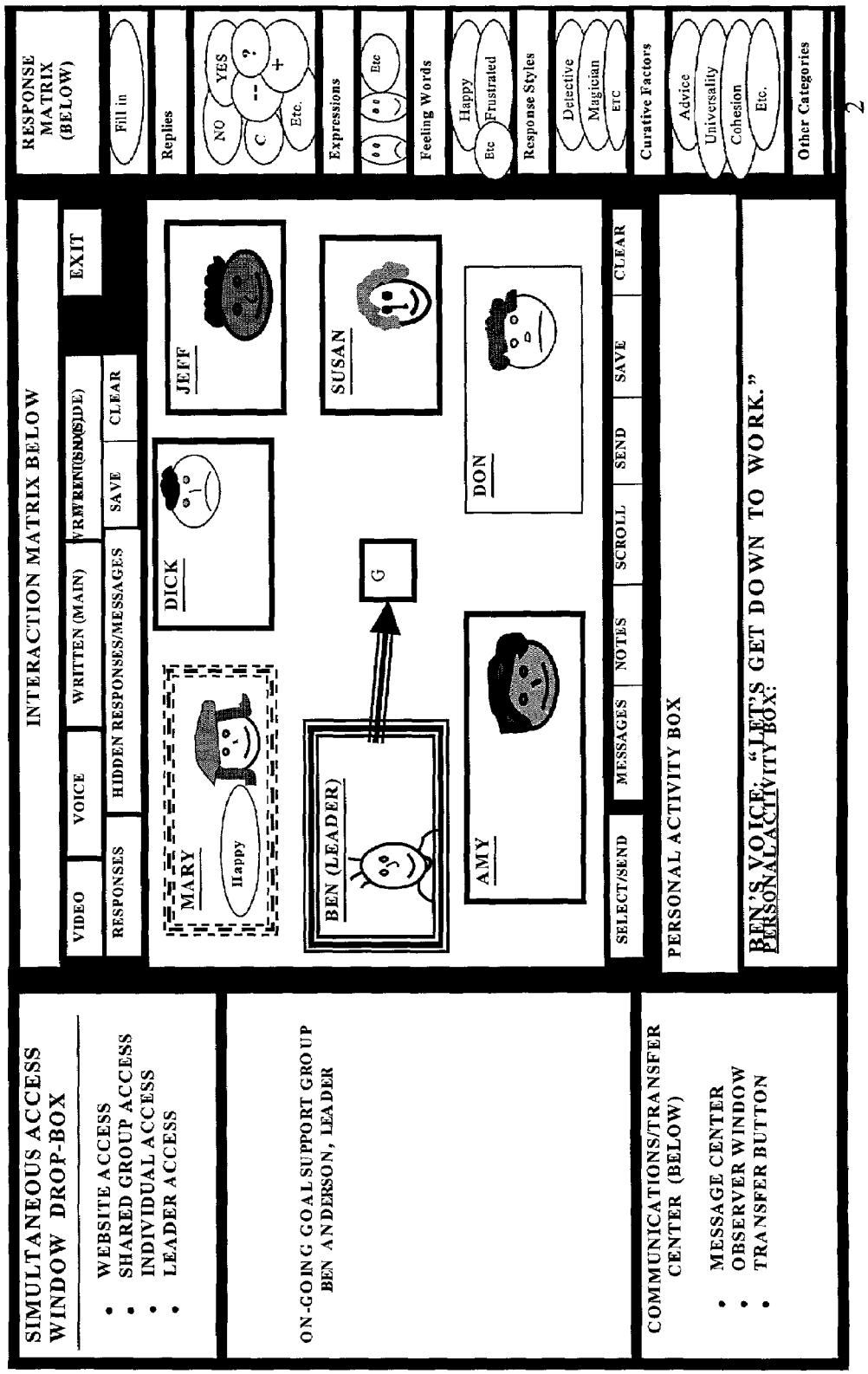
Figure 5B:
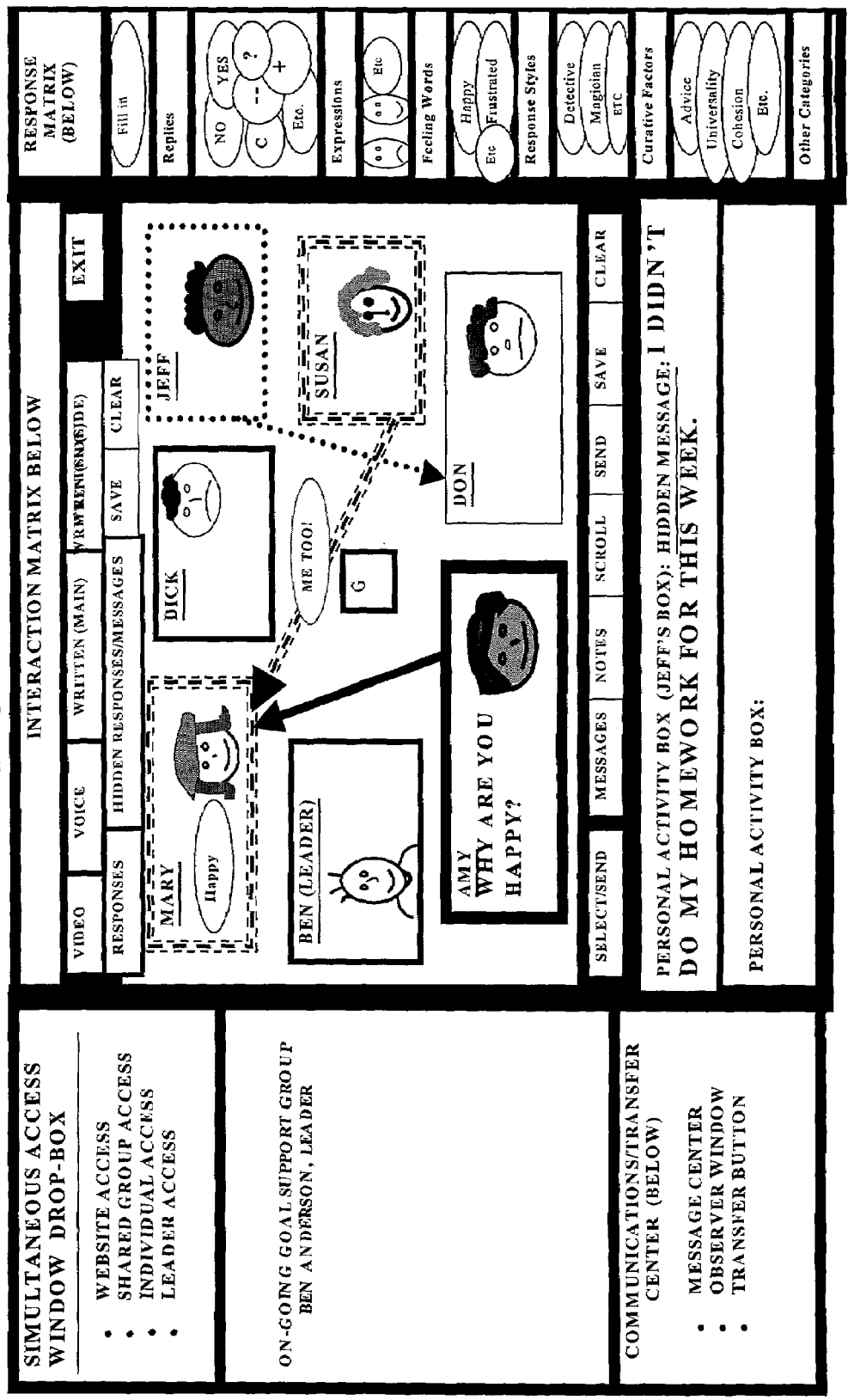
Figure 5C:
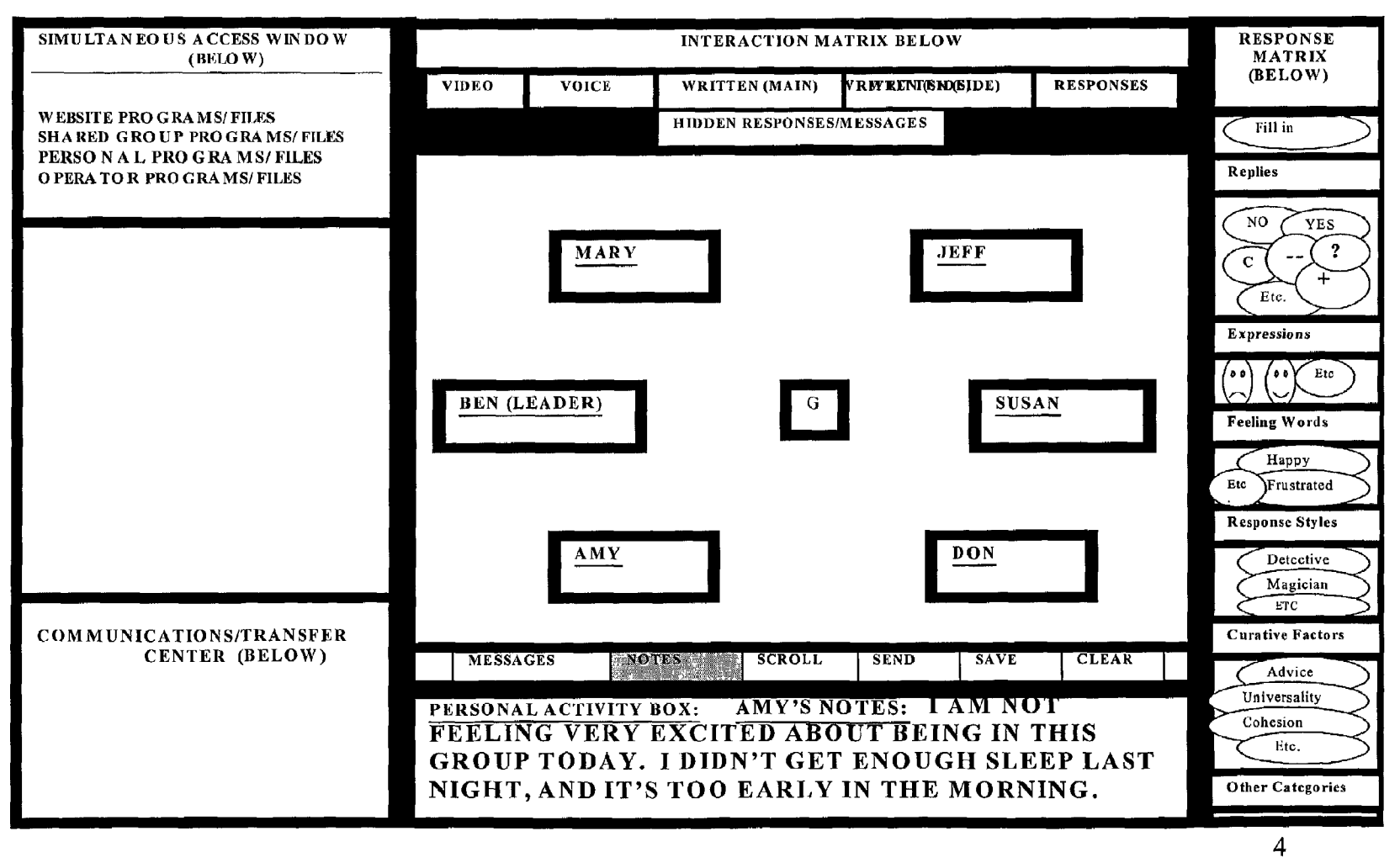

FIGS. 5A–5C show many of the possible types of interactions that may simultaneously occur in the interaction matrix 408 during a computerized group meeting. In FIGS. 5A–5C group members are communicating using voice communications. To facilitate understanding of the group interaction, the text of the words that group leader is speaking are written in box 522. However, in the actual operation of the interaction matrix 408 in voice mode, the text for voice communications does not appear. It is provided here for explanatory purposes only.

What the "G" means: In FIGS. 5A–5C, group leader 410-*a* is verbally addressing the Group G, as designated by a line from his box to the "G". Each participant may quickly ascertain the current speaker by seeing the coloring or highlighting (not illustrated) of the speakers box and by the line or arrow drawn from the speakers box to the Group G.

What the different border and arrow types mean: As further shown in FIG. 5A, Mary 410-*b* is indicating to the group that she is feeling "Happy", the word "happy" inside the box (along with her video-transmitted live image). In FIG. 5B, Susan 410-*c* is indicating to Mary 410-*b* that she is also feeling happy by the response "Me Too" and the arrow from her box 410-*c* to Mary's box 410-*b*.

In the provided illustrations, voice communications are indicated by triple lined borders around the place-box or "seat" 410 of the speaker as well as triple lined arrow to show the direction of the communication.

According to a presently preferred embodiment, the arrows indicate communication between members, and are visible to all of the group participants. However, one of ordinary skill in the art will readily appreciate that there are numerous ways to graphically illustrate communication flows.

Main written messages are visible to all of the group members, and are identified in a distinct manner in the interaction matrix 408. For example, in FIG. 5B Amy 410-*d* is shown sending a main written message to Mary 410-*b*, as indicated by the color of both of the respective boxes (not illustrated), the solid black line and arrow 416 drawn there between. However, one of ordinary skill in the art will appreciate that there are many ways of graphically illustrating a sender and a receiver of a message.

Side messages (comments) are messages which do not directly relate to the topic or thread being discussed by the group. Side comments are distinguished from main messages by the use of a dashed line and arrow for purposes of illustration, and hidden messages are represented by dotted lines. See, FIG. 5B. The choice as to whether to send a written main comment or a side written comment is made by the user by clicking on the desired button 411 in the interaction matrix 408.

Hidden messages are a third type of written messages. As the name implies, the content of the hidden message is hidden from the group, and appears only in Don's 410-*f* Personal Activity Box 420 (FIG. 5B). If desired, the interaction matrix may be configured to display the communication flows of all messages, including hidden messages. Thus, in FIG. 5B, the content of Jeff's 410-*e* hidden message is visible only to Don 410-*f,* but the communication flow (dotted line and arrow) is visible to all of the group.

Speaking Control: According to the presently preferred embodiment, only one participant may address the group at a time using voice communications. Notably, the voice module 106 (FIG. 1) providing for each virtual meeting room a plurality of voice communication flags, one flag corresponding to each participant (client computer), with only one flag being active in any virtual room at any given time.

In response to a voice communications request by a participant, the voice module 106 verifies a status of the voice communication flags within a given virtual room. If none of the flags within the virtual room are active, then the voice module 106 activates the corresponding voice communications flag, thereby enabling the participant to transmit voice messages.

To signal a desire to address the group, a participant requests activation of the voice communication flag by selecting a Voice icon (button) 411 (FIG. 4). If the voice communication flag is available, then the voice module 106 activates the corresponding voice communications flag, enabling the requesting participant to address the group using voice communications. When a participant is done talking he/she may relinquish control of the voice communication flag by deselecting the Voice icon 411.

According to a presently preferred embodiment, the voice module 106 automatically resets the voice communication flag a predetermined amount of time after the last communication. Members activate and reset (deactivate) the voice communication flag by clicking on the Voice icon 411. However, if a user fails to de-select the Voice icon 411 when finished speaking, the voice module 106 will automatically reset the voice communication flag after a predetermined time, e.g., 10 seconds, have elapsed without a voice transmission.

Optionally, the group leader may configure the voice module 106 to allocate fixed length speaking slots, wherein the voice communication flag is automatically reset after a predetermined amount of time has expired. Moreover, the leader may extend the amount of time allocated to a participant on-the-fly, by selecting a Voice extend icon 411 prior to the expiration of the predetermined amount of time.

Preferably, the interaction matrix includes a timer (not illustrated) which displays to each participant the amount of time remaining for control of the voice communication flag.

The voice module 106 may alternatively be implemented without the use of a voice communication flag, in which case, the user initiates speaking by selecting the Voice icon 411, and designating the intended recipient(s) 410. In this mode, group participants would have to rely on their communication skills to limit interrupting and talking over someone else, much as they must do so in "real-world" conversation.

Non-speaking participant's, i.e., those participant's having a non-active voice communication flag are free to communicate with individual members using text messages (public or private). Notably, the voice communication flag is only necessary when using voice communications, and is not implemented in Written Only, Video/Written formats.

Leader Function of Resetting the Flag: The group leader is given preference in obtaining the voice communication flag, and may regain control of the voice communication flag at any time by revoking the flag from a participant by, for example, selecting a revoke icon 411. Moreover, the leader may suspend a participants ability to obtain the voice communication flag by, for example, selecting a suspend icon 411 and then selecting the appropriate participant 410.

Likewise, the Leader may suspend the group's ability to communicate by selecting suspend, and then selecting "G" for group in the interaction matrix 408.

How the different types of messages are produced: In order to speak to the group, the leader 410-*a* clicks on Voice button 411 on the interaction matrix 408 and then clicks on the "G" button. The interaction matrix 408 graphically depicts the current speaker (leader 410-*a* in FIG. 5A) by changing the color of the speaker's box 410 box (color not illustrated) and through the use of an arrow from the speaker's "seat" to the "G" box in the middle of the interaction matrix 408.

Self Statements from Response Matrix: Members are able to provide self-statements by, for example, placing an emoticon 414-*a* on his/her place box 410. Thus, in FIG. 5A Mary 410-*b* indicates that she is feeling "happy" by clicking on the "Happy" word 414-*c* in the response matrix 412 and then clicking on her own "seat". This makes the word "happy" appear in her box and colors her box lavender (color not illustrated).

In the present illustration, the self statement is indicated by a hatched border around the participant's box making the statement with the icon from the response matrix 412 appearing in that participant's box. However, one of ordinary skill in the art will appreciate that there are many different ways to graphically illustrate such statements, and the specific illustration is merely provided as an example.

Response Messages from Response Matrix: Members provide Responses by clicking on the item in the response matrix 412 and then clicking on the box of the selected recipient. Thus, for example, Susan 410-*c* may indicates that she is also feeling happy by clicking on the freeform box 414-*d* (FIG. 4), typing the desired text ("Me Too"), and then clicking on Mary's box 410-*b*. This makes Susan's box 410-*c* a green color (not illustrated) and produces an arrow with the words "ME Too" on it pointing to Mary's box. In the present illustration, responses from the response matrix 412 are indicated by a hatched border around the participants box 410 and a hatched arrow.

Side messages: Group members may provide feedback to other members in the form of side messages. The choice as to whether to send a Written (Main) message or a Written (Side) message is made by the participant by clicking on the appropriate button 411 on the interaction matrix 408. Side messages are seen by all of the group members. For example, in FIG. 5B Amy 410-d sends a side written message to Mary 410-b by clicking on the side button 411, typing her message in her Personal Activity Box 420, and then clicking Mary's box 410-b. This causes makes Amy's box turn gray (not illustrated) and produces the dotted arrow pointing from Amy's box 410-d to Mary's box 410-b.

Hidden message: Group members may further send private messages to one another. The text of private messages is visible only to the recipient, but the communication flow between members is displayed. For example, in FIG. 5B Jeff 410-e sends Don 410-f a hidden message by clicking on the "Hidden Message" icon (Button) 411, typing a message in his Personal Activity Box 420, and then clicking on Don's box 410-f. This causes red diagonal lines (color not illustrated) to appear in the senders "seat" and a red dotted arrow (color not illustrated) flowing from Jeff's seat to Don's seat to appear in the matrix as well as sending the actual hidden message to Don's Personal Activity Box 420. In this illustration, hidden messages are indicated by dotted box border and dotted arrow.

Alternatively, the system can be set so that no visual display appears when hidden messages are sent. The procedure for sending hidden messages remains the same in this option. But participants can send hidden messages to each other in this option without anyone else knowing. The Leader selects whether or not hidden messages will be displayed in the interaction matrix 408.

Clear & Save Buttons: According to a presently preferred embodiment, the interaction matrix 408 automatically clears the graphical representations of the communications flows after a predetermined amount of time has elapsed. For example, the arrows and color changes in the boxes in the interaction matrix 408 may be programmed to automatically disappear within 10 seconds of completing the message.

Alternatively, user's may manually clear a communications flow by selecting a "clear" button 421, and then clicking on the item the original sender wants to clear. User's may also "save" their messages by selecting the "save" button 421 and clicking on the message the original sender wants to save. Further, the Group Leader may be provided with the ability to clear any group member's message. According to this aspect of the present invention, the Leader's box is enabled to use the "save" and "clear" buttons on any message sent within the Interaction matrix 408.

All group members 410 see the communication flows (color changes and arrows), including the communication flows representing hidden messages. However, depending on the type of message, the content of the hidden message may only available to the recipient.

Optionally, the group leader may be provided with the ability to view hidden messages.

Exit Function: When a participant wants to exit the group interaction matrix 408, he/she simply clicks on an "exit" button 411. Also, the leader can force a member out ("boot") by clicking the exit button 411 and then the participants "seat" 410. This is an important feature because sometimes participants can become unruly or abusive, and the Leader must have a way to make them leave the group. (See FIG. 5B).

Scroll function: The interaction matrix 408 is provided with a scroll icon (button) 421 (FIG. 4) which enables a member to scroll back through all of the transactions that have occurred during the meeting and these transactions will appear in the personal activity box.

Figure 14:
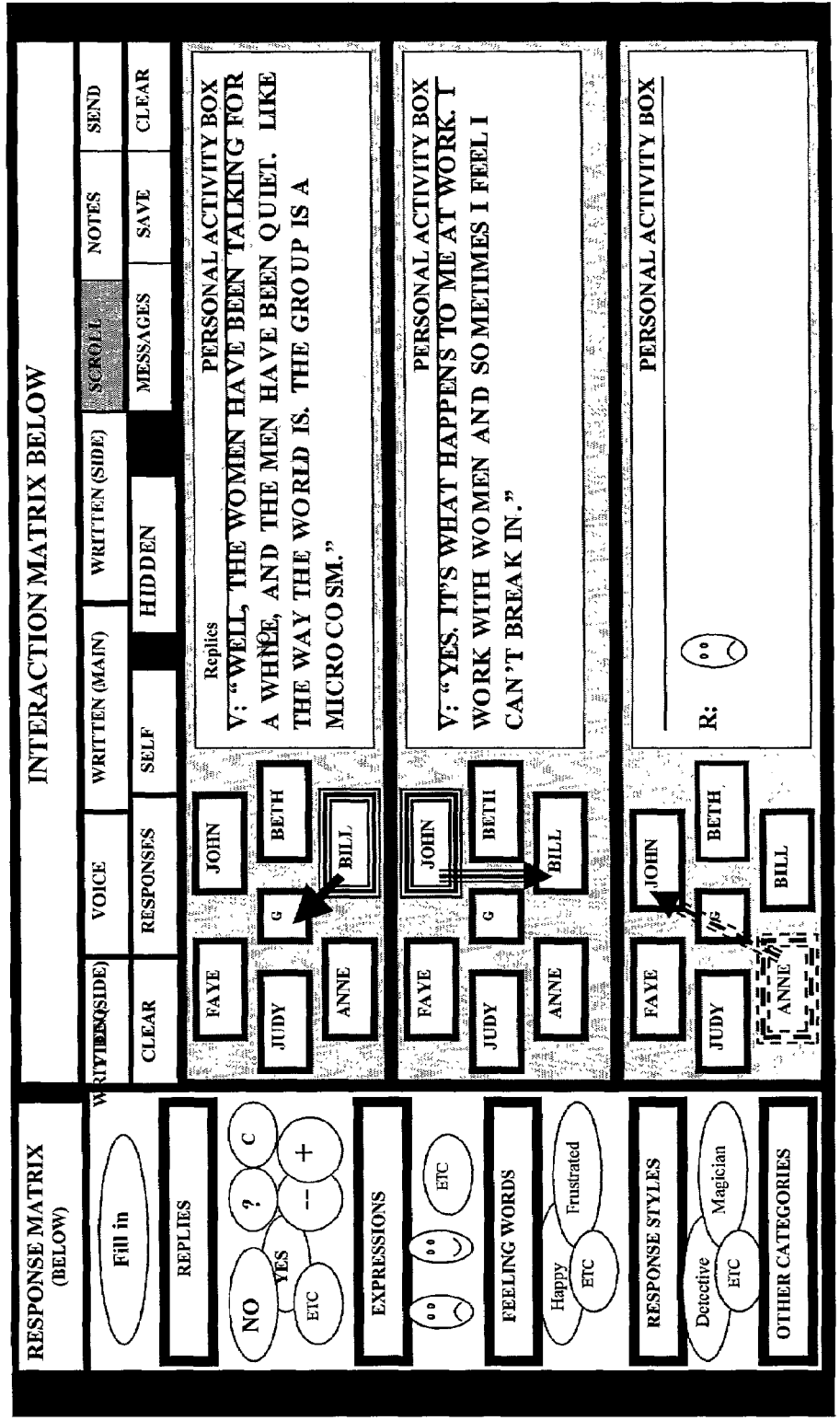
FIGS. 14 and 15 show two different scroll formats used to scroll through snapshots of previous communications.
Figure 15:

Scroll Formats. According to another aspect of the invention a variety of scroll formats are provided. One scroll format includes a small interaction matrix which indicates the message sender and receiver with an adjacent text message describing type of message was sent. (FIG. 14). Another scroll format is "text only" (FIG. 15) and provides text describing who the sender and receiver are by name as well as what type of message was sent.

Writing Notes in Personal Activity Box: A participant can take personal notes by, for example, clicking on the NOTES button 421 (FIG. 5C) and typing notes in the personal activity box.420. This feature provides every group member a "notepad" of sorts to write notes about the process for their own benefit.

Content Transfer Function

A content transfer feature enables participants to select text from one component of the system and send a copy of it to another component. This feature enables participants to view a document in the simultaneous access window 406, select a certain passage from that document, using the pointing device 300 (FIG. 3), and then send a copy of the selected passage to his/her personal activity box 420. Subsequently, the selected passage may be sent as a written message to members of the group. This feature also enables a member to scroll back through the written messages that have occurred throughout a group meeting, select a particular statement, send a copy of it to his/her personal activity box 420, whereupon it may be incorporated into the ongoing dialogue of the group. In other words, the members may "remind" the group of earlier statements (verbatim), without the need to re-type the dialogue.

In operation, content is transferred by clicking on the select-send button 421 (FIG. 6A), selecting the desired passage using the pointing device (mouse) 300, and then clicking on the place icon 410 on the screen where the content is to be sent.

Figure 6A:
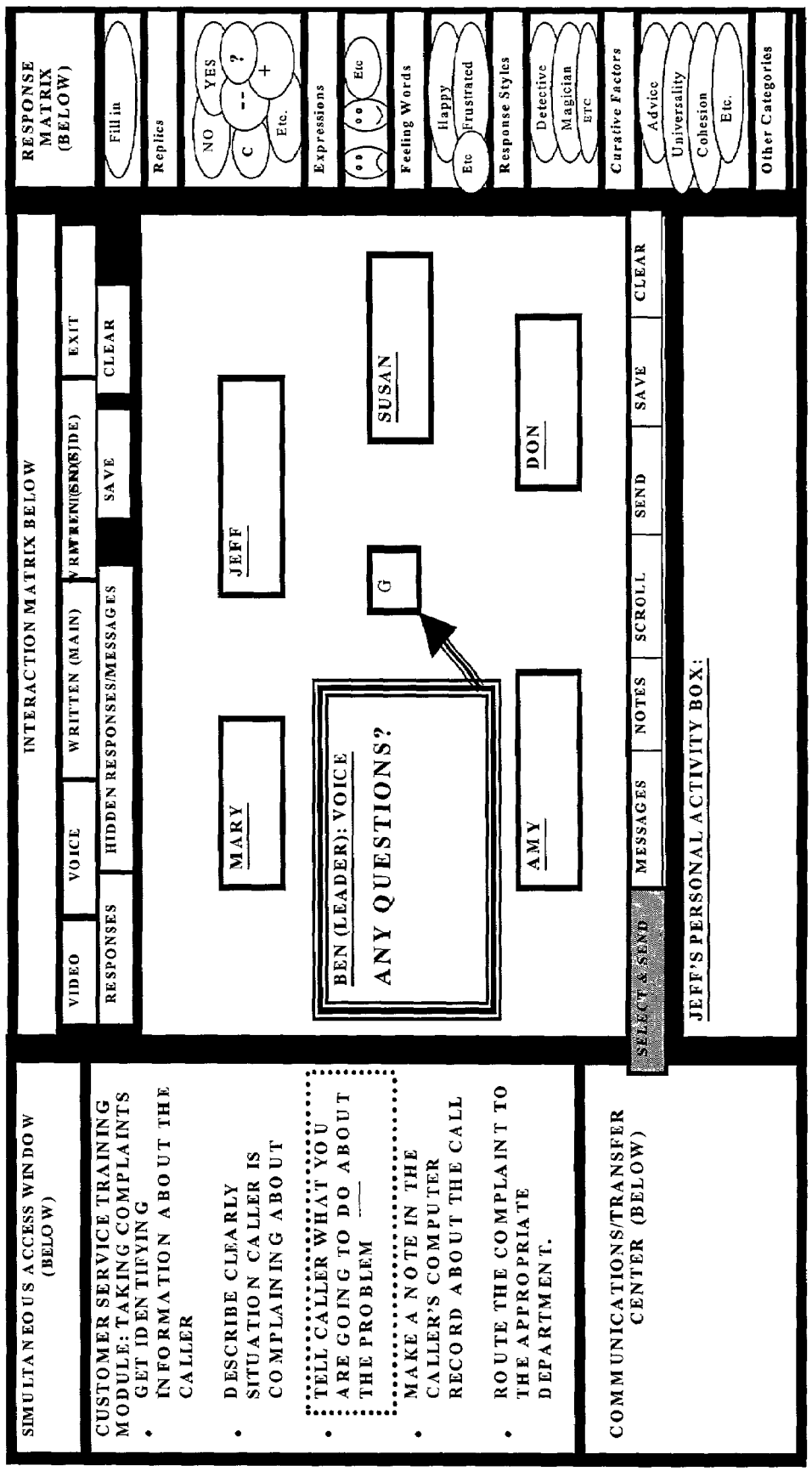
FIGS. 6A–6C are sample screen layouts used to explain how content is transferred in the system of the present invention.

In FIG. 6A, a user has selected text 602 from the presentation material on Taking Complaints which is indicated by the dotted box around the selected passage in the Simultaneous Access window 406.

Figure 6B:
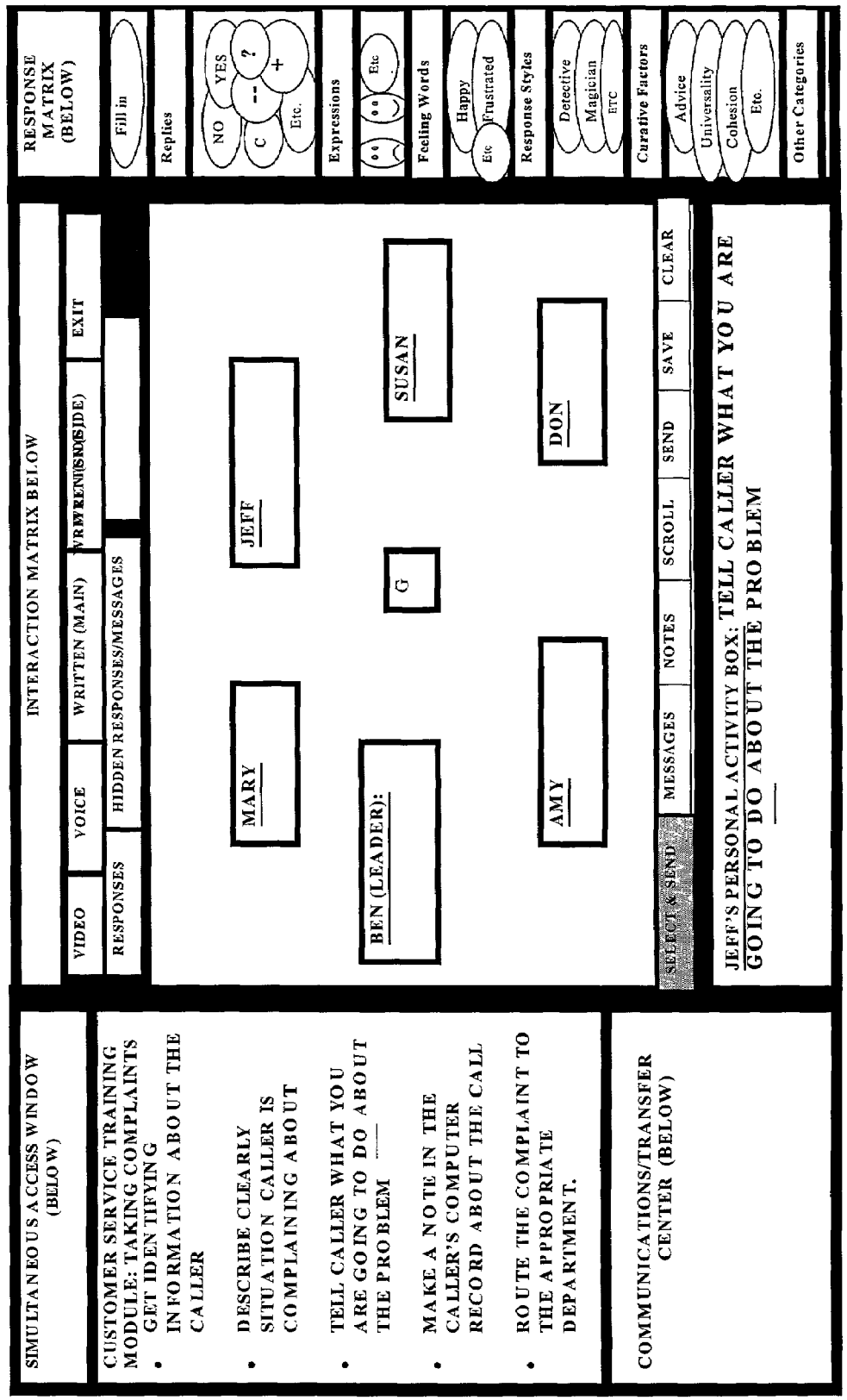

In FIG. 6B, the user has pasted the passage 602 into his personal activity box 420 and has edited the passage to send as a written message into the interaction matrix 408.

Figure 6C:
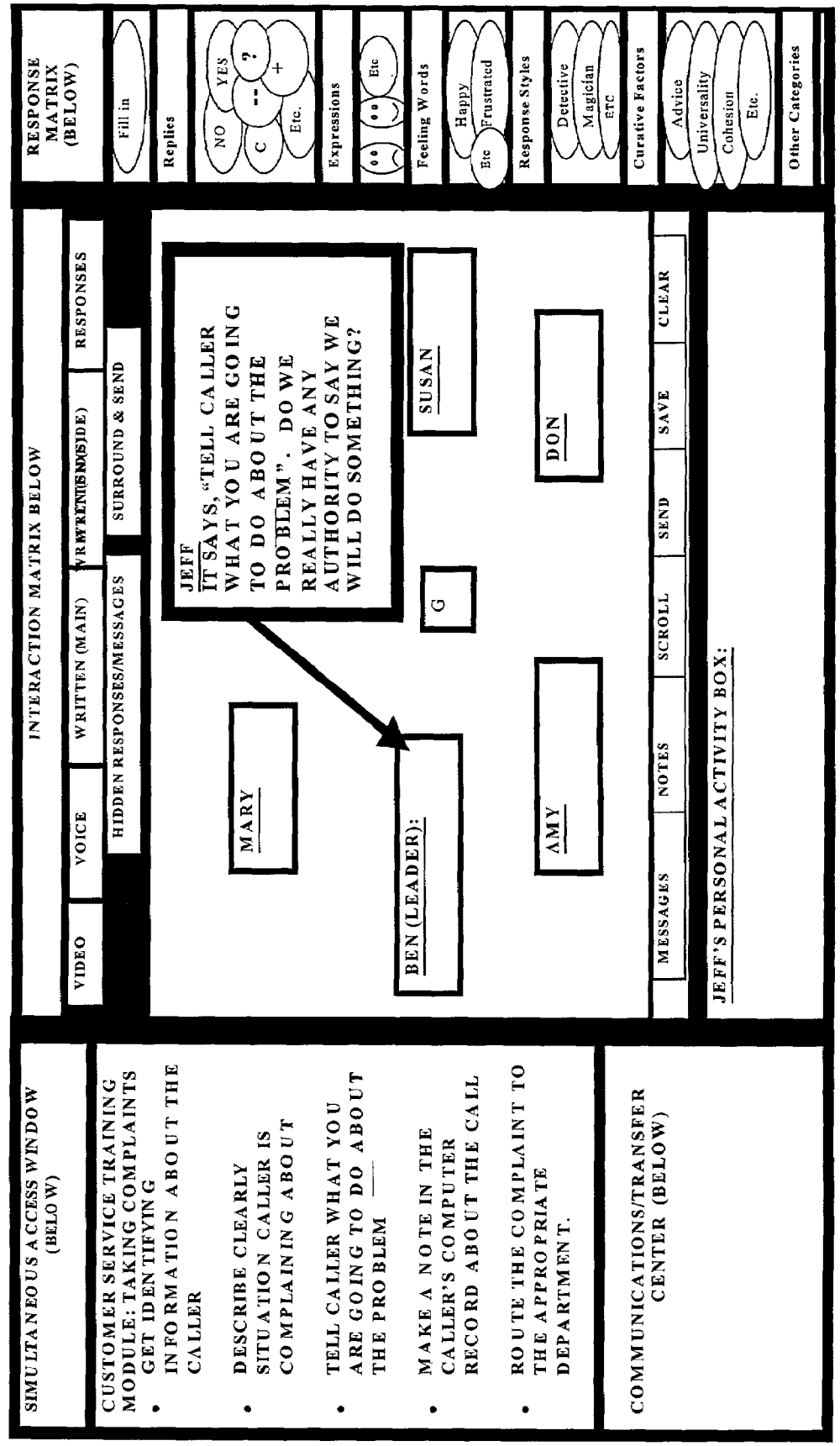

FIG. 6C shows the user's comment in his "seat"410-e on the interaction matrix 408 where he is asking the Leader, 410-a, a question related to the passage.

Counter Module: As shown in FIG. 1, the system 100 is provided with an activity counter 116 for counting the number and type of messages each participant sends or receives. For example, the Counter 116 may record that a particular user sent 5 voice messages, 3 hidden messages and 2 Responses during the meeting; and that she received 3 voice messages, 0 hidden messages and 5 Responses from others. The activity counter 116 further measures the amount of group time each member consumes ("air-time"). That is, with respect to Voice messages, a timer will record how long a particular participant speaks, as well as how long the participant is spoken to.

The counter feedback data is continuously recorded and sent to the statistical methods module 118 (FIG. 1) which analyzes the feedback data according to pre-programmed statistical methods, and reports of that feedback are sent to the participant and to the leader. For example, the data may be analyzed using Round Robin Analysis of Variance which determines whether there are Actor Effects (do some people talk more than others), Partner Effects (do some people elicit more talking than others), or Relationship Effects (do some people talk more to certain people than to others)?

Figure 7:
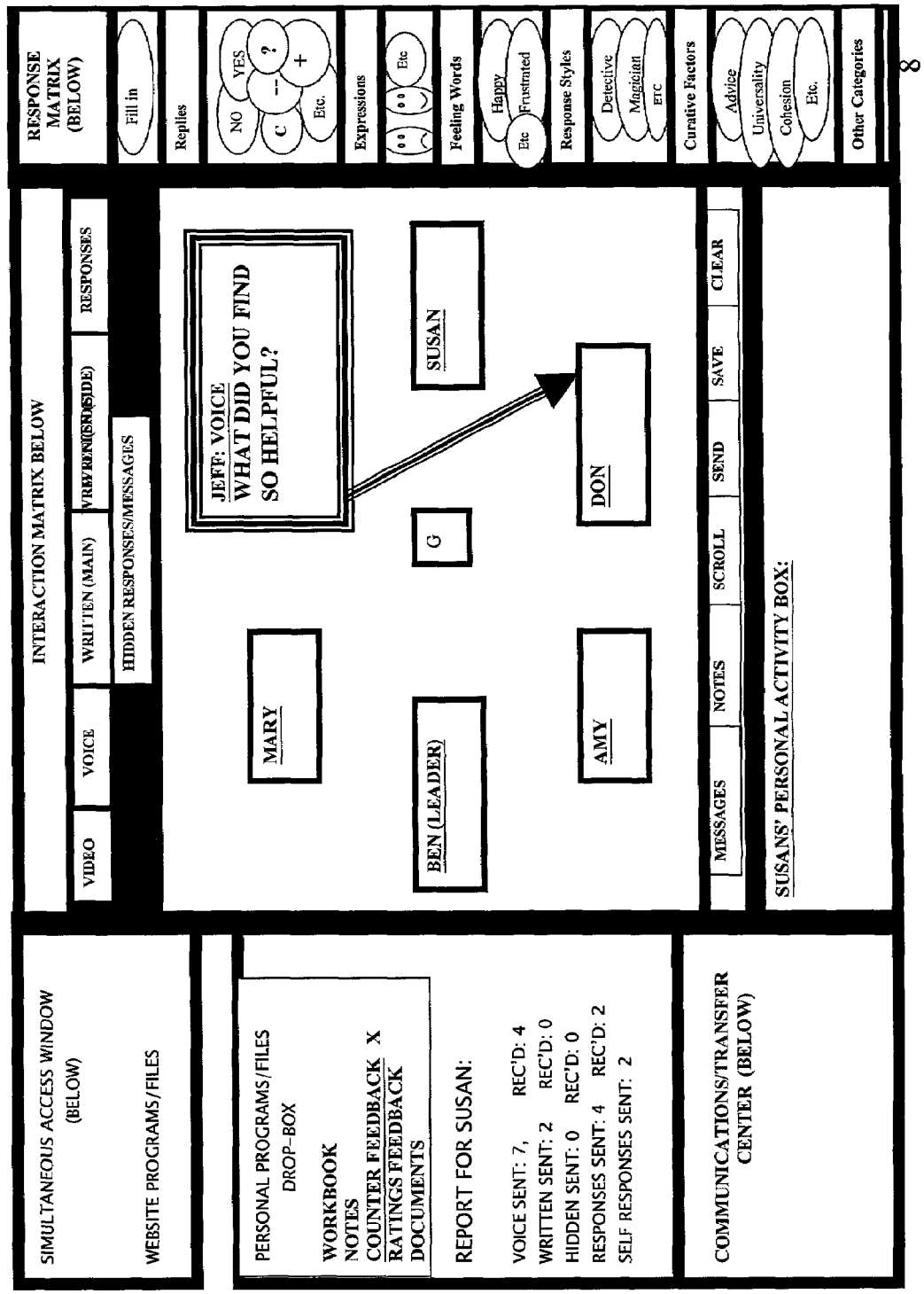
FIG. 7 is an example of a Member's Personal Report showing what messages that member has sent and received as measured by the activity counter.

The activity counter 116 report only provides information about that participant. The activity counter report may also provide averages so that the participant can compare his or her activity level with the average. The Leader Report provides the information about all participants. FIG. 7 shows a sample participant counter activity report in the simultaneous access window 406. This report could alternately appear in the Personal Activity Box 420 in the interaction matrix only configuration of the system.

Figure 8:
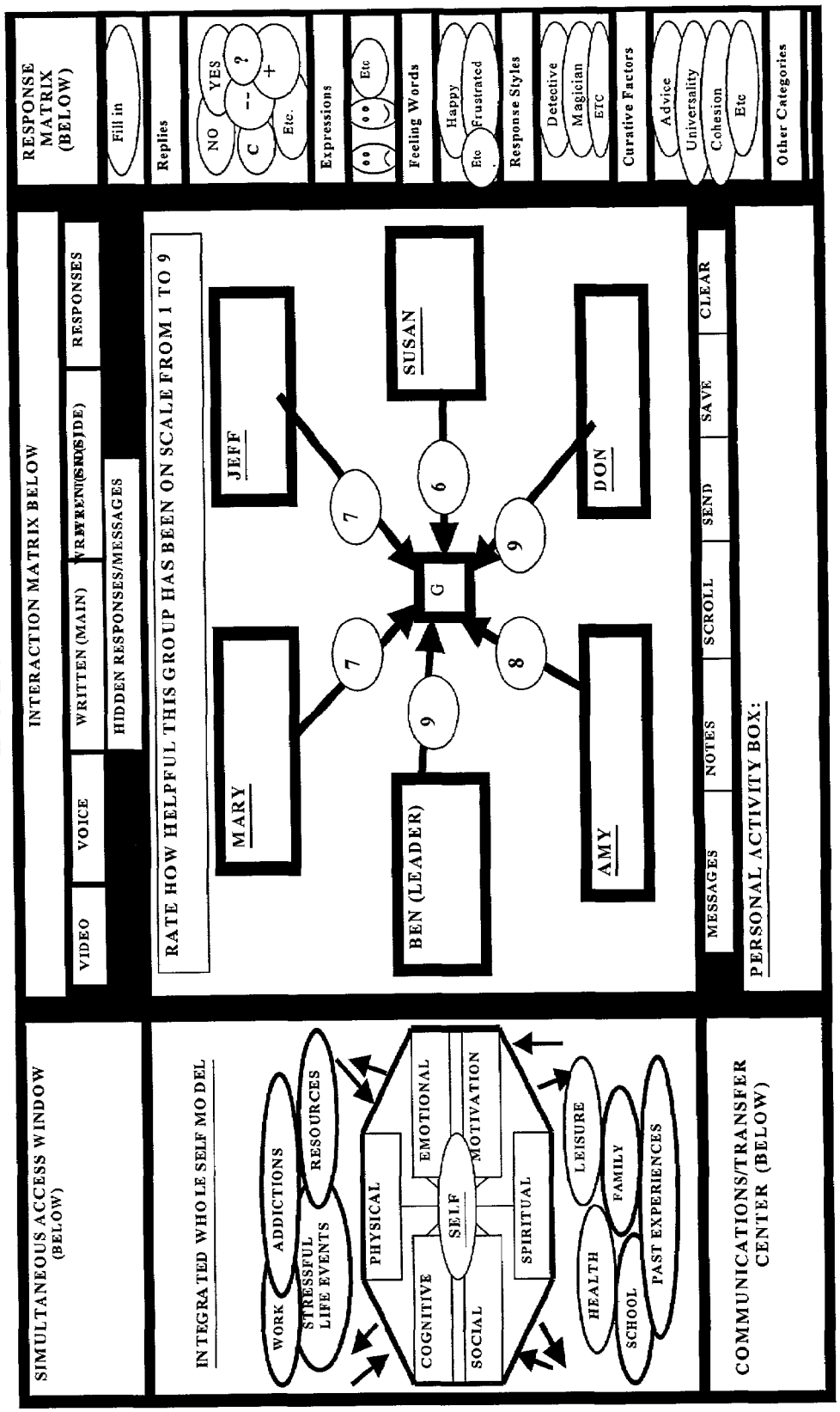
FIG. 8 is an example of a feedback template used by a group leader to enter a feedback question and provide a rating scale or a series of multiple choice responses.

Ratings Module: The system 100 may further include a rating module 120 (FIG. 1), which may be used by the group leader to solicit feedback from the group. The rating module 120 presents a special screen in the interaction matrix which prompts the leader to enter a feedback question and provide a rating scale or a series of multiple choice responses. For example, as shown in FIG. 8, the leader could write, "On a scale from 1 to 9, how satisfied are you with today's group meeting?" The Ratings Screen in the interaction matrix provides a place for each group member to make his/her rating. In the ratings screen, the entire group can see how each member has rated the question. This provides an excellent way for group members to obtain information about how other people are feeling and to compare his/her own ratings with the other group members.

All the ratings are sent to the Statistical Methods Module 118 to be analyzed according to pre-programmed statistical methods. Then reports are sent to the Leader and to each participant with results (e.g. your rating was 7, and the average rating on this question was 5).

Figure 9:
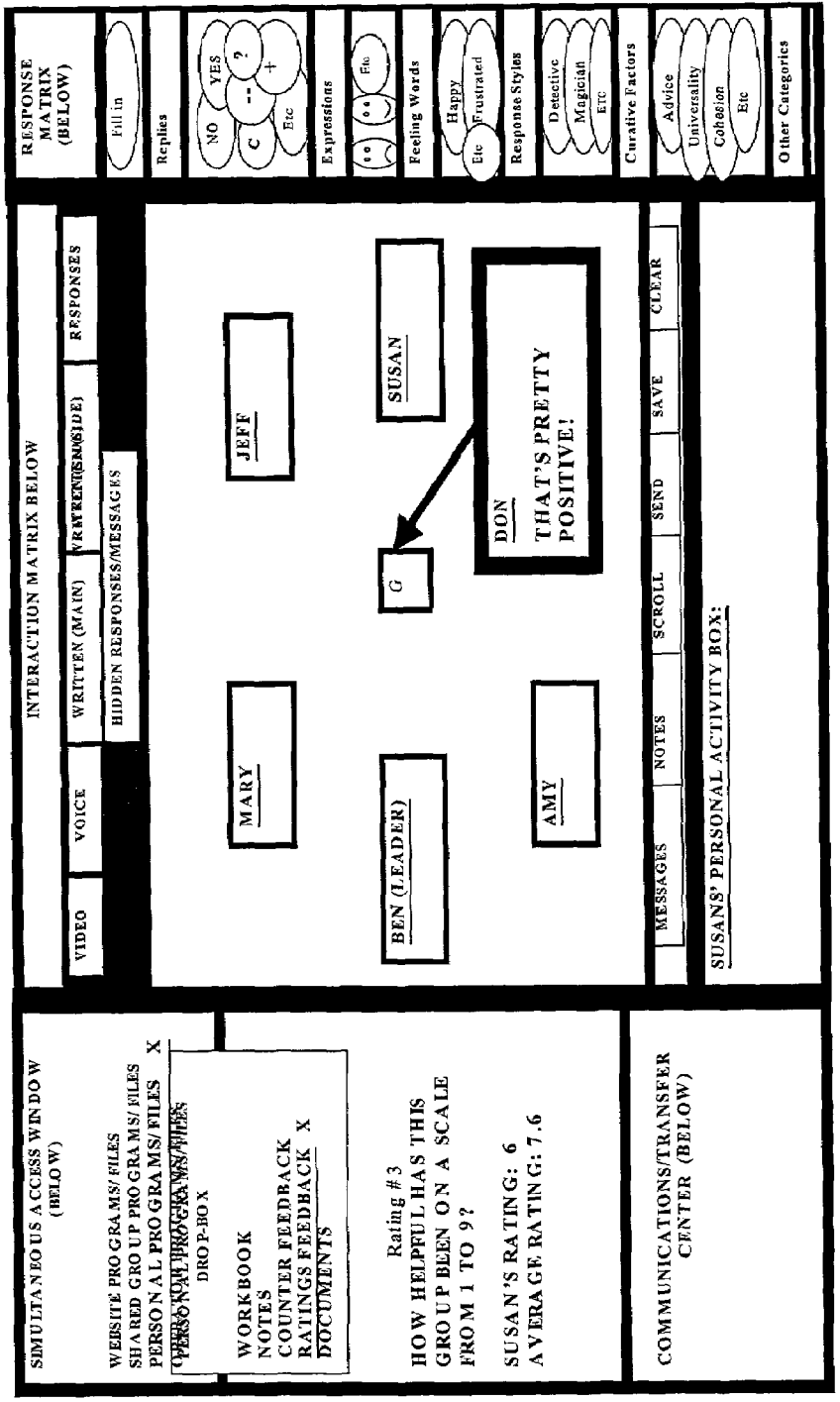
FIG. 9 is a sample Personal Feedback Report.

FIG. 8 shows the Ratings screen in the interaction matrix 408, and FIG. 9 shows a Personal Feedback Report in the simultaneous access window 406.

Recording Module

According to one aspect of the present invention, the system 100 includes a recording module 122 which provides the leader with the ability to record the communications (voice and text) and then re-play the communications and communications flows back to the group. The purpose of this feature is to allow group members to go through a training exercise (like a role-play) and then observe themselves after the role-play is completed through the playing back of the communications. This re-play technique is often used in teaching people how to do psychotherapy or how to improve interpersonal skills. It is very difficult to pay attention to oneself while in the process of role-playing or acting out other therapeutic techniques. This process can also be very helpful for teaching group process and dynamics to participants.

Simultaneous Access Window Block

The simultaneous access window 406 is an interface or window used to display programs and documents on the system. There are four categories of files that the simultaneous access window 406 displays: "Individual accessed" (personal) programs (like a user's personal on-line workbook); "shared group-specific accessed" programs (like closed chat-rooms, group bulletin board, participant "Bios" or homework assignment list); "Leader Accessed programs/files" (like controls for running structured group programs or setting interaction matrix controls); and "system-wide accessed" programs (like open access chat rooms, scheduler, or outside internet links). Each of these programs is explained in detail herein below.

The system 100 of the present invention allows a user to be participating in a group activity in the interaction matrix 408 while simultaneously viewing whatever documents are being presented in the simultaneous access window 406. When a group is in session and the group leader is presenting material in the simultaneous access window 406, that material appears in the Window for all group participants. The group leader has the controls to choose which programs are presented in the simultaneous access window 406. However, if a participant wants to access a different program than what is being presented, she simply clicks on the desired program in the drop-box of the simultaneous access window, and that selection then appears in the window, covering up what is being presented to the group as a whole by the leader. To return to the group presented material in the simultaneous access window 406, she simply closes the file.

The simultaneous access window 406 can present many different types of materials, including any document file, PowerPoint presentation file, video clip, digital photographs, and the structured group programs of the present invention.

It should be noted that the ability to "see" the group members with whom one is interacting through the interaction matrix 408 while also viewing shared documents or presentation materials in a closed virtual group meeting room is unique to the present invention. Also, the ability to access programs and files in the simultaneous access window 406 without having to leave the group discussion in the interaction matrix 408 is also a unique aspect of this invention.

Assessment Module: The system 100 may optionally include an assessment module 124 (FIG. 1) which enables group members to complete assessment tools in the simultaneous access window 406, have these measures analyzed, and reports sent to the leader and participants.

These assessments may be standardized measures of some variable (e.g., the Beck Depression Inventory), or they may be questionnaires that have been made up by the group leader (or programmed into the structured group program). These questionnaires or standardized assessment tools are presented in the simultaneous access window 406. The participant "fills out" the assessment tool by, for example, entering answers with the keyboard 300. The data from these assessments is analyzed by the Statistics Methods Module 118 and feedback reports are provided to the group leader.

Optionally, the feedback reports may also be provided directly to participants. Other times, the leader shares results with each participant individually or through the within group e-mail system. The assessment module 124 and/or the Statistical methods module 118 may be programmed to score any particular assessment measure, monitor and perform any desired statistical manipulations on the data retrieved.

Figure 16A:
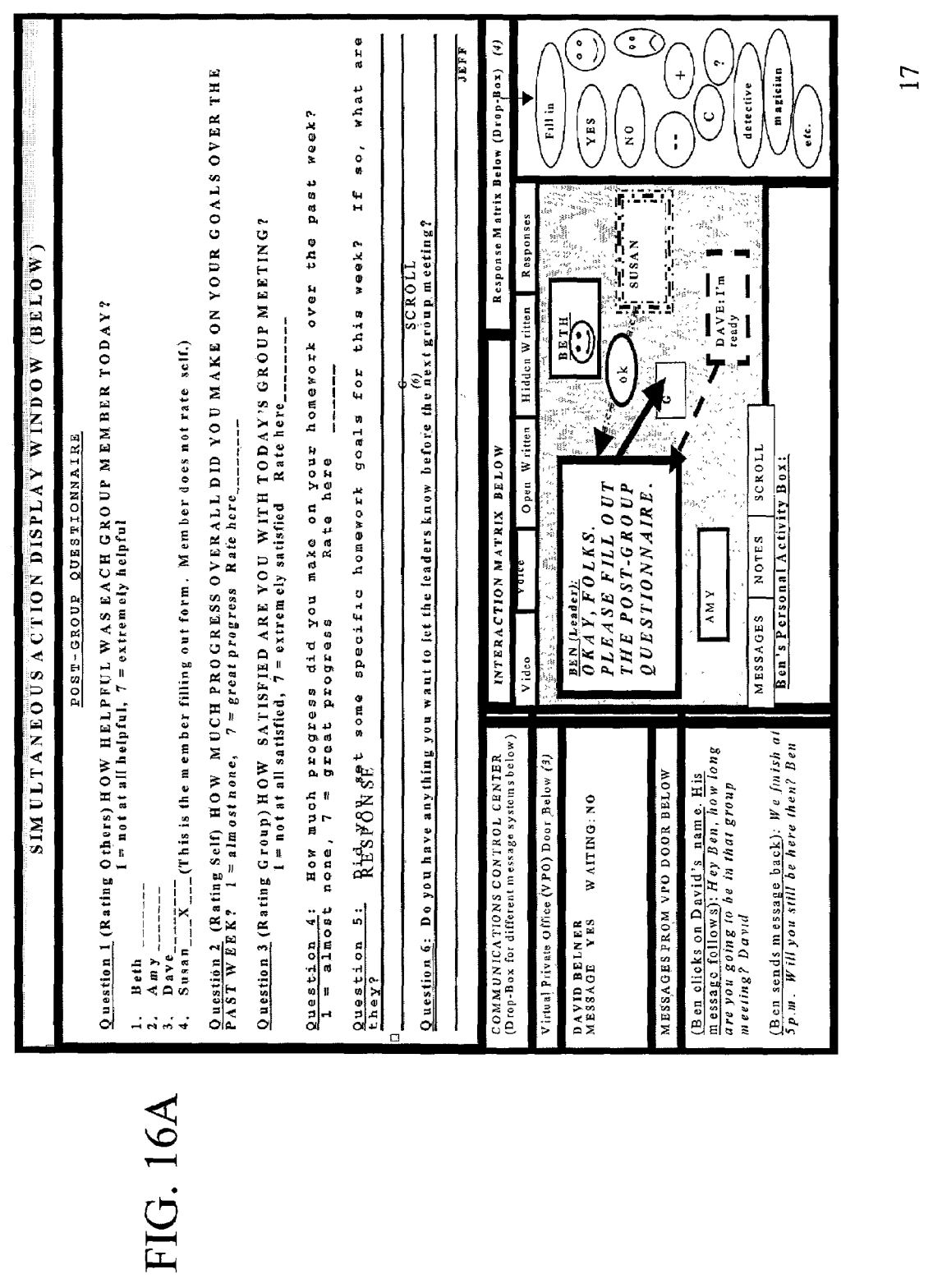
Figure 16B:
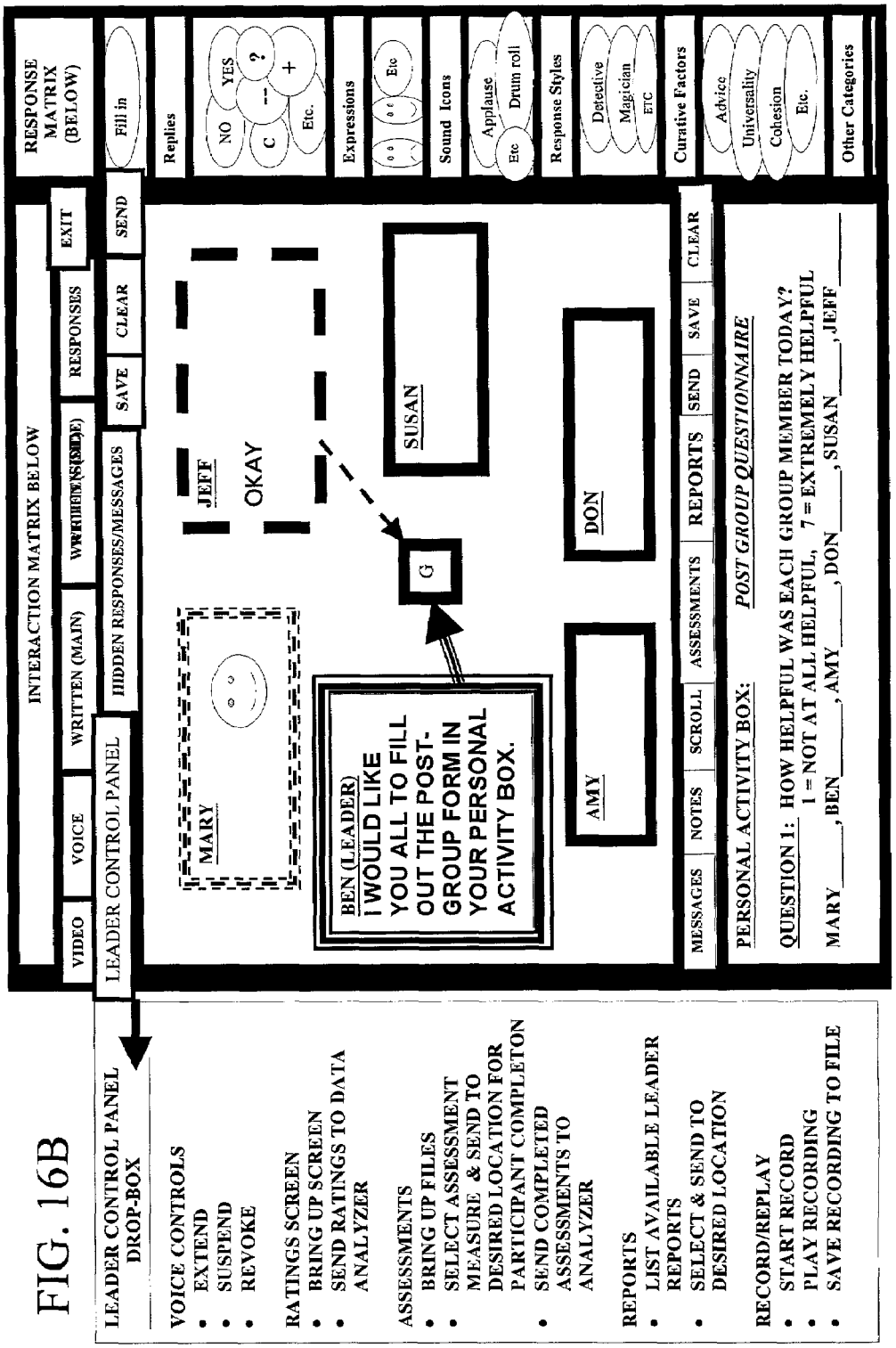

An example of an assessment measure presented in the simultaneous access window 406 is the Post-Group Questionnaire (FIGS. 16A, 16B). This instrument asks group members to rate their feelings toward other group members, among other things. But the Post-Group questionnaire may also include written answers that are organized in a special report for the Leader of the group. Examples of questions requiring written answers might include, "Is there something that you feel is holding you back from accomplishing your goal?," or "What was the most important feedback you received today in the group meeting?" The purpose of the assessment module 124 is to provide a way for individual assessment of each participant which is not viewed by other group members (as is the case with the Ratings screen described earlier).

FIG. 16C, shows an example of the Leader's Post-Group Feedback Report. The report provides information about group rating data about how close each group member feels to every other group member (Question 1). The data is arranged in a response grid which can be analyzed using Round Robin Analysis of Variance to determine whether there are Actor Effects (individual differences in how close each group member tends to feel towards others, Partner Effects (individual differences in how close other group members tend to feel toward each group member—how much "closeness" each member elicits), and relationship effects (are there special adjustments that members make in their usual level of closeness depending upon the person they are reporting about?). The Leader's Feedback Report from the Post-Group Questionnaire also summarizes written answers to questions by all the group participants.

The assessment module 124 allows the group leader to assess progress of each participant according to standardized measures. The information retrieved from assessment measures (e.g. the Post-Group form) can also help to guide future interactions in the group. For example, if a member has stated on a post-group form that she would really like to get to know a specific member of the group better, then the group therapist, knowing that information, could facilitate interactions between the two group members in future group meetings.

Virtual Meeting Place (Office): As noted above in the Background of the Invention, many businesses would like to be able to hold meetings and seminars over computer networks. However, currently available systems for holding meetings have a number of problems. The system of the present invention solves the problems associated with holding business meetings over computer networks. Specifically, the system allows the meeting participants to "see" each other in the interaction matrix 408 while simultaneously viewing presentation materials together, working on shared group documents, and moving from one virtual meeting space to another to meet the demands for attending multiple meetings in disparate locations.

Figure 17B:
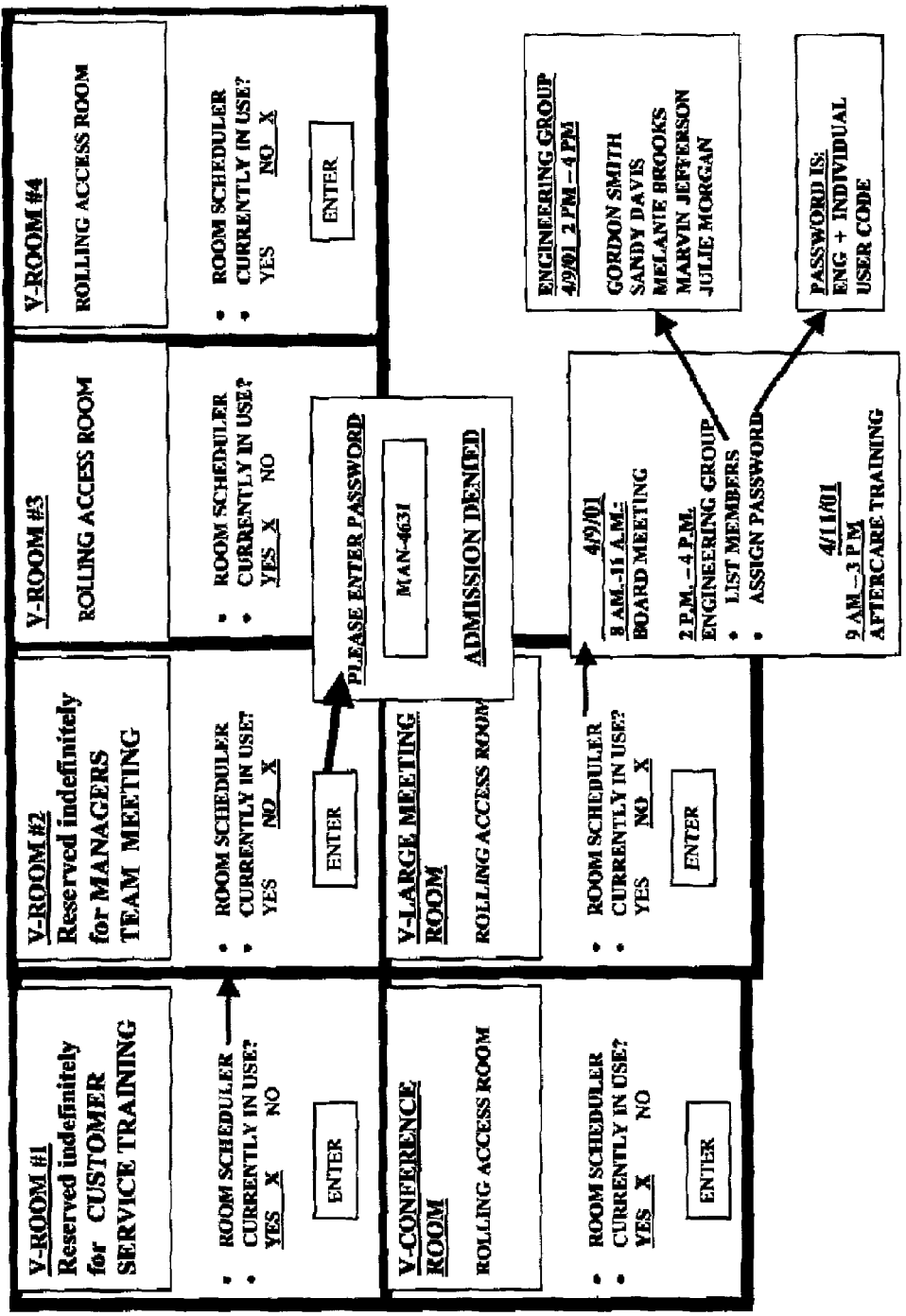

Notably, the system 100 may include a shared virtual meeting place module 126 providing a plurality of virtual meeting rooms. The virtual meeting rooms may be public or limited access (password protected). If desired, the shared virtual meeting place module 126 may include a virtual floor plan (FIGS. 17A, 17B) graphically depicting a plurality of virtual rooms, showing which rooms are occupied, and which rooms are available, and then clicking the "Enter" button 181 to enter the selected virtual group meeting place. Following is an example that will be used to explain this feature in detail. The system 100 is also equipped with a Room Scheduler 128 (FIG. 1) which allows users to schedule the available virtual rooms ahead of time and indicate the persons who are scheduled to participate in meetings held in the virtual rooms. Rooms may be reserved so that people working on a long term project may come in and out of the virtual room over time. In that case, the room would be scheduled for a block of time.

Figure 18:
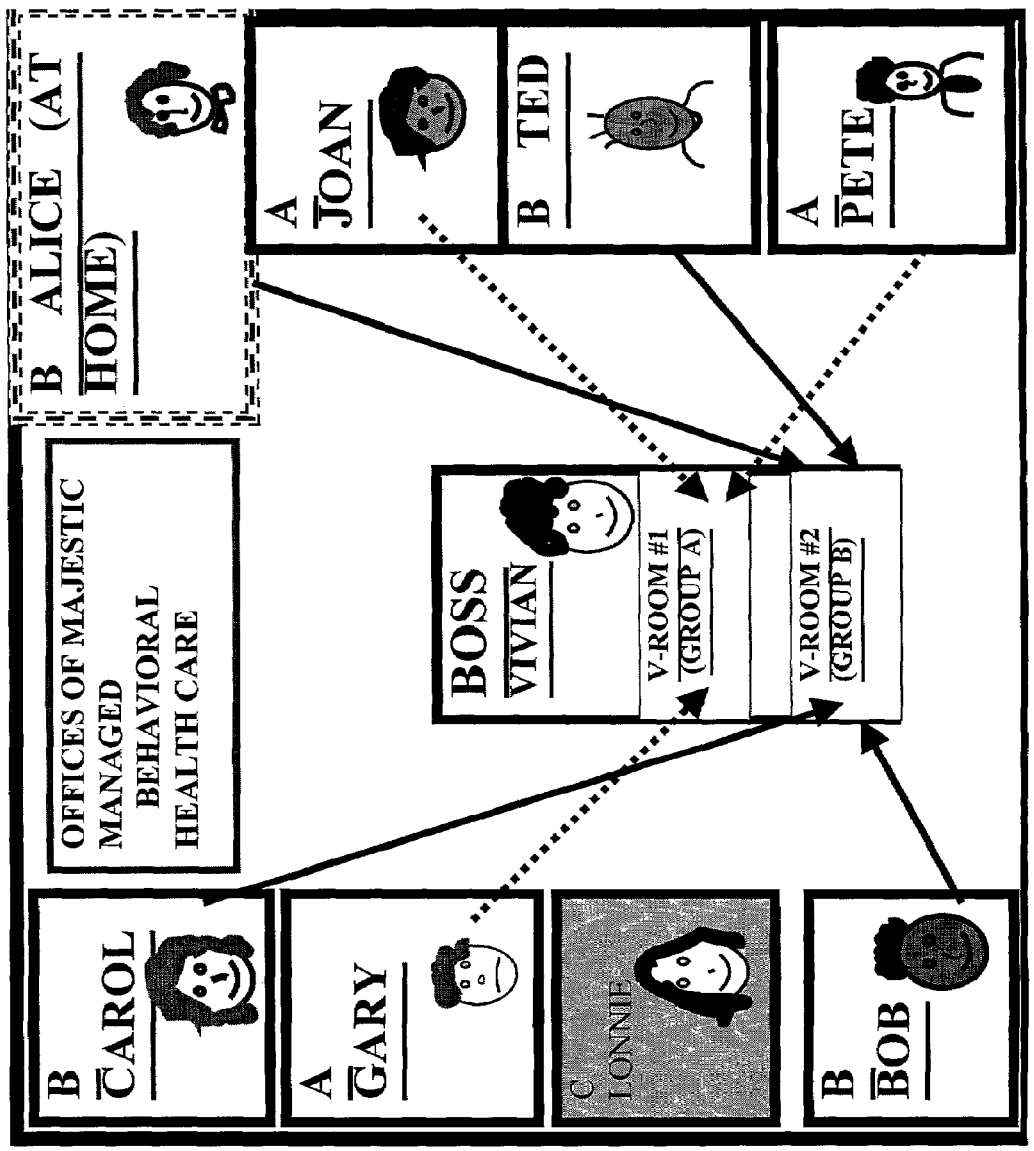
FIG. 18 is a sample layout of an office depicting employees in cubicles who will be entering two different virtual meeting rooms on the system.

The virtual meeting place feature of the present invention will be better understood with reference to the following example in which a managed behavioral healthcare business. FIG. 18 shows a group of employees (Carol, Gary, Bob, etc.) scheduled to attend one of two concurrent meetings ("A" Group and "B" Group"), and a boss (Vivian) monitoring both meetings.

The "A" Group (meeting in Virtual Room #1) is working through a structured group program on Customer Service. The "B" Group (meeting in Virtual Room #2) is having a team meeting focussed on claims processing.

To access a particular meeting, a user simply clicks on the "enter" button 181 for that virtual meeting place.

Viewing Presentation Materials Together

Figure 19:
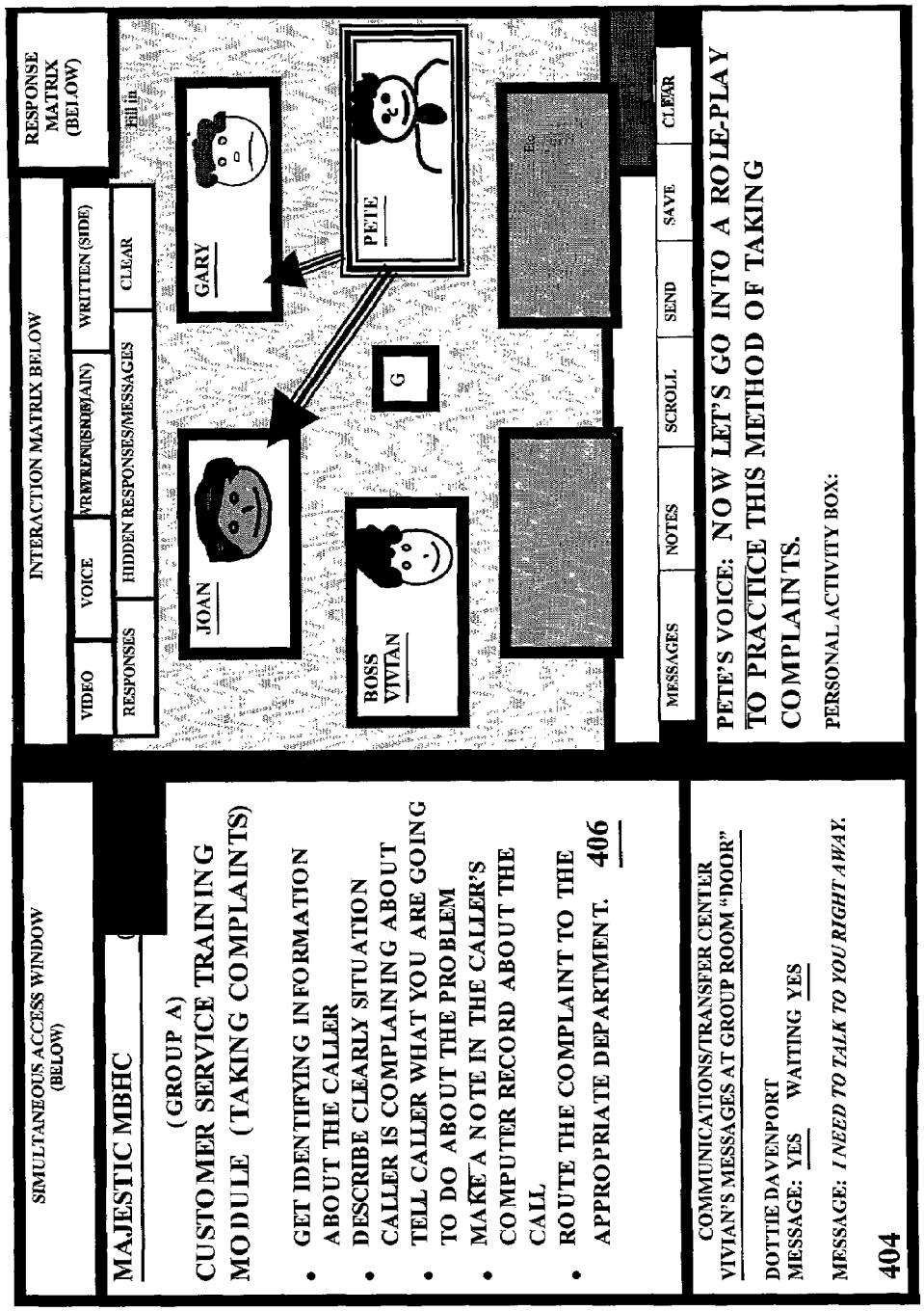
FIG. 19 is a screen print showing a group viewing presentation materials together in the shared access window.

As shown in FIG. 19, a group is viewing presentation materials together in the simultaneous access window 406 while participating in the group interaction matrix 408. In the example depicted, Group A is working through a customer service training program on "Taking Complaints". This training program advises the customer service representative to get identifying information about the caller, among other things. The participants discuss these materials in the interaction matrix 408 and are directed to try a role-play in order to practice what they have learned about taking complaints. The ability to view presentation materials together in the simultaneous access window 406 while discussing them in the interaction matrix 408 makes the system 100 of the present invention ideal for providing employee training programs, academic courses, and self-improvement groups. The material that is presented may be any type of documents, video clips, films, digital photographs, PowerPoint presentations, or the structured group programs of the present invention.

Figure 20:
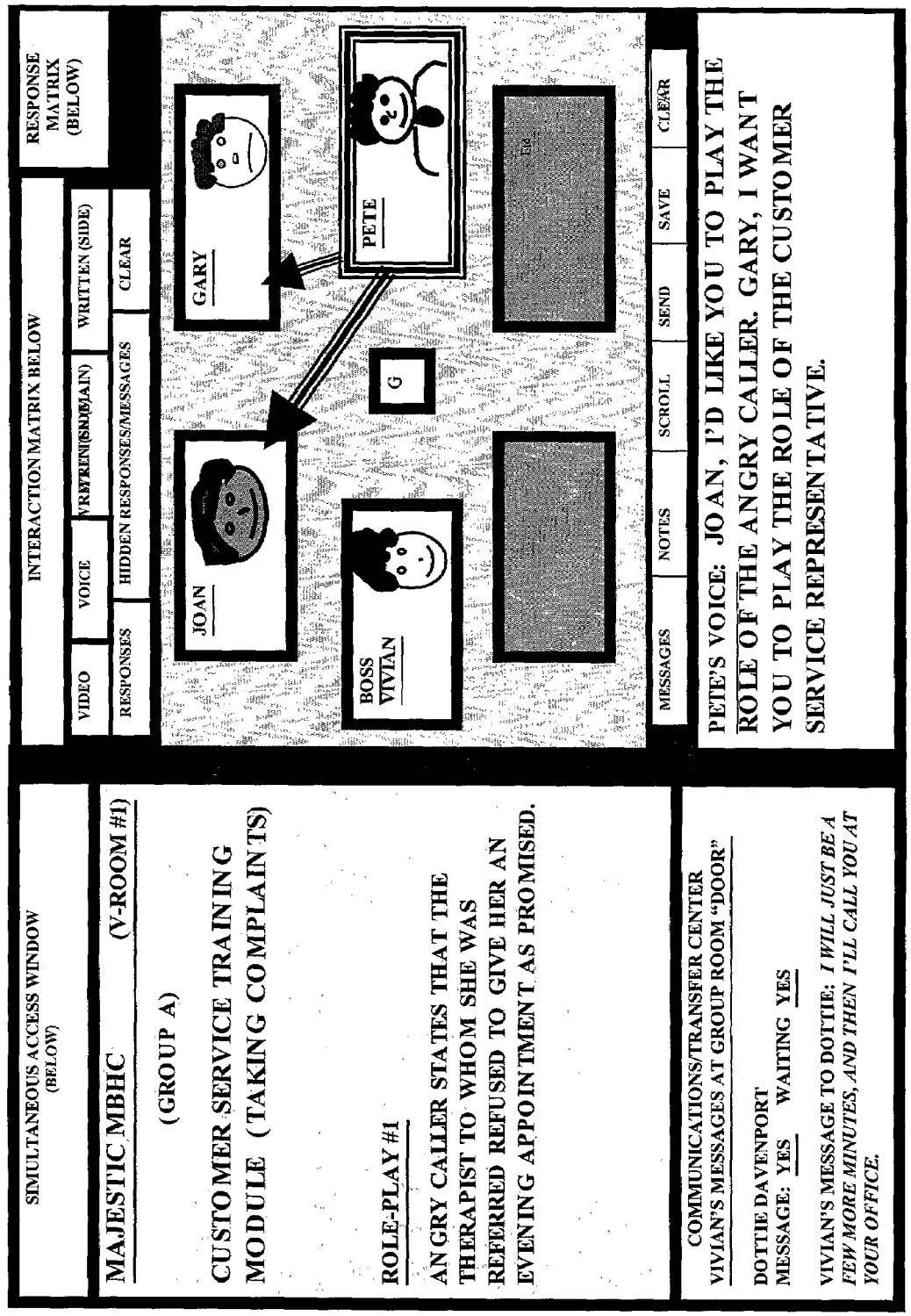
FIG. 20 is a screen print showing group members viewing a role-play exercise while discussing it in the interaction matrix.

In FIG. 20, a Complaint exercises program is displaying Role Play #1 in the simultaneous access window 406. In the example provided, Pete is speaking in the interaction matrix 408, saying, "Joan, I'd like you to play the role of the angry caller. Gary, I want you to play the role of the customer service representative."

Figure 21A:
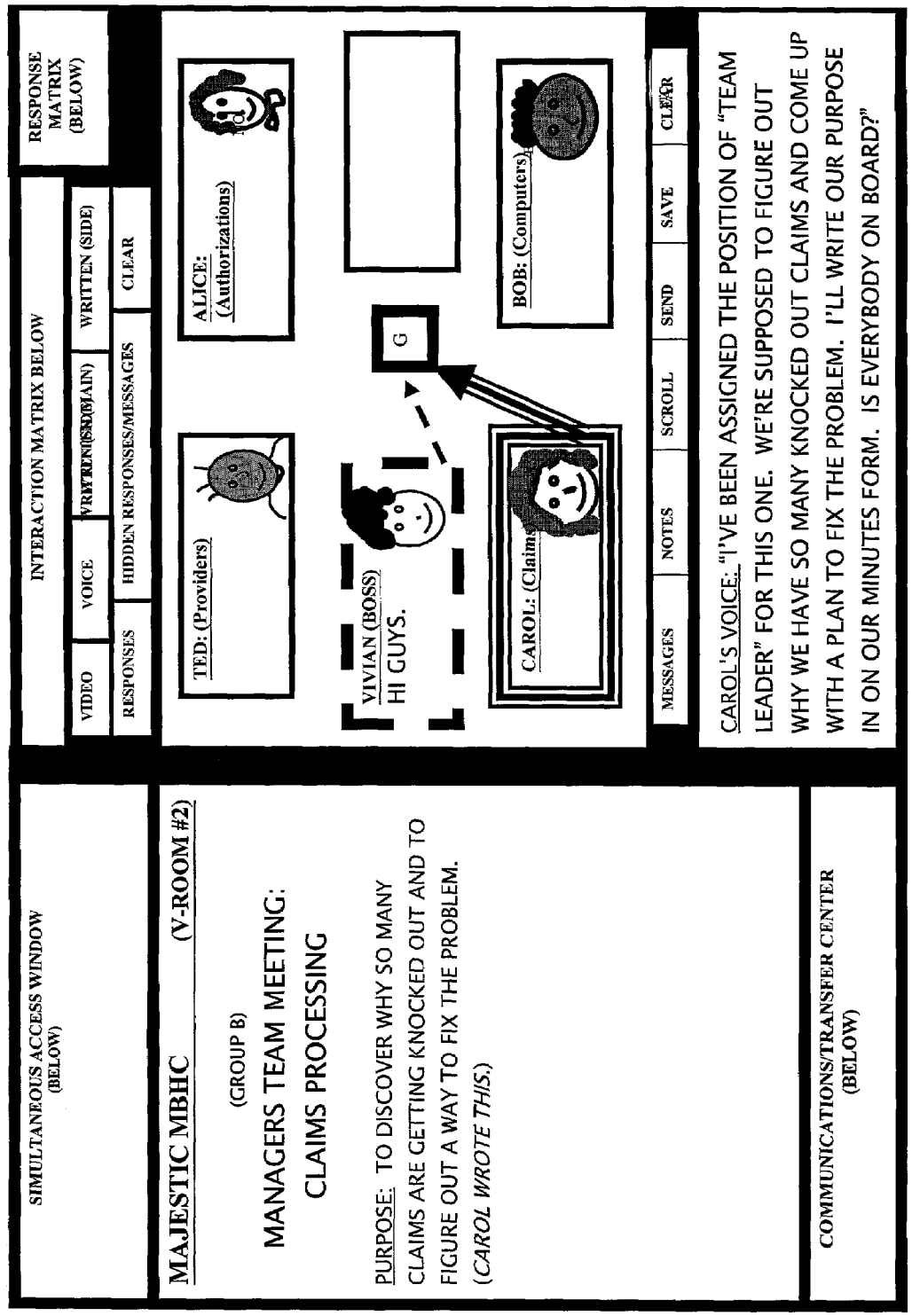
FIGS. 21A and 21B are screen prints showing group members working on a shared document while discussing it in the interaction matrix.
Figure 21B:
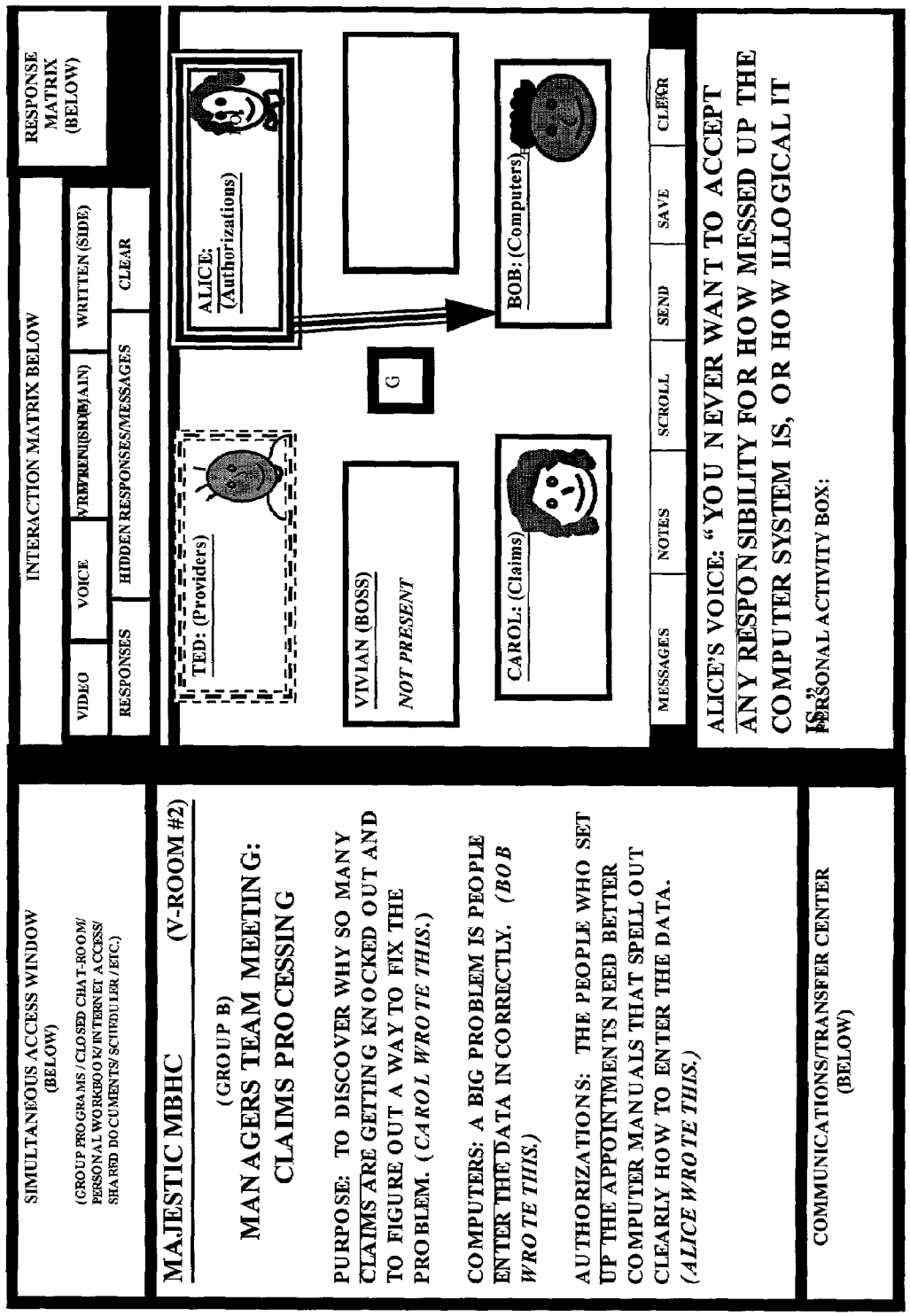

FIGS. 21A and 21B show that Group B is working on an action plan for improving claims processing in the Company. Writing the action plan requires that the group use the shared document feature of the simultaneous access window 406 which enables a group of members to view a document being edited by one of the members while simultaneously communicating via the interaction matrix 408.

Communications Control Center Block

The communications control center 404 provides access to a number of features including a Virtual Group Room "Door" Messaging Feature, and an Observer Window Feature.

The Virtual Group Room "Door" Messaging Feature enables the group leader (or Operator) of the system to receive messages from visitors without having to exit any group activity in which he/she is participating.

This feature is illustrated in FIG. 19, which depicts members of a managed behavioral healthcare company in a meeting. As shown, a given member, Vivian, has received a message through the Communications Center at her office "door". She sends a message back to the person at the "door" and decides she needs to leave the meeting.

If the facilitator/leader is present and chooses to invite the visitor into the virtual group meeting room, then the Operator clicks on the visitor's name, then selects "TRANSFER" from the menu in the Communications Center 404, and finally on the "seat" 410 in the interaction matrix 408 where he/she wants that visitor to go. The visitor has then entered into the group room interaction matrix 408 and is able to communicate and share documents as if they were actually in the same room together. Moreover, an occupant may have plural visitors simultaneously. However, they must be transferred into the interaction matrix 408 one person at a time. (Or alternately, they may enter the group room by password.)

Observer Feature: According to another aspect of the invention, the system 100 may include an observation feature, whereby the group leader (facilitator) may permit visitors to observe group interactions. Optionally, the visitors would be invisible to the group, and only able to communicate with the leader, with communications between the visitors and the leader being invisible to the group. The observer feature allows the leader/operator of the program to create a virtual "observation window" for people who want to learn about group processes. This feature also makes it possible to have rolling membership to open chatrooms or structured group meetings.

The preceding examples clearly demonstrate the system's significant advantages for business. Specifically, the system allows businesses to hold meetings in virtual spaces while being able to "see" all the participants, to view presentation materials together, and to share group documents. There is no currently available teamware or telephony system that provides these unique and useful features.

Method for Providing Structured Group Programs

As discussed above in the Background of the Invention, there are serious limitations to the current methods of providing structured group programs (or skills training programs) over computer networks, as well as problems with existing methods of computerized group discussion in general.

The system 100 of the current invention overcomes many of the shortcomings of conventional systems by:

Organizing Material Presented in Group Programs;
Teaching Group Communication Skills and Providing Opportunities for Practice;
Giving and Receiving Appropriate Feedback;
Strengthening Group Cohesion;
Providing a Place for Keeping Personal Records and Materials;
Providing a Setting Where Group Participants Can View Presentation Materials Together;
Providing Ways for Group Members to Work Together Outside of Regularly Scheduled Meetings;
Providing Tools for Group Leaders to Manage Group Process; and
Providing Website or System-Wide Programs (like a Scheduler/Matcher, a Resource Directory, a Professional Leaders Registry, Open Access Bulletin Boards and chatrooms, etc.) to meet the needs of the general population accessing the group services delivery system.

Each of the above-listed components of the system of the present invention for providing structured group programs over computer networks is described in detail below.

Organizing Material Presented in Structured Group Programs

The system provides organization through the structured group programs it offers. The structured group programs of this system consist of presentation or lecture materials, special training exercises, group prompts, response matrix vocabularies, assessments & feedback measures, and an on-line workbook all related to a specific topic. Thus, presentation materials are organized and presented in a way that is unique to this system.

For example, a structured group program focused on the topic of improving social skills may include lecture material about what the different types of social skills are (like making a request, saying "no", or meeting someone new). The Training Exercises in this social skills program might present different social situations to participants and have them practice assertive responses. The response matrix 412 in this social skills program could be customized to include a list of things to consider when responding assertively in those situations (like what are your objectives, what is the relationship, what are your rights, etc.). The social skills program may have a Social Anxiety Assessment Inventory as part of the program to help give the leader and the participant information about changes in social anxiety as the program progresses. Further, the social skills program workbook could provide homework assignments that instruct participants to seek out challenging social situations in the real-world, practice newly learned skills, and keep track of all of the challenging situations they encountered and how they handled the situation, and report back to the group.

Teaching Group Communication Skills and Providing Opportunities for Practice

The system 100 provides a convenient way of teaching group communication skills and providing opportunities for practice through the group training exercises, group prompts, and modifications that can be made to the response matrix vocabulary list. FIGS. 24A and 24B show sample materials for an interaction training manual.

The set of group training exercises provide opportunities for practice by listing different role-play situations for group participants to act out during group meetings. In addition, the items of the response matrix 408 can be programmed to correspond with specific training exercises. For example, one training exercise teaches people about different ways of responding to different types of statements by another person. One such statement that is included in the role-play exercises is, "I spent all that time interviewing and negotiating for that job, and now they say there isn't even a position any more." Some of the types of responses, also provided as items in the response matrix under the heading "Response Styles", include the detective style, the foreman style, the magician style, and the swami style. By practicing different response styles, participants learn about their own styles of responding, their reactions to the responses they hear from others, and possibly, which new responses they wish to incorporate into their repertoire.

The list of prompts is a list of statements, (typically prepared by the Leader), that may help facilitate group interaction or acquiring new skills related to the topic of the program. The following are examples of Prompts:

"It seems like things are happening very fast. Why doesn't someone summarize what has happened over the past 5 minutes."

"The group seems to be breaking up into several different segments, with several people forming a sub-group. What do you think that is about?"

"What do you think is getting in the way of your following through on your plan?"

If a user clicks on the list of Prompts and wants to use one of the statements in the ongoing group discussion, all she has to do is copy the statement to her Personal Activity Box 420 where it can be edited and then sent as a message in the Interaction matrix 408.

Giving and Receiving Appropriate Feedback

The system provides ample sources of giving and receiving appropriate feedback. As discussed in an earlier section, participants rate their satisfaction with the group via the ratings module 120 (FIG. 1). This data is analyzed by the statistical methods module 118 and feedback is provided to each participant in Personal Feedback Reports (discussed previously). Information about each participant's activity level in the interaction matrix 408 is recorded by the activity counter 116 and reported to participants and the leader in feedback reports (discussed previously). Special assessment measures can be given to all group participants, then scored by the Assessment Module 124, and reported to the Leader and the participants (discussed previously).

Strengthening Group Cohesion

The system 100 provides several features that strengthen group cohesion, or attraction for the group. Limited Access Virtual Meeting Rooms (Closed chat-rooms), blackboards and bulletin boards provide opportunities for group members to interact more frequently than is provided during scheduled meetings alone. More frequent positive interactions lead to greater group cohesion. In addition, the system provides a method for group members to be reminded about all of the other group members, as well as what their goals might be, and what homework they are currently working on. Having more information about group participants helps to strengthen group cohesion as well.

A bulletin board module 142 (FIG. 1) allows members of the group to post various articles or updates for the group. Preferably, access to the virtual bulletin board is limited to only the specific members of the group. FIG. 26 shows a sample screen print of a group viewing a closed bulletin board during a group meeting.

Figure 27A:
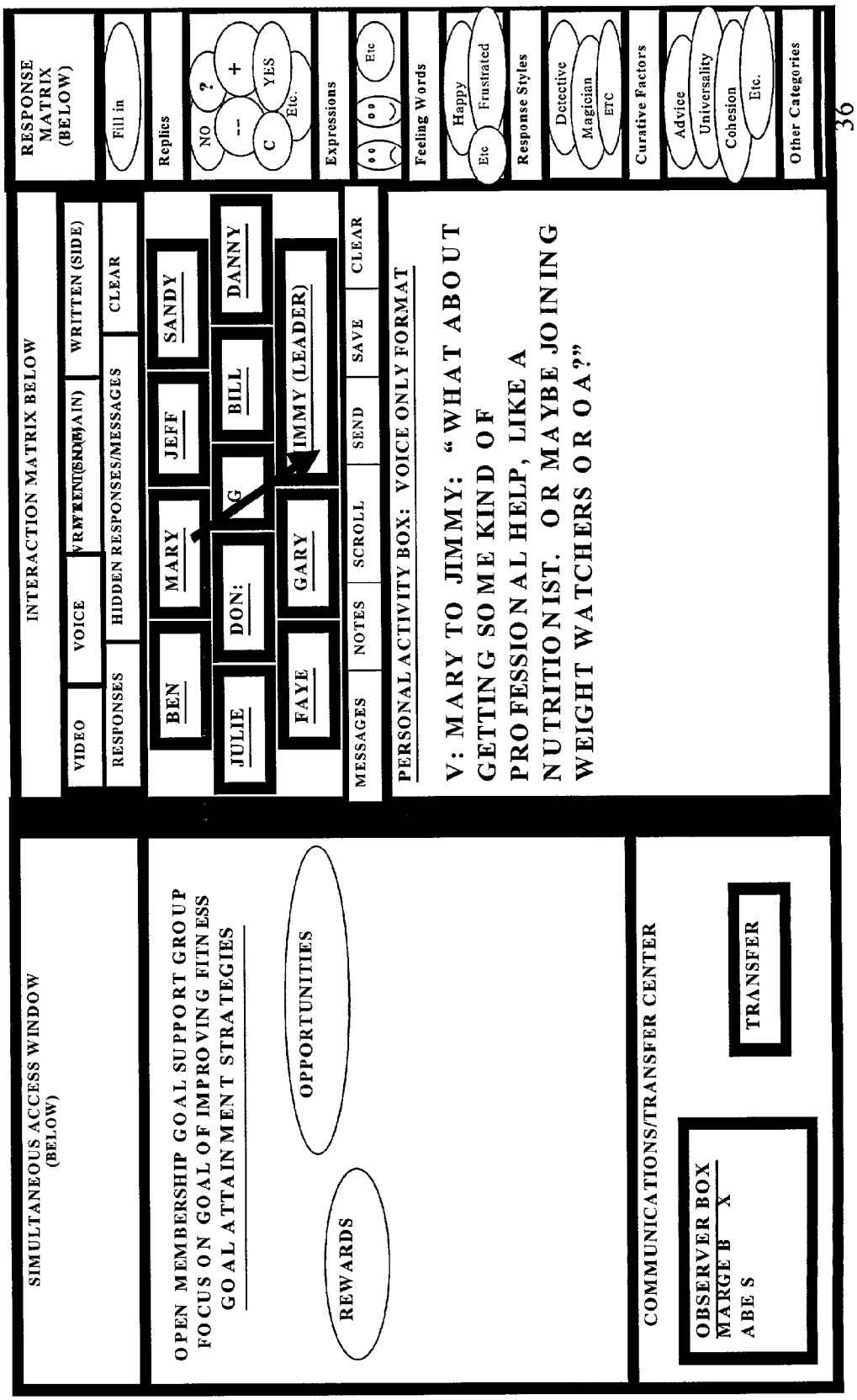
FIGS. 27A and 27B show sample screen prints of a group using a chalkboard during a group meeting.
Figure 27B:
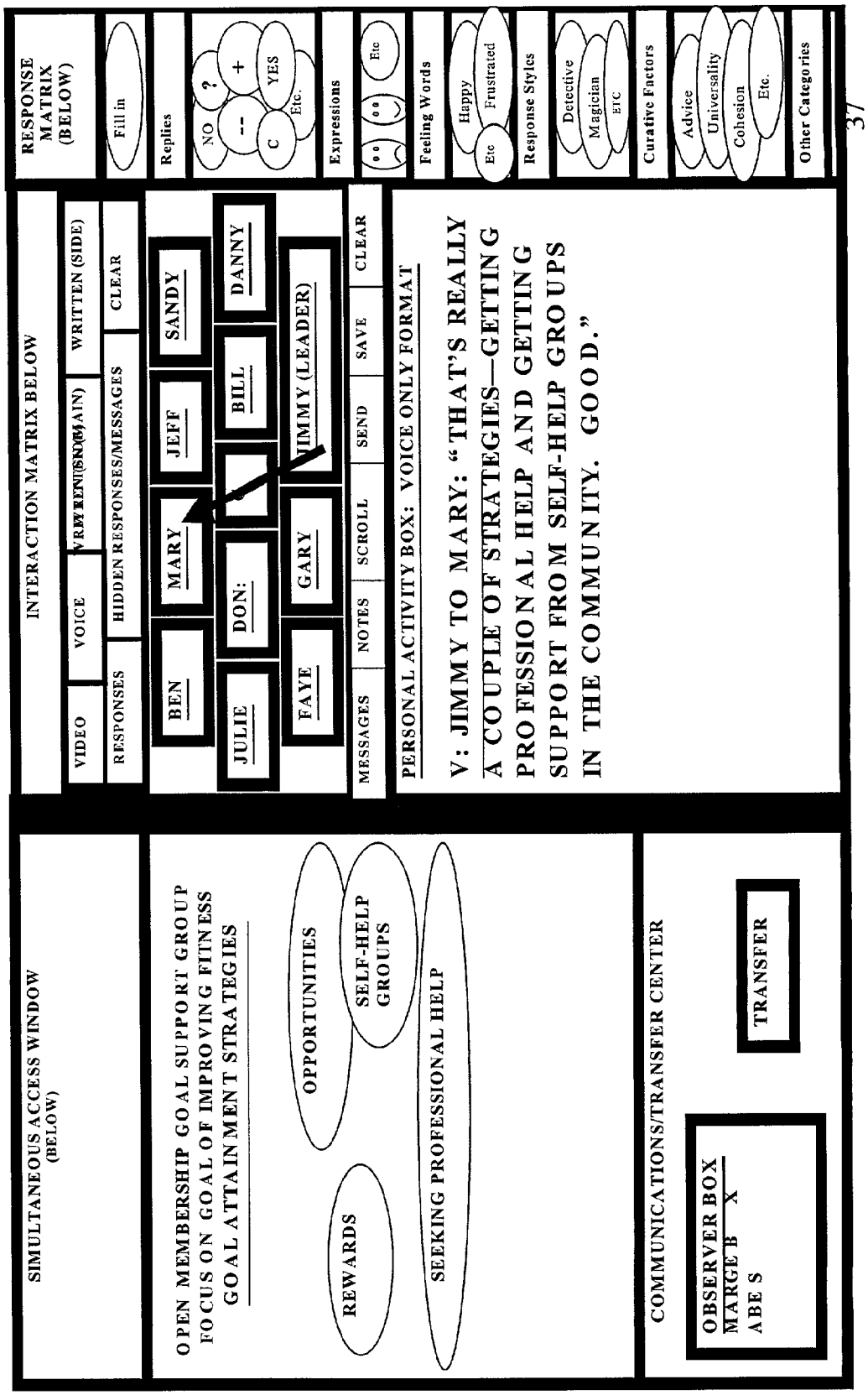

A chalkboard (blackboard) module 140 (FIG. 1) allows group members to draw on a virtual chalkboard screen with a pointing device such as a mouse or a light pen. FIGS. 27A and 27B show sample screen prints of a group using a chalkboard during a group discussion.

Both the bulletin board and the chalkboard can be accessed while the participant is participating in a group activity in the interaction matrix 408. Participants access the bulletin board and chalkboard (blackboard) by clicking on the "shared group access" file in the simultaneous access window 406.

Providing a Place for Keeping Personal Records and Materials

The system 100 includes a journal module 130 for storing and accessing personal records and materials.

The individual records or programs of the present invention include such things as the on-line work-book, personal notes, personal documents, attendance records, and personal feedback reports.

According to a presently preferred embodiment, the system 100 provides each participant with an on-line workbook for each structured group program. The on-line workbook may be accessed during group meetings through the simultaneous access window 406 without having to exit the group process.

The on-line workbook may consist of exercises, charts to monitor progress, a place to keep track of homework assignments, and a record of all the personal Feedback Reports received during the program. FIGS. 23A and 23B show sample on-line workbooks according to the present invention.

The system 100 includes a predefined (default) on-line workbook for all structured group programs. If desired, the on-line workbook may be customized by the group leader. Or completely new workbooks can be constructed and stored for later use on the system.

Providing a Setting where Group Participants can View Presentation Materials Together As discussed in a previous section, the simultaneous access window 406 provides a way for group members to view presentation materials together. These materials can be specially programmed to focus on a particular topic area. The presentation materials may consist of documents, video clips, PowerPoint presentations, live lectures, group training exercises, and special bulletin closed board materials.

Providing ways for Group Members to Work Together Outside of Regularly Scheduled Group Meetings The system provides two important ways for group members to work together and communicate outside of regularly scheduled group meetings: closed group meeting rooms (provided by virtual meeting room module 126) and within group e-mail system.

The closed group chat room feature allows the specific members of the group to use the system even when a regular group session is not scheduled. Thus, group participants are provided with a virtual meeting place where they can work on shared documents or projects and where they can communicate with each other in the interaction matrix 408 at all times.

According to another aspect of the present invention, a within group e-mail module 132 (FIG. 1) is provided to enable group members to send e-mails to other members of the group without having to exit the group interaction matrix 408. For example, if Don wants to send a within-group e-mail to Jeff, he simply clicks on e-mail, then on Jeff's name, then a box appears in the Simultaneous Access window 406, where Don can write the e-mail, and send to Jeff.

The within group e-mail system 132 is especially practical when a participant is working on a group project and realizes she has a question for a particular group member who does not happen to be in the closed chat room while she is there. In that case, she simply clicks e-mails the message without having to leave the interaction matrix 408.

Within group e-mail as a component of the overall system is also important for the Leader in particular. The Leader will often write notes to each group member at the end of a group meeting. These notes may be responses to questions that participants have asked on the Post-Group questionnaire. Or the Leader may simply want to ask the individual participant a question about his reaction in the group (ex parte communication, so to speak).

The within group email system 132 plays an important role in facilitating communication between members of a closed group who want to communicate anonymously, withholding information about their identity and regular email address from the group members. It is a common practice to engage in on-line discussion groups and chatrooms while remaining anonymous. The within group email system allows members to communicate outside regularly scheduled group meetings without compromising anonymity.

Therefore, while e-mail per se may be ubiquitous, it has an important role in the overall system of this invention for providing structured group programs over computer networks.

Providing Tools for Group Leaders to Manage Group Process

The system provides several tools for leaders to manage and direct the group process. The "Leader Access" heading in the simultaneous access window 406 drop-box lists all of the programs that the Leader controls in the system. The leader controls what structured group programs will be "played" and navigates through the various screens of each of the programs which are displayed in each participants shared access window 406. The leader controls when the Ratings screen appears in the interaction matrix, as well as when assessment measures appear in the simultaneous access window 406. The Leader receives special Feedback Reports that combine the information about all group members into one report, facilitating the understanding of the group's dynamics. The leader also sets the format for the interaction matrix 408 and the closed meeting rooms described above. In addition, the Leader may use the within group e-mail system to communicate individually with each group member if desired.

System-Wide Features

As described above, the system 100 may include a Scheduler 128. In addition to scheduling virtual meeting rooms, the scheduler 128 may provide a list of group offerings and meeting times, and enable users to register for a particular offering. For example, users may be provided the option to select a Lay Group, or a Professionally Led group. They can choose to participate in a group with Written Only Format, or Voice Only Format, etc. They can choose to sign up for a heterogeneous or homogeneous group. See, e.g. FIGS. 25A–25C.

The system 100 includes a security module 134 (FIG. 1) which includes, among other things, a password system for individuals to sign on to groups having a restricted access (such as closed groups with the same membership and group leader meeting over an extended period of time.) When signing onto the group, the participant will enter his/her own password and the group password, which will give him access to one of the positions on the group interaction matrix 408

A Professional Leaders Registry 136 (FIG. 1) provides a list of professionals who are leading groups on the system 100. The Registry 136 provides information to the customer as to the qualifications of professionals, and it will also provide a format for professional leaders to "advertise" their services to the public. Only those people who have received training in leading groups will be permitted to register. The Registry 136 contains biographical information about the registrant as well as what groups (and what time-slots, number of group meetings) each registrant is leading or will lead, and provides a sign-up sheet for visitors to reserve a space in each group. User's access the Professional Leaders Directory 136.

A Resource Directory 138 (FIG. 1) contains reviews of publications in the fields of business, health, psychology, and self-improvement. In particular, the reviews will summarize how each publication can be useful in the pursuit of self-improvement. The Resource Directory 138 may also be customized to include literature reviews of only those publications that have direct relevance to the topic of the specific training program.

Creating New Structured Group Programs

The system 100 provides a convenient structure for creating new self-contained structured group programs. Notably, the various modules/components may be customized to focus on a specific training topic. Specifically, the presentation materials, the response matrix 412 vocabulary (feedback responses), the Resource Directory 138, the on-line workbooks, the group prompt statements, the Ratings prompts, and the assessment questions may all be customized to provide a self-contained complete program focussed on a particular training topic and stored for later use.

By manner of illustration, FIG. 22 shows an example of how the structured group components are customized for a group-supported goal attainment program and a group-supported social skills training program.

Specific Application: Group-Support Goal Attainment Program

As discussed above in the Background of the Invention, there are very few structured group programs focussed on self-improvement that are offered for the general population of internet users. Most group programs are offered to people having serious emotional problems or addictions. Many people do not want to participate in programs like these because of the stigma attached.

The specific group-supported goal attainment program of the present invention fills an important gap in needed psychological services in the internet community. Offering this program in the context of a full service, large scale internet site (with components such as a scheduler/matching system, password access system, professional leaders directory, resource directory/search engine, bulletin boards, closed chat-rooms, security and customer service review) ensures that user needs for these psychological services are effectively met.

The system 100 of the present invention may be used for a variety of applications including the creation of virtual meeting spaces ("virtual office"), group counseling, and more. A specific application of the invention is the Group-Supported Goal Attainment Program which is described in this section.

The two main objectives of the Group-Supported Goal Attainment Program are 1) to teach the user skills in group interaction and support, and 2) to focus every group member's attention on specific self-improvement goals that he/she has chosen (e.g. improve fitness, improve work relationships, give up a bad habit, take on a new hobby, etc.) The program is similar to the concept of what a "Goals Anonymous" group might look like, although it is not based on the 12-Step Model of "Alcoholics Anonymous".

The program encourages people to write down their goals, learn what resources are available to them, develop a strategy for attaining each goal, and make regular assessments of their progress. It is generally thought that getting a goal down in writing makes it more concrete and increases your sense of commitment, creating a contract with yourself." It is also likely that writing goals down produces a greater sense of "cognitive dissonance" or discontinuity between what one's stated objectives are and how one is actually behaving. Letting the group members know what one's goals are also increases the dissonance between what is being said versus what is being done about a specific issue. For example, if John writes down that he wants to cut down on his television viewing (and perhaps tells his goal support group about his goal), then he is more likely to experience discomfort if he finds himself sitting in front of the television. for hours one afternoon. Hopefully this dissonance will motivate John to get up and do something else.

Steps of the Group-Supported Goal Attainment Program

The Goal Attainment Support group has specific steps for attaining personal goals which are outlined below:
- a) complete specially developed assessment measures to help identify areas in their lives where they would like to improve or change;
- b) list specific goals aimed at addressing the areas identified for self-improvement;
- c) monitor thoughts, behaviors and events associated with the desired changes;
- d) set up step-by-step action plans for attaining each goal;
- e) perform periodic assessments of the progress made on each goal;
- f) complete on-line training modules in group process, leadership and helping techniques;
- g) participate in on-going self-improvement support groups composed of the same group members meeting over time;
- h) receive instant goal support services when needed at open-membership "Goals Attainment Support" (GAS) meetings;
- i) review any special instructional materials presented during the group meetings;

Specific Workbooks, "Prompts" and Training Modules

The Group-Supported Goal Attainment Program includes all of the components of the structured group program described in a previous section of this application. Specifically, the program has a special workbook, group prompts, and sets of training exercises.

The workbook encourages people to write down their goals, learn what resources are available to them, develop a strategy for attaining each goal, and make regular assessments of their progress.

The "Prompts" provided by the program are a list of possible statements to be used when the group is "stuck" or doesn't know what to do next. They include many statements that refer to the group process as well as statements that are specific to goal attainment strategies.

The Group-Supported Goal Attainment Program of this invention incorporates group interaction training programs which provide information about group dynamics, group "curative" factors, different types of listening styles, different ways of responding, special group techniques for facilitating interaction (like role-playing and the "empty chair" technique), and stages of group development. The training program will allow a training group to observe demonstrations of the different concepts, and then practice engaging in the various interaction techniques together. This training is offered to open as well as closed membership groups. People who participate in open training groups will gain valuable experience for working on their goals should they decide to participate in an ongoing group supported goal attainment program.

An example of a specific training program was described in an earlier section. It involved learning about different styles of responding (e.g. "detective", "magician", "foreman", etc.) and practicing them with other group members in role play exercises.

Because the group-supported goal attainment program is integrated into a full service, large scale website that utilizes the enhanced system of computerized group interaction of the present invention, the experience of participating in the program can be powerfully rewarding.

Business Applications of the Present Invention

In view of the many shortcomings of existing systems of computerized group interaction and group discussion outlined in the Background section of this application, businesses have not been that interested in using the internet to offer group services to the potential customers. However, the system of this invention makes it possible for businesses to deliver high quality, authentic group services over the internet and over virtual private networks as well. Businesses that regularly utilize group presentation formats for delivering services will benefit particularly well from having their group activities hosted on a system according to the present invention. Some of these specific business applications of the website version of the system of interactive technology include the following:

Healthcare organizations (including managed care, hospitals and public health agencies) will benefit from being able to offer specially tailored group outreach programs to their clients with the capacity for maintaining a "personal file" or medical record for each client. For example, a hospital could host a pre and post surgery support group for breast cancer patients allowing them to monitor each patient, provide important information regarding treatment options, and deliver professionally led support services.

Large Psychotherapy Practices could benefit from providing internet group support programs as an adjunct to other face-to-face therapy services. Providing free or reduced fee groups on the host website would be a very good way of advertising the kinds of therapists and services available at a particular practice as well as reaching a much broader clientele than is possible in "real-world" practice alone.

Community support groups could reach a much larger audience by offering groups on the host website. Weight Watchers and alcoholics Anonymous, as well as groups for people suffering from emotional & physical disorders, groups for people wanting to quit smoking, and MADD and SADD are a few examples of community-based groups that could benefit from offering services via GroupOptions.com.

Academic, research and policy organizations could set up seminars and policy work groups on an on-going basis reaching members from different institutions across the entire country. Universities could offer courses that require lecture presentations and discussion segments, and students could take tests and submit assignments via their personal file which could be accessed by the instructor. Foreign language courses could be adapted remarkably well to this format. Research organizations (like NIMH) could set up studies with participants from all over the world. For example, researchers could study group process and its impact on different psychological problems by analyzing interaction data obtained from the operation of the system of the present invention, along with assessments and feedback reports provided by group participants.

The Department of Juvenile Justice could hold on-line probation groups for teens where they could work through the group-supported self-improvement program (and other required materials) while being closely monitored by probation officers. DJJ has a rehabilitative mission, and this kind of structured group interaction has been found to be a powerful intervention for teenagers. In fact, this approach could be highly effective for prisoners and parolees in many different institutions, since participants in on-line groups would allow for social interaction and rehabilitative efforts without the risk of actual physical proximity required in "real-life" group settings.

Publishers and authors of self-improvement and popular psychology literature could lease space on GroupOptions.com at the same time that their books are being published, thus providing an immediate setting for people to "work through" and practice the book's prescribed activities in a supportive, anonymous, and entertaining group environment. This approach would be particularly well suited to books that use a serialized format for helping people make improvements in their lives.

Producers of business education & professional continuing education seminars and literature will want to distribute special "workbook" versions of their programs on the host website. This format would be especially useful for programs teaching business management and leadership skills which are best developed in a group setting.

While various embodiments of the present invention have been shown and described, it should be understood that other modifications, substitutions and alternatives could be made without departing from the spirit and scope of the invention, which should be determined from the appended claims.

What is claimed is:

1. A server for communicating content between a group of networked client computers over a communications medium and displaying communications flows identifying a content originator an a content receiver, said server comprising:
  a memory;
  a processor storing and retrieving instructions from said memory;
  a network interface operably connecting said processor to the communications medium;
  a communications module receiving content from an originating computer and transmitting said content to at least one target computer;
  a graphical communication flow module integrated with said communications module and providing to each of the client computers a graphical representation of a group of networked computers, said graphical communication flow module graphically depicting communication flows showing the originating and target computer users corresponding to each content transmission by said communications interface, and having means to graphically depict the intended target of a communication flow in a manner visible to users of all the computers connected to a virtual group;
    wherein the graphical communications flow module has means to graphically depict that a communications flow is intended by an originator to target all computer users connected to the group of networked computers who are participating a virtual meeting of the virtual group;
    wherein the graphical communications flow module has means to graphically depict the originators and targets of more than one communications flow occurring simultaneously between computer users participating in the group meeting;
    wherein the graphical communications flow module has means to enable the originating users to graphically distinguish between communications flows that they intend to be primary and communications flows that they intend to be secondary;
    wherein the graphical communications flow module has means to enable an originator to transmit a hidden communications flow to only one target, while indicating the originator and target of the hidden communications flow in a manner perceptible to all users participating in the group meeting.

2. The server according to claim 1, wherein said communications module transmits content selected from the group comprising voice, video and text.

3. The server according to claim 2, further comprising:
  a voice communications monitor having a plurality of voice communication flags, one said flag corresponding to each client computer, only one said flag being active at any given time;
  said communications module verifying a status of said plurality of voice communication flags in response to a voice content transmission request for a given client computer, and activating said corresponding voice communication flag if none of said voice communication flags is active, said communications interface processing voice content transmission requests only from a client computer whose corresponding voice communication flag is active;
  a voice communication flag reset module for resetting said voice communication flags; and
  a timer module that triggers said flag reset module to reset said voice communications flags after a predetermined time interval, wherein said timer module includes a timer over-ride function for re-starting said predetermined time interval.

4. The server according to claim 1, comprising:
  a virtual meeting room module providing at least one of open membership virtual meeting rooms and restricted membership meeting rooms, access to said restricted membership meeting rooms being limited to select ones of the client computers;
  a communications interface being integrated with said virtual meeting room module, facilitating communications between client computers networked throughout an entire system with those client computers accessing a specific said virtual meeting room; and
  an email module providing email communications to client computer users connected to said virtual meeting room while simultaneously displaying said graphical communication flows occurring within said virtual meeting room.

5. The server according to claim 4, comprising:
  a virtual chalkboard viewable to client computers accessing a given virtual meeting room; and
  a graphical editor facilitating drawing on said virtual chalkboard by client computers accessing said given virtual meeting room;
  wherein the virtual chalkboard is integrated with the communications, feedback and graphical communication flow modules such that the virtual chalkboard may be utilized while simultaneously transmitting, receiving and viewing communication flows.

6. The server according to claim 4, comprising: a scheduler containing a directory of discussions occurring in said virtual meeting rooms, said scheduler managing registration for said discussions.

7. The server according to claim 1, wherein said graphical communication flow module graphically depicts each client computer user participating in the virtual group via computer using at least one of a dynamic video image received from said client computer and a still image.

8. The server according to claim 1, further comprising:
  a library of feedback responses including at least one of text and graphic icons and sound clips;
  a feedback communications module communicating feedback responses to said graphical communication flow module, such that transmission of a feedback response from an originating client to a target client is visible to all of the client computer users connected to the virtual group, said originating client providing feedback to the target client by selecting a feedback response from said library of feedback responses and sending said selected feedback response using said feedback communications module, said feedback communications module being integrated with said communications module, making it possible to transmit feedback responses simultaneously while other audiovisual and text messages are being transmitted via the communications module; and a feedback response editor for creating feedback responses and storing said custom feedback responses in said feedback response library, said response editor having the capacity to be utilized at the same time that the communications module and the graphical communication flow module are in operation.

9. The server according to claim 1, wherein said graphical communication flow module depicts communication flows by varying visual characteristics of a graphic identifying the originating client and the target client, and the type of communication being transmitted.

10. The server according to claim 1, comprising:

a shared documents window providing shared viewing access to one of a document and a video presentation, said shared documents window being integrated with said communications module and said graphical communication flow module such that a shared document may be viewed while simultaneously transmitting and receiving content and viewing communication flow s.

11. A virtual office system, comprising:

a server computer having a nonvolatile storage medium;

a plurality of client computers connected to said server computer via a communications medium;

a graphical interface for displaying data to said client computers;

a virtual floor-plan stored on said nonvolatile storage medium and defining a plurality of virtual offices, said virtual floor-plan being displayed by said graphical interface;

a scheduler storing scheduling information on said nonvolatile storage medium for scheduling said plurality of virtual offices, said scheduling information including a directory identifying a time, meeting identification information, and virtual office information uniquely identifying a given virtual office, said scheduling information being displayed by said graphical interface;

a communications interface module which allows for the simultaneous transmission of audiovisual, text and graphic information between an originating client computer user to at least one destination client computer user connected to the given virtual office;

a graphical communication flow module graphically depicting to each client computer a representation of each participant in a meeting, said graphical communication flow module graphically depicting communication flows to all of the client computers showing the originating and destination client of content transmitted by the communications interface, and having means to graphically depict the intended target of a communication flow in a manner visible to all client computer users connected to a virtual meeting group, having means to graphically depict that a communications flow is intended to target all computer users connected to the virtual meeting group, and having means to graphically depict the originators and targets of more than one communications flow occurring simultaneously between client computer users connected to the virtual meeting group; and a virtual meeting room module providing a simultaneous access window for displaying text or video transmissions to be viewed by all client computer users connected to said virtual meeting group at the same time that communications occurring between client computer users connected to the virtual meeting group can be transmitted, received and viewed via the communication and graphical communication flow modules, such text or video transmissions via the simultaneous access window having the capacity to be manipulated by a selected one of the client computer users connected to the virtual meeting group, such manipulation being possible during the ongoing operation of the communication and graphical communication flow modules.

12. The virtual office system according to claim 11, wherein the graphical communications flow module has means to enable the originating users to graphically distinguish between communications flows that they intend to be primary and communications flows that they intend to be secondary; and wherein the graphical communications flow module has means to enable an originator to transmit a hidden communications flow to only one target, while indicating the originator and target of the hidden communications flow in a manner perceptible to all users connected to the virtual meeting group.

13. The virtual office system according to claim 12, further comprising: an access control module restricting access to a selected virtual office; and an access request module for requesting access into said selected virtual office; and an access entry module which provides a selected one of the client computer users the capacity to allow previously restricted client computer users to enter said virtual group meeting; and such access modules having the capacity to be utilized while a virtual meeting group is taking place and the communications, graphical communication flow, and shared documents modules are all in operation.

14. A method for conducting on-line training using a server computer connected to a plurality of client computers, comprising:

providing a virtual meeting room on the server computer which is accessible to the client computer users participating in a specific training group;

graphically depicting a representation the virtual meeting room and each of the client computer users accessing and participating in the specific training group taking place in the virtual meeting room;

communicating content from an originating client computer user to at least one target client computer user connected to the specific training group using a messaging interface;

graphically depicting to each of the client computers a communications flow showing the originating and target client computer users of content transmitted by said messaging interface, and having means to graphically depict the intended target of a communication flow in a manner visible to users of all the computers connected to the training group, having means to graphically depict that a communications flow is intended to target all of the computer users connected to the training group, and having means to graphically depict the originators and targets of more than one communications flow occurring simultaneously between client computer users connected to the training group;

providing a simultaneous access window for displaying presentation materials to each of the client computers accessing the virtual room; and facilitating a structured discussion using the messaging system and the presentation materials displayed in the simultaneous access window.

15. The method according to claim 14, wherein a graphical communications flow module has means to enable the originating users to graphically distinguish between communications flows that they intend to be primary and communications flows that they intend to be secondary; and wherein the graphical communications flow module has means to enable an originator to transmit a hidden communications flow to only one target, while indicating the originator and target of the hidden communications flow in a manner perceptible to all users in the virtual meeting room.

16. The method according to claim 15, further comprising:

providing a presentation materials editor and a memory on the server for editing and storing presentation materials for an on-line training seminar.

17. The method according to claim 15, further comprising:

providing a library of feedback responses, wherein an originating client may select a given feedback response and specify a target client, and said messaging interface communicates the feedback response to the target client; and providing a feedback response editor for creating custom feedback responses.

18. The method according to claim 15, comprising:

providing a resource directory containing literature reviews related to the on-line training topic.

19. The method according to claim 15, comprising: providing an on-line workbook containing a series of exercises, said exercises including at least one of individual and group training exercises, wherein the on-line workbook is integrated with a communication module, a feedback module, and the graphical communication flow module, and the on-line workbook may be utilized while simultaneously transmitting, receiving and viewing communication flows.

20. The method according to claim 15, comprising: providing a list of on-line group prompt statements which are delivered to the group by one of a group leader and a group member to the group using the messaging system, wherein on-line prompts are integrated with a communication module, a feedback module, and the graphical communication flow module, and the on-line prompts may be utilized while simultaneously transmitting, receiving and viewing communication flows.

21. The method according to claim 15, comprising:

providing a graphical ratings module which prompts members for a rating;

providing statistical analysis of the responses;

graphically displaying each member's response to the ratings prompt such that each member views the responses of all the members and the results of the statistical analysis.

22. The method according to claim 15, comprising:

providing a diagnostic assessment module prompting members to answer a series of diagnostic questions; and providing statistical analysis of each member's responses to the diagnostic questions.

23. The method according to claim 15, comprising:

tracking a number of messages sent and received by each member, and tracking a total duration of voice messages transmitted and received by each member;

and providing statistical analysis of each member's activity as measured by said number of messages and said total duration of voice messages.

24. The method according to claim 15, comprising:

recording messages and communications flows; and selectively replaying and redisplaying said messages while simultaneously depicting the communication flows of the training group discussion of selected replayed segments.

25. An internet web site residing on a host and providing a structured communications environment for a plurality of client computers, said internet web site comprising:

a graphical interface displaying a plurality of virtual meeting rooms, a given virtual meeting room being simultaneously accessible to selected ones of the client computers;

a communications interface receiving content from an originating client computer and displaying said content to at least one destination client computer;

said graphical interface displaying within each virtual meeting room a representation of the client computers accessing said corresponding virtual meeting room;

said graphical interface graphically depicting communication flows showing the originating and destination client computer users corresponding to each content transmission by said communications interface, and having means to graphically depict the intended target of a communication flow in a manner visible to users of all the computers users in the virtual meeting room.

26. The internet web site according to claim 25, wherein:

the graphical interface has means to graphically depict that a communications flow is intended by the originator to target all computer users in the virtual meeting room; and the graphical interface has means to graphically depict the originators and targets of more than one simultaneous communications flow.

27. The internet web site according to claim 26, wherein the graphical interface has means to enable the originating users to graphically distinguish between communications flows that they intend to be primary and communications flows that they intend to be secondary.

28. The internet web site according to claim 27, wherein the graphical interface has means to enable an originator to transmit a hidden communications flow to only one target, while indicating the originator and target of the hidden communications flow in a manner perceptible to all users in the virtual meeting room.

29. The internet web site according to claim 28, wherein said communications interface transmits content selected from the group comprising voice, video and text.

30. The internet web site according to claim 28, further comprising:

a voice communications traffic module providing for each virtual meeting room a plurality of voice communication flags, one said flag corresponding to each client computer, accessing a given virtual room, only one said flag being active in any virtual room at any given time;

said communications interface verifying a status of said plurality of voice communication flags within a given virtual room in response to a voice content transmission request by a client computer, and activating said corresponding voice communication flag if none of said voice communication flags within said given virtual meeting room is active, said communications interface processing voice content transmission requests only from a client computer whose corresponding voice communication flag is active;

a flag reset module for resetting a selected said voice communication flags; and a timer module triggers said flag reset module to reset said selected voice communications flag after a predetermined time interval;

wherein said timer module includes a timer over-ride function for re-starting said predetermined time interval.

31. The internet web site according to claim 28, wherein: said graphical interface graphically depicts each client computer using at least one of a dynamic video image received from said client computer and a still image stored on said host.

32. The internet web site according to claim 28, further comprising:
a library of feedback responses stored on the host;
said graphical interface enabling an originating said client computer to choose a selected said feedback response and specify a target client for receipt of the selected feedback response, said graphical interface displaying said feedback response and identifying an originating and target client of the feedback response; and
a feedback response editor residing on said host for creating custom feedback responses, and storing said custom text and custom graphic icons in said library of feedback responses.

33. The internet web site according to claim 28 further comprising:
an email module providing email communications while simultaneously displaying said graphical communication flows.

34. The internet web site according to claim 28, further comprising:
a shared documents window providing shared viewing access to one of a document and a video presentation, said shared documents window being integrated with said graphical interface and said graphical communication flow module such that a shared document may be viewed while simultaneously transmitting and receiving content and viewing communication flows.

35. The internet web site according to claim 28, further comprising: a virtual chalk board viewable to client computers accessing a given virtual meeting room; and a graphical editor facilitating drawing on said virtual chalkboard by client computers accessing said given virtual meeting room.

36. The internet web site according to claim 28, further comprising: a scheduler containing a directory of discussions occurring in said virtual meeting rooms, said scheduler managing registration for said discussions.

37. A method for providing on-line counseling using a server computer connected to a plurality of client computers, comprising the steps of:
storing a roster of authorized participants on the server said roster including identification information specifying authorized client computers;
providing a virtual meeting room on the server computer which is accessible to the authorized client computers;
graphically depicting a representation of the virtual meeting room including a graphical representation of each of the authorized participants accessing the virtual meeting room;
communicating content from an originating client to at least one target client in a counseling group in the virtual meeting room using a messaging interface;
graphically depicting to each of the clients a communications flow showing the originating and target client(s) of content transmitted by said messaging interface, said messaging interface having means to graphically depict the intended target of a communication flow in a manner visible on all the computers of the participants in a virtual meeting room;
storing presentation material on the server;
providing a simultaneous access window for displaying the presentation materials to each of the authorized client computers accessing the virtual meeting room; and
facilitating a structured discussion using the messaging interface and the presentation materials displayed in the simultaneous access window;
wherein the messaging interface has means to graphically depict that a communications flow is intended by an originator to target all the participants in the virtual meeting room;
wherein the messaging interface has means to graphically depict the originators and targets of more than one simultaneous communications flow;
wherein the messaging interface has means to enable the originating users to graphically distinguish between communications flows that they intend to be primary and communications flows that they intend to be secondary; and
wherein the messaging interface has means to enable an originator to transmit a hidden communications flow to only one target, while indicating the originator and target of the hidden communications flow in a manner perceptible to all users in the virtual meeting room.

38. The method according to claim 37, further comprising the step of:
providing a library of feedback responses, wherein a member may provide feedback by sending a feedback response from said library of feedback responses.

39. A memory medium storing software for a communications system, comprising:
a graphical interface for displaying a plurality of virtual meeting rooms, a given virtual meeting room being simultaneously accessible to selected ones of the client computers;
a communications interface for receiving content from an originating client computer and displaying said content to at least one destination client computer;
said graphical interface displaying within each virtual meeting room a representation of the client computers accessing said corresponding virtual meeting room;
said graphical interface graphically depicting communication flows showing the originating and destination client computer users corresponding to each content transmission by said communications interface, and having means to graphically depict the intended target of a communication flow in a manner visible to all computer users in the virtual meeting room;

wherein the graphical interface has means to graphically depict that a communications flow is intended by an originator to target all computer users in the virtual meeting room;

wherein the graphical interface has means to graphically depict the originators and targets of more than one communications flow occurring simultaneously between client computer users in the virtual meeting room;

wherein the graphical interface has means to enable the originating users to graphically distinguish between communications flows that they intend to be primary and communications flows that they intend to be secondary; and wherein the graphical interface has means to enable an originator to transmit a hidden communications flow to only one target, while identities of the originator and the target of the hidden communications flow are transmitted via the graphical interface in a manner perceptible to all users in the virtual meeting room.

* * * * *